(12) United States Patent
Smith et al.

(10) Patent No.: US 11,057,353 B2
(45) Date of Patent: *Jul. 6, 2021

(54) SYSTEMS, METHODS, AND DEVICES FOR IMPLEMENTING A SMART CONTRACT ON A DISTRIBUTED LEDGER TECHNOLOGY PLATFORM

(71) Applicant: SYMBIONT.IO, INC., New York, NY (US)

(72) Inventors: Mark Smith, New York, NY (US); Anush Vijayaraghavan, New York, NY (US); Evan Wagner, New York, NY (US); Yiqun Yin, Riverside, CT (US)

(73) Assignee: Symbiont.io, Inc., New York, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/597,244

(22) Filed: Oct. 9, 2019

(65) Prior Publication Data

US 2020/0112545 A1    Apr. 9, 2020

Related U.S. Application Data

(63) Continuation of application No. 16/264,508, filed on Jan. 31, 2019, now Pat. No. 10,476,847, which is a
(Continued)

(51) Int. Cl.
   *H04L 29/06*    (2006.01)
(52) U.S. Cl.
   CPC .......... *H04L 63/04* (2013.01); *H04L 63/0435* (2013.01); *H04L 63/0442* (2013.01); *H04L 2209/38* (2013.01)
(58) Field of Classification Search
   CPC . H04L 63/04; H04L 63/0435; H04L 63/0442; H04L 2209/38
   See application file for complete search history.

(56) References Cited

U.S. PATENT DOCUMENTS

| | | |
|---|---|---|
| 5,550,976 A | 8/1996 | Henderson et al. |
| 9,397,985 B1 | 7/2016 | Seger et al. |

(Continued)

FOREIGN PATENT DOCUMENTS

| | | |
|---|---|---|
| EP | 2852121 | 3/2015 |
| KR | 2018/0060044 | 6/2018 |
| WO | WO 2018/209222 | 11/2018 |

OTHER PUBLICATIONS

Klerns, Markus, et al. "Trustless intermediation in blockchain-based decentralized service marketplaces." International Conference on Service-Oriented Computing. Springer, Cham, 2017. (Year: 2017).*

(Continued)

*Primary Examiner* — Shawnchoy Rahman
(74) *Attorney, Agent, or Firm* — Knobbe Martens Olson & Bear LLP

(57) ABSTRACT

In some embodiments, systems, methods, and devices disclosed herein are directed to implementations of one or more smart contracts deployed on a distributed ledger technology (DLT) platform. In some embodiments, implementation of one or more specific smart contracts and/or private data sharing technologies on a DLT platform can provide frameworks and/or solutions to generate a smart UCC platform that facilitates submission and tracking of Uniform Commercial Code (UCC) filings on a distributed ledger or blockchain platform. In some embodiments, implementation of one or more specific smart contracts and/or private data sharing technologies on a DLT platform can provide frameworks and/or solutions to generate a smart company platform for controlling, managing, and/or communicating company documents and/or communications on a distributed ledger or blockchain platform.

20 Claims, 23 Drawing Sheets

Related U.S. Application Data continuation-in-part of application No. 16/213,251, filed on Dec. 7, 2018, now Pat. No. 10,320,843.

(60) Provisional application No. 62/625,133, filed on Feb. 1, 2018, provisional application No. 62/633,234, filed on Feb. 21, 2018, provisional application No. 62/596,573, filed on Dec. 8, 2017, provisional application No. 62/596,580, filed on Dec. 8, 2017.

(56) References Cited

U.S. PATENT DOCUMENTS

| | | |
|---|---|---|
| 9,569,771 B2 | 2/2017 | Lesavich et al. |
| 9,722,790 B2 | 8/2017 | Ebrahimi |
| 10,135,607 B1 | 11/2018 | Roets |
| 10,146,792 B1 | 12/2018 | Dobrek et al. |
| 10,320,843 B1 | 6/2019 | Dobrek et al. |
| 10,476,847 B1 | 11/2019 | Smith et al. |
| 2005/0038732 A1 | 2/2005 | Sweeting et al. |
| 2005/0204128 A1 | 9/2005 | Aday et al. |
| 2006/0265259 A1 | 11/2006 | Diana et al. |
| 2007/0129958 A1 | 6/2007 | Wu et al. |
| 2009/0182667 A1 | 7/2009 | Parkes et al. |
| 2014/0156534 A1 | 6/2014 | Quigley et al. |
| 2015/0262176 A1 | 9/2015 | Langschaedel et al. |
| 2016/0210710 A1 | 7/2016 | Glennon |
| 2016/0342994 A1 | 11/2016 | Davis |
| 2016/0379013 A1 | 12/2016 | Ganesan et al. |
| 2017/0005804 A1 | 1/2017 | Zinder |
| 2017/0017954 A1 | 1/2017 | McDonough et al. |
| 2017/0046689 A1 | 2/2017 | Lohe et al. |
| 2017/0046698 A1 | 2/2017 | Haldenby et al. |
| 2017/0075941 A1 | 3/2017 | Finlow-Bates |
| 2017/0085555 A1 | 3/2017 | Gisikalo et al. |
| 2017/0104731 A1 | 4/2017 | Baudoin et al. |
| 2017/0116693 A1 | 4/2017 | Rae et al. |
| 2017/0124556 A1 | 5/2017 | Seger |
| 2017/0161829 A1 | 6/2017 | Mazier |
| 2017/0177898 A1 | 6/2017 | Dillenberger |
| 2017/0213221 A1 | 7/2017 | Kurian et al. |
| 2017/0230189 A1 | 8/2017 | Toll et al. |
| 2017/0236104 A1 | 8/2017 | Biton |
| 2017/0243193 A1 | 8/2017 | Manian et al. |
| 2017/0243209 A1 | 8/2017 | Johnsrud et al. |
| 2017/0279774 A1 | 9/2017 | Booz et al. |
| 2017/0289111 A1 | 10/2017 | Voell et al. |
| 2017/0330159 A1 | 11/2017 | Castinado et al. |
| 2017/0352012 A1 | 12/2017 | Hearn et al. |
| 2017/0352116 A1 | 12/2017 | Pierce et al. |
| 2018/0018738 A1 | 1/2018 | Bernauer |
| 2018/0075686 A1 | 3/2018 | Campero et al. |
| 2018/0089641 A1 | 3/2018 | Chan et al. |
| 2018/0089761 A1* | 3/2018 | Stradling .............. H04L 9/3236 |
| 2018/0101848 A1 | 4/2018 | Castagna et al. |
| 2018/0117447 A1 | 5/2018 | Tran et al. |
| 2018/0183768 A1 | 6/2018 | Lobban |
| 2018/0253702 A1 | 9/2018 | Dowding |
| 2018/0254898 A1 | 9/2018 | Sprague et al. |
| 2018/0262493 A1 | 9/2018 | Andrade |
| 2018/0268386 A1 | 9/2018 | Wack et al. |
| 2018/0294966 A1 | 10/2018 | Hyun et al. |
| 2018/0375847 A1 | 12/2018 | Schropfer |
| 2019/0012662 A1 | 1/2019 | Krellenstein et al. |
| 2019/0013943 A1 | 1/2019 | Maim |
| 2019/0013948 A1* | 1/2019 | Mercuri .............. G06F 11/3072 |
| 2019/0052458 A1 | 2/2019 | Wright et al. |
| 2019/0073666 A1 | 3/2019 | Ortiz et al. |
| 2019/0114706 A1* | 4/2019 | Bell ...................... H04L 9/0825 |
| 2019/0147532 A1 | 5/2019 | Singh et al. |
| 2019/0166095 A1 | 5/2019 | Tobin |
| 2019/0191293 A1 | 6/2019 | Nelson et al. |
| 2019/0305935 A1 | 10/2019 | Qiu |
| 2019/0373137 A1 | 12/2019 | Krukar et al. |

OTHER PUBLICATIONS

Christidis, Konstantinos, and Michael Devetsikiotis. "Blockchains and smart contracts for the internet of things." IEEE Access 4 (2016): 2292-2303. (Year: 2016).*

"Is Blockchain the Answer to E-voting? Nasdaq Believes So", Market Insite, Jan. 23, 2017, availabe at https://business.nasdaq.com/marketinsite/2017/Is-Blockchain-the-Answer-to-E-voting-Nasdaq-Believes-So.html.

Bessani, Alysson "State Machine Replication for the Masses with BFT-SMaRt", Jun. 23-26, 2014 IEEE Computer Society Washington, DC, USA.

Cecchetti, Ethan, et al. "Solidus: Confidential distributed ledger transactions via PVORM." Proceedings of the 2017 ACM SIGSAC Conference on Computer and Communications Security. ACM, 2017. (Year: 2017).

"Counterparty introduces truly trustless games on the blockchain", Jul. 2014, available at http://counterparty.io/news/introducing-fully-trustless-games-on-block.

Dodis, Y., "Introduction of Cryptography—Lecture 14", Apr. 25, 2012, pp. 1-14.

Egelund-Muller, B., Elsman, M., Henglein, F., and 0. Ross, 2016, "Automated Execution of Financial Contracts on Blockchains", Working Paper, University of Copenhagen.

Eha, Brian Patrick, "Who owns what, really? In securities, Delaware may soon clear things up", Jul. 5, 2017, available at https://www.americanbanker.com/news/who-owns-what-really-in-securities-delaware-may-soon-clear-things-up.

Ethereum Homestead Documentation, Release 0.1, Dated Mar. 1, 2017, Downloaded from: https://media.readthedocs.org/pdf/ethereum-homestead/latest/ethereum-homestead.pdf on Aug. 20, 2017. (Year: 2017).

FINRA, Distributed Ledger Technology: Implications of Blockchain for the Securities Industry, 2017, available at http://www.finra.org/sites/defualt/files/FINRA_Blockchain Report.pdf.

Harvey, C., "Cryptofinance", 2016, available at SSRN: https://ssrn.com/abstract=2438299.

International Search Report and Written Opinion issued in PCT App. No. PCT/US2018/041052, dated Nov. 16, 2018.

Irrera, Anna, "Norther Trust users blockchain for private equity record-keeping", Feb. 21, 2017 available at https://www.reuters.com/article/nthern-trust-ibm-blockchain-idUSL1N1G61TX.

Irrera, Anna and Kelly, Jemima, "London Stock Exchange Group tests blockchain for private company shares", Jul. 19, 2017, available at https://www.reuters.com/article/us-lse-blockchain/london-stock-exchange-group-tests-blockchain-for-private-company-shares-idUSKBN1A4OME.

Kharpal, Arjun, "Nasdaq to trial blockchain voting for shareholders", Feb. 12, 2016, available at https://www.cnbc.com/2016/02/12/nasdaq-to-trial-blockchain-voting-for-shareholders.html.

Klayman, Joshua Ashley, Pexk, Geoffrey R., and Wojciechowski, Mark S., "Why the Delaware Blockchain Initiative Matters to All Dealmakers", Sep. 20, 2017, available at https://www.forbes.com/sites/groupthink/2017/09/20/why-the-delaware-blockchain-initiative-matters-to-all-dealmakers/#724fa5b67550.

Klems, Markus, et al. "Trustless intermediation in blockchain-based decentralized service marketplaces." International Conference on Service-Oriented Computing. Springer, Cham, 2017. (Year: 2017).

Lamport, Leslie, "Time, Clocks, and the Ordering of Events in a Distributed System", Jul. 1978, available at https://www.microsoft.com/en-us/research/wp-content/uploads/2016/12/Time-Clocks-and-the-Ordering-of-Events-in-a-Distributed-System.pdf.

Metz, Cade, "SEC Approves Plan to Issue Stock via Bitcoin's Blockchain", Dec. 15, 2015, available at https://www.wired.com/2015/12/sec-approves-plan-to-issue-company-stock-via-the-bitcoin-blockchain.

Mullin, Shepperd, "Taking Stock in Blockchains", Venture Law Blog, Jun. 9, 2017, available at https://www.venturelawblog.com/other/blockchain.

Nakamoto, S., A Peer-to-Peer Electronic Cash System, White Paper, 2008, available at https://bitcoin.org/bitcoin.

(56) References Cited

OTHER PUBLICATIONS

The National Institute of Standards and Technology's (NIST) 2015 SHA-3 release http://nvlpubs.nist.gov/nistpubs/FIPS/NIST.FIPS.202. pdf, the entirety of which is herein expressly incorporated by reference for all purposes.

Neisse, Ricardo, Gary Steri, and Igor Nai-Fovino. "A blockchain-based approach for data accountability and provenance tracking." Proceedings of the 12th International Conference on Availability, Reliability and Security. ACM, 2017. (Year: 2017).

Noether, Shen, "Ring Confidential Transactions", Feb. 2016, Monero Research Lab, Research Bulletin.

Pinea, A and W. Ruttemberg, "Distributed ledger technologies in securities post-trading: Revolution or evolution?" Apr. 2016, Occasional Paper Series of the European Central Bank, available at https://www.ecb.europa.eu/pub/pdf/scpops/ecbopll 72.en.pdf.

Rizzo, Pete, "Hands on With Linq, Nasdaq's Private Markets Blockchain Project", Nov. 21, 2015, available at https://www.coindesk.com/hands-on-with-linq-nasdaqs-private-markets-blockchain-project.

Solidity Documentation, Release 0.4.4 dated Feb. 13, 2017, retrieved from: https://solidity.readthedocs.io/en/v0.4.4/ introduction-to-smart-contracts.html on Aug. 15, 2018. (Year: 2017).

Tinianow, Andrea and Long, Caitlin, "Delaware Blockchain Initiative: Transforming the Foundational Infrastructure of Corporate Finance", Mar. 16, 2017, available at https://corpgov.law.harvard.edu/2017/03/16/delaware-blockchain-initiative-transform ing-the-foundational-infrastructure-of-corporate-finance.

Tinianow, Andrea, Smith, Mark, Long, Caitlin, and Santori, Marco, "Delaware's 2017 Resolution: Make Blockchain a Reality", Jan. 3, 2017, available at https://www.coindesk.com/what-expect-delaware-blockchain-initiative-2017.

Udris, Jonas, "Using Blockchain Technology for Limited Company Shares Management", Miner One, Jan. 18, 2018, available at https://medium.com/@minerone.io/using-blockchain-technology-for-limited-company-shares-management-cd8c344c2954.

UK Government Office for Science, 2016, Distributed Ledger Technology: Beyond the BlockChain, available at https://www.gov.uk/ government/ ... data/ .. ./ gs-16-1-di stributed-1 edgertechnology. Pdf.

Yermack, David, "Corporate Governance and Blockchains", National Bureau of Economic Reasearch, Dec. 2015, available at https://www.nber.org/papers/w21802.pdf.

Zhang, Pent, et al. "Metrics for assessing blockchair-based healthcare decentralized apps." 2017 IEEE 19th International Conference on e-Health Networking, Applications and Services (Healthcom). IEEE, 2017. (Year: 2017).

International Search Report and Written Opinion issued in PCT App. No. PCT/US2020/027798, dated Jul. 24, 2020.

R. Tonelli, M. I. Lunesu, A. Pinna, D. Taibi and M. Marchesi, "Implementing a Microservices System with Blockchain Smart Contracts," 2019 IEEE International Workshop on Blockchain Oriented Software Engineering (IWBOSE), Hangzhou, China, 2019, pp. 22-31, (Year: 2019).

\* cited by examiner

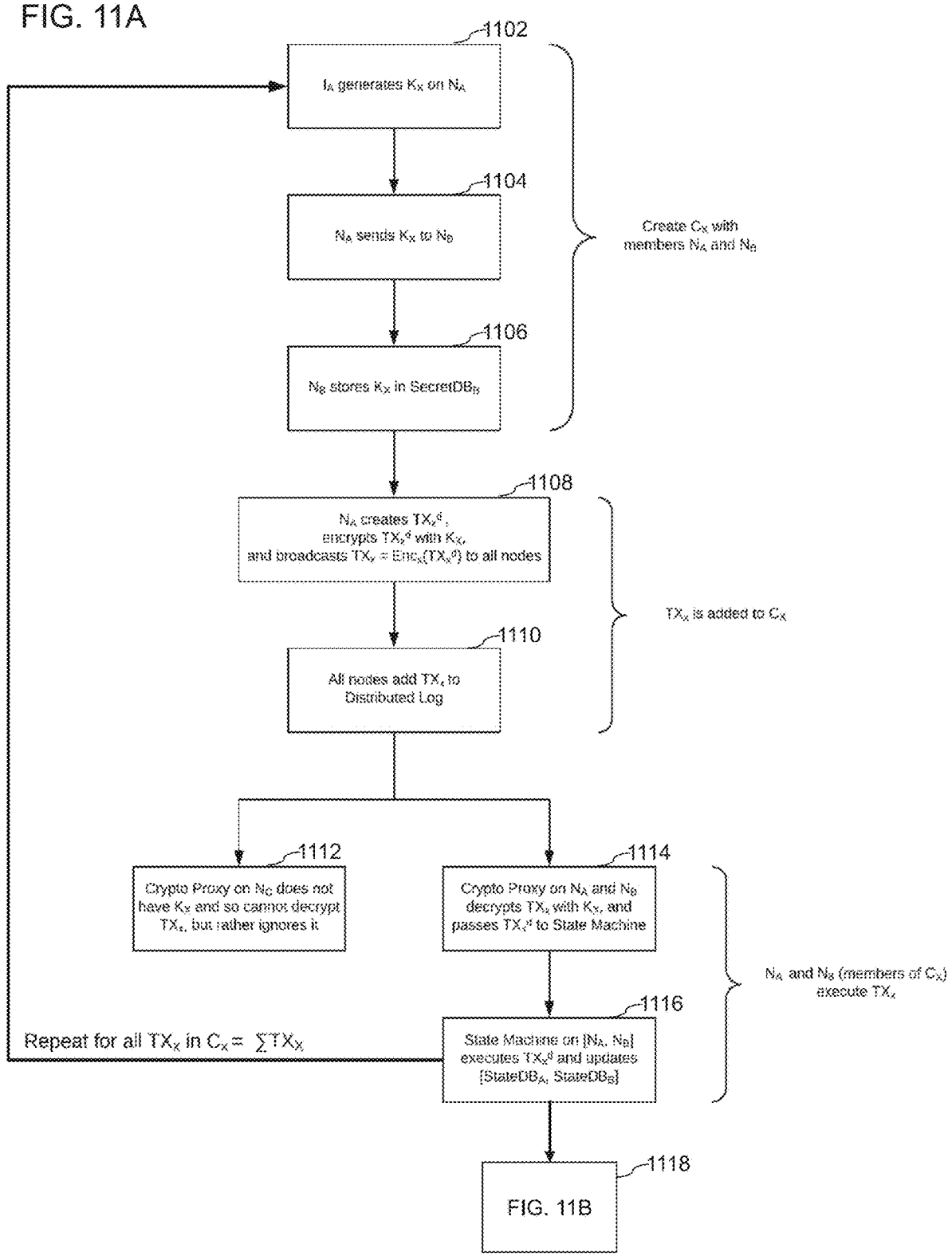

Node A and Node B are in Channel X
Node C alone is in Channel Y

| | Node A | Node B | Node C |
|---|---|---|---|
| Distributed Log | $\sum TX = \sum TX_x + TX_y + \ldots =$ $TX_1, TX_2, TX_3, TX_4, TX_5, TX_6, \ldots$ | $\sum TX = \sum TX_x + TX_y + \ldots =$ $TX_1, TX_2, TX_3, TX_4, TX_5, TX_6, \ldots$ | $\sum TX = \sum TX_x + TX_y + \ldots =$ $TX_1, TX_2, TX_3, TX_4, TX_5, TX_6, \ldots$ |
| StateDB (Channel X) | $State_i = Execute(\sum_i TX_x = TX_1, TX_4, TX_5, \ldots, TX_i)$ | $State_i = Execute(\sum_i TX_x = TX_1, TX_4, TX_5, \ldots, TX_i)$ | Null |
| StateDB (Channel Y) | Null | Null | $State_j = Execute(\sum_j TX_y = TX_2, TX_3, TX_6, \ldots, TX_j)$ |

FIG. 13A

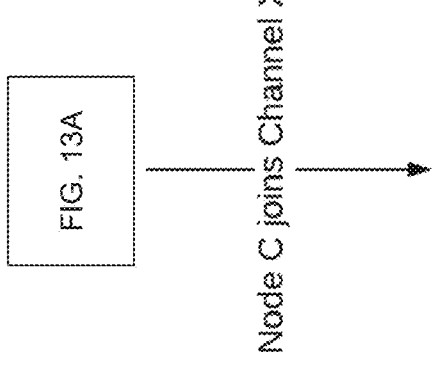

FIG. 13A

Node C joins Channel X

Node A, Node B and Node C are in Channel X
Node C alone is in Channel Y

| Distributed Log | Node A | Node B | Node C |
|---|---|---|---|
|  | $\sum TX = \sum TX_x + TX_y + ... =$ $TX_1, TX_2, TX_3, TX_4, TX_5, TX_6, ...$ | $\sum TX = \sum TX_x + TX_y + ... =$ $TX_1, TX_2, TX_3, TX_4, TX_5, TX_6, ...$ | $\sum TX = \sum TX_x + TX_y + ... =$ $TX_1, TX_2, TX_3, TX_4, TX_5, TX_6, ...$ |
| StateDB (Channel X) | $State_i = Execute(\sum_i TX_x = TX_1, TX_4, TX_5, ..., TX_i)$ | $State_i = Execute(\sum_i TX_x = TX_1, TX_4, TX_5, ..., TX_i)$ | $State_i = Execute(\sum_i TX_x = TX_1, TX_4, TX_5, ..., TX_i)$ |
| StateDB (Channel Y) | Null | Null | $State_j = Execute(\sum_j TX_y = TX_2, TX_3, TX_6, ..., TX_j)$ |

FIG. 13B

SYSTEMS, METHODS, AND DEVICES FOR IMPLEMENTING A SMART CONTRACT ON A DISTRIBUTED LEDGER TECHNOLOGY PLATFORM

CROSS-REFERENCE TO RELATED APPLICATIONS

This application is a continuation of U.S. patent application Ser. No. 16/264,508, filed Jan. 31, 2019, and titled SYSTEMS, METHODS, AND DEVICES FOR IMPLEMENTING A SMART CONTRACT ON A DISTRIBUTED LEGER TECHNOLOGY PLATFORM, which claims the benefit of U.S. Provisional Patent Application No. 62/625,133, filed Feb. 1, 2018, and titled APPARATUSES, METHODS, AND SYSTEMS FOR SUBMISSIONS AND TRACKING OVER A MULTINODAL DECENTRALIZED NETWORK TOPOLOGY, and U.S. Provisional Patent Application No. 62/633,234, filed Feb. 21, 2018, and titled APPARATUSES, METHODS, AND SYSTEMS FOR COMPANY AND INSTRUMENT CONTROL, COMMUNICATION, AND MANAGEMENT BLOCKCHAIN. U.S. patent application Ser. No. 16/264,508 is a continuation-in-part of U.S. patent application Ser. No. 16/213,251, filed Dec. 7, 2018, and titled METHODS, SYSTEMS, AND DEVICES FOR ENCRYPTED ELECTRONIC STORAGE AND CONFIDENTIAL NETWORK TRANSFER OF PRIVATE DATA THROUGH A TRUSTLESS DISTRIBUTED LEDGER TECHNOLOGY SYSTEM, which claims the benefit of U.S. Provisional Patent Application No. 62/596,573, filed Dec. 8, 2017, and titled APPARATUSES, METHODS, AND SYSTEMS FOR TRUSTLESS SHARING ON PRIVATE DATA ON A BLOCKCHAIN, and which claims the benefit of U.S. Provisional Patent Application No. 62/596,580, filed Dec. 8, 2017, and titled APPARATUSES, METHODS, AND SYSTEMS FOR TRUSTLESS SHARING OF PRIVATE DATA ON A BLOCKCHAIN. Each of the foregoing applications is hereby incorporated by reference in its entirety.

BACKGROUND

Field

Embodiments of the invention relate to the field of distributed ledger technology, and, in particular, to systems, methods, and devices for implementing a smart contract on a distributed ledger technology platform.

Description

With the development of new technologies, distributed ledger platforms and systems, such as blockchains, are useful for storing and transferring data across an electronic network using trustless systems while enabling verification of the data. For example, users of cryptocurrency can utilize a distributed ledger system to keep track of transactions by storing such transaction data across a network of computing systems that are not under the central command of a single server and/or authority. Without a central command server and/or authority, the computing systems operating within the network are considered trustless in the sense that the computing systems are acting independently. To ensure the consistency of the data across the entire distributed ledger system network, all computing systems operating within the distributed ledger system network must process and store the data that the network system receives such that the data is accessible to all participants. Despite such advancements, there does not exist a mechanism for the private sharing of data on a distributed ledger system, which can allow for additional applications of distributed ledger technology platforms.

SUMMARY

In some embodiments, a computer-implemented method for implementing a smart contract over a trustless decentralized distributed networked node system, the smart contract configured for electronically recording security interests on the trustless decentralized distributed networked node system, the computer-implemented method comprises: receiving by a first trustless decentralized networked node from a first user at a first user input for generating a first smart contract output based at least in part on the smart contract configured for electronically recording security interests on the trustless decentralized distributed networked node system, wherein the first user input comprises a first set of assets and an owner of the first set of assets, wherein the first user is assigned a first unique identifier by the trustless decentralized distributed networked node system, wherein the smart contract comprises a plurality of predetermined electronic actions configured to be automatically performed based on one or more triggering events; wherein the smart contract is published on the trustless decentralized distributed networked node system and agreed upon by each of a plurality of trustless decentralized distributed networked nodes on the trustless decentralized distributed networked node system; generating by the first trustless decentralized networked node the first smart contract output based at least in part on the smart contract and the first user input, the smart contract configured to assign a second unique identifier to the owner of the first set of assets and a third unique identifier to the first set of assets, wherein the first smart contract output comprises a first electronic security interest on the first set of assets; transmitting by the first trustless decentralized networked node the first smart contract output generated based at least in part on the smart contract to the trustless decentralized distributed networked node system comprising the plurality of trustless decentralized distributed networked nodes; and recording by the first trustless decentralized networked node the first smart contract output generated based in part on the smart contract on the trustless decentralized distributed networked node system after receiving notification from a central authority that the first smart contract output generated based in part on the smart contract is acceptable for recording on the trustless decentralized distributed networked node system, wherein the first trustless decentralized networked node comprises a computer processor and an electronic storage medium.

In some embodiments, the computer-implemented method further comprises: receiving by a second trustless decentralized networked node from a second user a second user input for generating a second smart contract output based at least in part on the smart contract configured for electronically recording security interests on the trustless decentralized distributed networked node system, wherein the second user input comprises the owner of the first set of assets and the first set of assets, wherein the second user is assigned a fourth unique identifier by the trustless decentralized distributed networked node system; generating by the second trustless decentralized networked node the second smart contract output based at least in part on the smart contract and the second user input, the smart contract configured to access the second unique identifier of the owner of the first set of assets and the third unique identifier of the first set of assets, wherein the second smart contract output comprises a second electronic security interest on the first set of assets; executing by one or more of the plurality of trustless decentralized distributed networked nodes the smart contract to determine existence of the first security interest on the first set of assets; preventing by the smart contract transmission of the second smart contract output generated based at least in part on the smart contract from the second trustless decentralized networked node to the trustless decentralized distributed networked node system; and transmitting by the trustless decentralized distributed networked node system an electronic alert notification to the second user based on the determination of the existence of the first security interest, wherein the electronic alert notification notifies the second user that the second smart contract output was prevented from being transmitted to the trustless decentralized distributed networked node system. In some embodiments, the computer-implemented method further comprises: transmitting by the trustless decentralized distributed networked node system another electronic alert notification to the first user based on the determination of the existence of the first security interest, wherein the another electronic alert notification notifies the first user that the second smart contract output attempted to record the second security interest on the first set of assets. In some embodiments of the computer-implemented method, the first and second trustless decentralized networked nodes are the same trustless decentralized networked node. In some embodiments of the computer-implemented method, the first and second trustless decentralized networked nodes are different trustless decentralized networked nodes.

In some embodiments, the computer-implemented method further comprises: receiving by a second trustless decentralized networked node from a second user at a second trustless decentralized networked node a second user input for generating a second smart contract output based at least in part on the smart contract configured for electronically recording security interests on the trustless decentralized distributed networked node system, wherein the second user input comprises the first set of assets and the owner of the first set of assets, wherein the second user is assigned a fourth unique identifier by the trustless decentralized distributed networked node system; generating by the second trustless decentralized networked node the second smart contract output based at least in part on the smart contract and based on the second user input, the second smart contract configured to access the second unique identifier of the owner of the first set of assets and the third unique identifier of the first set of assets, wherein the second smart contract output comprises a second electronic security interest on the first set of assets; recording by the second trustless decentralized networked node a proposal of the second smart contract output generated based at least in part of the smart contract to the trustless decentralized distributed networked node system comprising the plurality of trustless decentralized distributed networked nodes; executing by one or more of the plurality of trustless decentralized distributed networked nodes the smart contract to determine existence of the first security interest on the first set of assets; and rejecting by the one or more of the plurality of trustless decentralized distributed networked nodes the second smart contract output proposed by the second trustless decentralized networked node to the trustless decentralized distributed networked node system based at least in part on the determined existence of the first security interest on the first set of assets. In some embodiments, the computer-implemented method further comprises: transmitting by the trustless decentralized distributed networked node system an electronic alert notification to the second user based on the determination of the existence of the first security interest, wherein the electronic alert notification notifies the second user that the second smart contract output was rejected based at least in part on the determined existence of the first security interest on the first set of assets. In some embodiments, the computer-implemented method further comprises: transmitting by the trustless decentralized distributed networked node system another electronic alert notification to the first user based on the determination of the existence of the first security interest, wherein the another electronic alert notification notifies the first user that the second smart contract output attempted to record the second security interest on the first set of assets.

In some embodiments, the computer-implemented method further comprises: receiving by a second trustless decentralized networked node from a second user a second user input for generating a second smart contract output based at least in part on the smart contract configured for electronically recording security interests on the trustless decentralized distributed networked node system, wherein the second user input comprises the first set of assets and the owner of the first set of assets, wherein the second user is assigned a fourth unique identifier by the trustless decentralized distributed networked node system; generating by the second trustless decentralized networked node the second smart contract output based at least in part on the smart contract and the second user input, the smart contract configured to access the second unique identifier of the owner of the first set of assets and the third unique identifier of the first set of assets, wherein the second smart contract output comprises a second electronic security interest on the first set of assets; executing by one or more of the plurality of trustless decentralized distributed networked nodes the smart contract to determine existence of the first security interest on the first set of assets; transmitting by the second trustless decentralized networked node the second smart contract output generated based at least in part on the smart contract to the trustless decentralized distributed networked node system comprising the plurality of trustless decentralized distributed networked nodes; recording by the second trustless decentralized networked node the second smart contract output generated based in part on the smart contract on the trustless decentralized distributed networked node system after receiving notification from the central authority that the second smart contract output generated based in part on the smart contract is acceptable for recording on the trustless decentralized distributed networked node system; and transmitting by the trustless decentralized distributed networked node system an electronic alert notification to the first user based on the determination of the existence of the first security interest, wherein the electronic alert notification notifies the first user that the second smart contract output recorded the second security interest on the first set of assets.

In some embodiments of the computer-implemented method, the transmitting of the first smart contract output generated based at least in part on the smart contract is transmitted over a private channel to enable sharing of private data over the trustless decentralized distributed networked node system. In some embodiments of the computer-implemented method, the receiving of the notification from the central authority triggers storing of the first security interest in a secondary data repository. In some embodiments of the computer-implemented method, the first set of assets comprises a single asset. In some embodiments of the computer-implemented method, the first set of assets comprises a plurality of assets.

In some embodiments, the computer-implemented method further comprises: receiving by the first trustless decentralized networked node from the first user a second user input for generating a second smart contract output based at least in part on the smart contract, wherein the second user input comprises one or more amendments to the first security interest; generating by the first trustless decentralized networked node the second smart contract output based at least in part on the smart contract and the second user input; transmitting by the first trustless decentralized networked node the second smart contract output to the trustless decentralized distributed networked node system comprising the plurality of trustless decentralized distributed networked nodes; and recording by the first trustless decentralized networked node the second smart contract output on the trustless decentralized distributed networked node system after receiving notification from a central authority that the second smart contract output is acceptable for recording on the trustless decentralized distributed networked node system.

In some embodiments of the computer-implemented method, the one or more amendments to the first security interest comprises extending a term of the first security interest. In some embodiments of the computer-implemented method, the one or more amendments to the first security interest comprises terminating the first security interest. In some embodiments of the computer-implemented method, the one or more amendments to the first security interest comprises correcting one or more details of the first security interest.

In some embodiments, the computer-implemented method further comprises dynamically generating and transmitting by the trustless decentralized distributed networked node system an electronic alert notification to the first user upon one or more triggering events. In some embodiments of the computer-implemented method, the one or more triggering events comprises one or more of a variation of a name of the owner of the first set of assets, change in the name of the owner of the first set of assets, or continuation date of the first security interest.

In some embodiments, the computer-implemented method further comprises dynamically generating and transmitting by the trustless decentralized distributed networked node system an electronic alert notification to the owner of the first set of assets user upon one or more triggering events. In some embodiments of the computer-implemented method, the one or more triggering events comprises one or more of additional security interests filed against the owner of the first set of assets or change in a name of the first user.

In some embodiments, a computer-implemented method for implementing a smart contract over a trustless decentralized distributed networked node system, the smart contract configured for performing one or more smart corporate actions on a smart corporate entity existing on the trustless decentralized distributed networked node system comprises: receiving by a first trustless decentralized networked node from a first user a first user input for generating a first smart contract output based at least in part on the smart contract configured for performing one or more smart corporate actions on the smart corporate entity existing on the trustless decentralized distributed networked node system, wherein the first user input comprises a first corporate action to be performed on the smart corporate entity, wherein the first user is assigned a first unique identifier by the trustless decentralized distributed networked node system, wherein the smart contract comprises a plurality of predetermined electronic actions configured to be automatically performed based on one or more triggering events, and wherein the smart contract is published on the trustless decentralized distributed networked node system and agreed upon by each of a plurality of trustless decentralized distributed networked nodes on the trustless decentralized distributed networked node system; generating by the first trustless decentralized networked node the first smart contract output based at least in part on the smart contract and the first user input, wherein the first smart contract output comprises a first smart corporate action on the first smart corporate entity existing on the trustless decentralized distributed networked node system; transmitting by the first trustless decentralized networked node the first smart contract output generated based at least in part on the smart contract to the trustless decentralized distributed networked node system comprising the plurality of trustless decentralized distributed networked nodes; and dynamically generating by the smart contract a second smart contract output based at least in part on the smart contract and the transmission of the first smart contract output to the trustless decentralized distributed networked node system, wherein the second smart contract output comprises a second corporate action to be performed on the first smart corporate entity, wherein the second smart contract output is generated without user input, wherein the first trustless decentralized networked node comprises a computer processor and an electronic storage medium.

In some embodiments of the computer-implemented method, the first smart contract output is transmitted to the trustless decentralized distributed networked node system over a private channel to enable sharing of private data over the trustless decentralized distributed networked node system. In some embodiments of the computer-implemented method, the first smart contract output is in encrypted form, and wherein the encrypted first smart contract output can be decrypted only by members of the private channel. In some embodiments of the computer-implemented method, the members of the private channel are determined by the smart contract.

In some embodiments of the computer-implemented method, the second smart contract output comprises transmission of an electronic communication to a second user on a second trustless decentralized networked node, wherein the electronic communication comprises one or more corporate documents generated dynamically by the smart contract in response to the transmission of the first smart contract output to the trustless decentralized distributed networked node system. In some embodiments of the computer-implemented method, the first and second trustless decentralized networked nodes are the same trustless decentralized networked node. In some embodiments of the computer-implemented method, the first and second trustless decentralized networked nodes are different trustless decentralized networked nodes. In some embodiments of the computer-implemented method, the electronic communication to the second user on the second trustless decentralized networked node is transmitted over a private channel to enable sharing of private data over the trustless decentralized distributed networked node system.

In some embodiments of the computer-implemented method, the first smart corporate action comprises one or more of incorporation of the smart corporate entity on the decentralized distributed networked node system, issuance of shares of the smart corporate entity on the decentralized distributed networked node system, transfer of shares of the smart corporate entity on the decentralized distributed networked node system, or updating one or more corporate documents of the smart corporate entity on the decentralized distributed networked node system.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIG. 11A is a flowchart illustrating an example embodiment(s) of private or controlled sharing of information on a distributed ledger through an independent secure channel;

FIG. 13A is a schematic diagram illustrating an example embodiment(s) of controlled sharing of information on a distributed ledger;

FIG. 13B is a schematic diagram illustrating an example embodiment(s) of controlled sharing of information on a distributed ledger;

DETAILED DESCRIPTION

Figure 1:
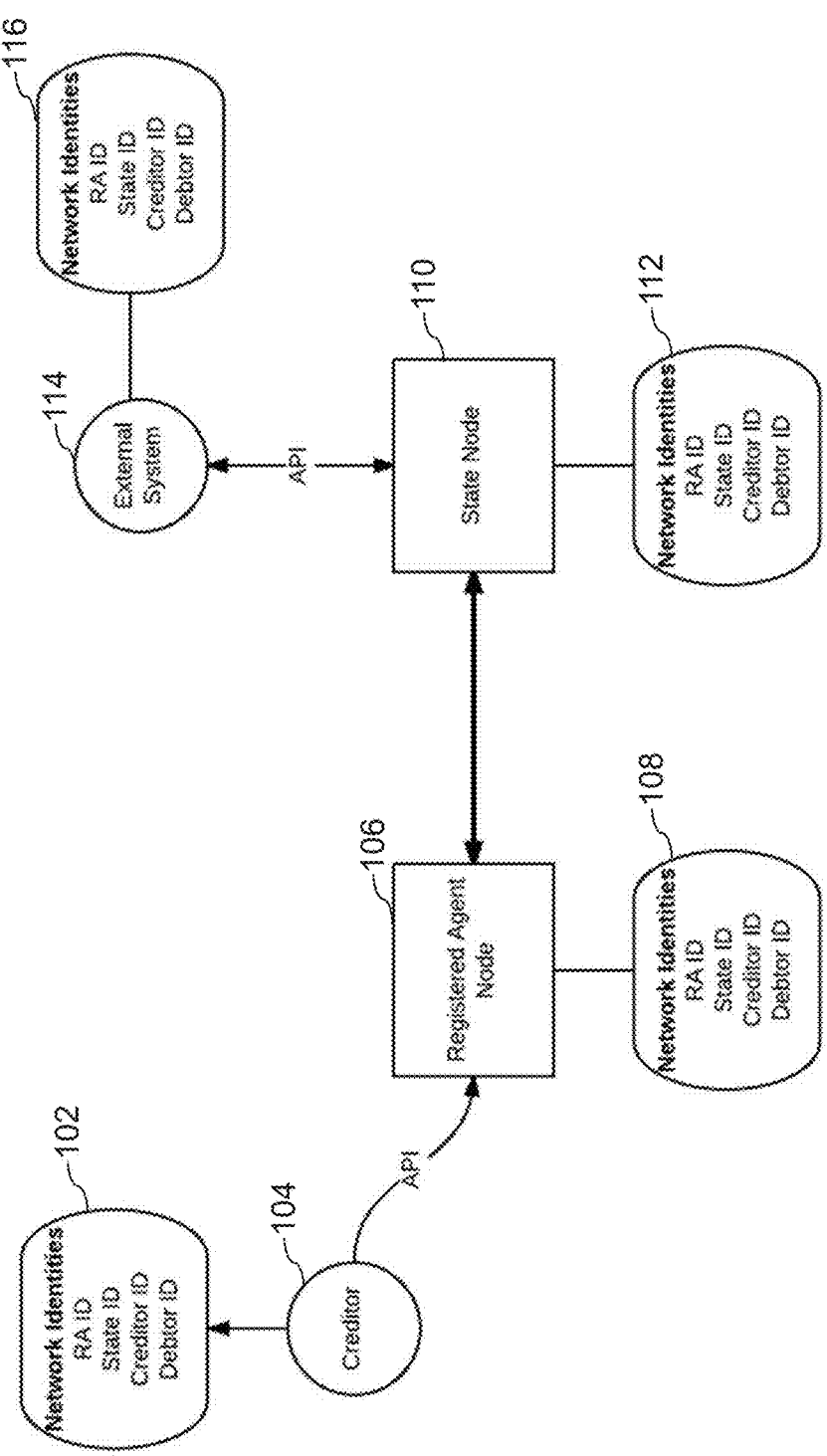
FIG. 1 is a schematic diagram illustrating an example embodiment(s) of a system comprising nodes and users that may be involved in a smart UCC system utilizing one or more smart contracts on a distributed ledger technology platform.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of some specific embodiments of the inventions.

In addition, embodiments of the inventions can comprise several novel features and no single feature is solely responsible for its desirable attributes or is essential to practicing the inventions herein described.

Smart Contract Implementations on a DLT Platform

In some embodiments, systems, methods, and devices disclosed herein are directed to implementations of smart contracts deployed on a distributed ledger technology (DLT) platform. In contrast to a traditional distributed system that may be managed by a single entity, a DLT platform, such as a blockchain network, can consist of one or more nodes that can be run by independent parties. At the same time, a DLT platform can ensure a single source of truth throughout the whole network, thereby providing a trustless distributed system. In particular, in some embodiments, smart contracts are computer programs that can be executed by independent parties on a DLT or blockchain network, producing shared states. As such, in some embodiments, the network of nodes and/or independent parties or users that form a blockchain or distributed ledger can maintain a shared state. In some embodiments, the ledger state and/or shared state can be generated by a sequentially consistent log of transactions, which can be processed independently and deterministically by all nodes within the network that come to an agreement on the current state of the system.

In some embodiments, the states created by a smart contract can be shared only with a subset of the parties and/or users on the DLT or blockchain network. For example, in some embodiments, the system can utilize one or more embodiments for private sharing of data on a trustless DLT platform as described herein. In other embodiments, the system can utilize one or more other technologies or processes.

As such, by generating and/or utilizing appropriate smart contracts, various implementations of smart platforms can be realized, thereby improving various technologies. For example, in some embodiments, one or more smart contracts and/or private data sharing technologies on a DLT platform can be utilized to track and/or manage various submissions over a multi-nodal decentralized network topology. As a non-limiting example, in some embodiments, implementation of one or more specific smart contracts and/or private data sharing technologies on a DLT platform can provide frameworks and/or solutions to generate a smart UCC platform that facilitates submission and tracking of Uniform Commercial Code (UCC) filings on a distributed ledger or blockchain platform as further described herein. Further, in some embodiments, implementation of one or more specific smart contracts and/or private data sharing technologies on a DLT platform can provide frameworks and/or solutions to generate a smart company platform for controlling, managing, and/or communicating company documents and/or communications on a distributed ledger or blockchain platform as further described herein.

In some embodiments, one or more smart contracts, such as those on a smart UCC platform and/or a smart company DLT platform, can comprise one or more conditional transactions, meaning a transaction can automatically and/or dynamically occur conditioned upon certain event(s). Further, in some embodiments, one or more smart contracts, such as those on a smart company DLT platform or smart UCC platform, can line up such conditional transactions in an organized workflow in a decentralized shared logic. In some embodiments, the smart UCC platform and/or smart company platform can be byzantine fault tolerant.

UCC Smart Contract Implementations on a DLT Platform

In particular, in some embodiments, systems, methods, and devices are provided that can be configured generate and/or utilize one or more smart contracts specifically written and/or structured to perform the specific function of facilitating submission and/or tracking of UCC filings on a DLT platform. In some embodiments, UCC filings and their associated processes are implemented as one or more smart contracts on a DLT platform.

A UCC filing can refer to a lien made by a creditor against the asset(s) of a debtor. In other words, a UCC filing generally comprises a collateral claim and/or security interest. A UCC is generally filed with a State in which the debtor is incorporated, but a UCC may be filed in one or more jurisdictions. Filing with the State has traditionally been the canonical and legally valid form of the UCC filing. Generally speaking, UCC filings are public filings. But once a UCC is filed, traditionally there has been nothing to prevent a third party from changing the status of the filing; the State generally has no responsibility to manage or govern the filings that affect change to existing UCC filings. For example, under existing UCC filing frameworks, any third party could potentially submit a UCC-3 filing to affect change to an existing initial UCC-1 filing without knowledge of the party that filed the initial UCC-1.

This problem can arise from the existing framework of UCC filings; generally, a user can either submit a UCC filing by paper and/or electronically. Regardless of the type of filing, however, existing UCC submission and management systems generally simply store an image of the filing on a computer database. More specifically, for a paper filing, a State system can photocopy or scan the paper filing for storage. Even for an electronic filing, existing State systems generally effectively convert the electronic filing to an image, thereby losing all the semantics of the electronic filing, and electronically or otherwise store the resulting image. However, by doing so, all the metadata, formatting, and/or logical operations on the metadata can be lost.

In order to address such technical shortcomings of existing UCC filing and management systems, in some embodiments, systems, methods, and devices described herein can provide a Smart UCC platform, which can be configured to utilize UCC filings and/or associated processes implemented as one or more smart contracts on a DLT or blockchain platform. By doing so, in some embodiments, systems, devices, and methods described herein can provide the processing power to analyze and/or crunch the metadata on UCC filings.

As such, in some embodiments, systems, methods, and devices described herein provide a deployment model of one or more Smart UCCs for a DLT or blockchain platform. In some embodiments, systems, methods, and devices described herein provide a workflow for Smart UCC filings, tracking, and/or management. In some embodiments, systems, methods, and devices described herein related to Smart UCCs meet the existing privacy requirements for UCC filings. In some embodiments, systems, methods, and devices described herein directed to Smart UCCs can provide: (1) data validation; (2) authentication of the creation of a filing; (3) automation of corporate actions such as follow-on UCCs (that is, a subsequent UCC that affects the status of the lien against the asset filed as collateral in the UCC-1); (4) tracking whether an asset has a lien against it; and/or (5) getting a complete view of all liens and/or security interests related to a single corporation or legal entity.

In some embodiments, systems, methods, and devices described herein can be configured to alert a UCC filer or other related party when any or a material change occurs to the filing and/or asset(s) the initial filing was based on. In other words, in some embodiments, a smart contract written specifically for facilitating the submission and tracking of UCCs can comprise a set of rules that trigger an alert to be dynamically generated and transmitted if and when certain events or change in state occur with respect to a previous UCC filing(s) and/or asset(s) the filing(s) was based on. In some embodiments, when there is a material change, the smart contract can be configured to facilitate a UCC filing(s), track the filing(s), know the state of the filing(s), and/or dynamically generate and/or transmit an alert to a UCC filer or related party that may require a proactive consent from the recipient if and when a specific change has occurred. In some embodiments, a smart contract(s) on which a Smart UCC system can be based can include a list of one or more material changes that may trigger such generation of an alert and/or type of alert to be generated depending on the change.

Further, in some embodiments, systems, methods, and devices described herein for submitting and tracking UCC filings can guarantee synchronization between the one or more Smart UCC filings on the DLT or blockchain platform and an external system administered by a central authority, such as a state, in which the UCC is filed. In other words, in some embodiments, systems, methods, and devices described herein can enable integration and/or synchronization between a central authority's existing and/or external system and the Smart UCC system on a DLT platform. In some embodiments, a smart UCC filing can include one or more jurisdictions or states that the filing is submitted to. For example, these can be at the state, city and/or county level.

In some embodiments, systems, methods, and devices described herein for submitting and tracking UCC filings can be configured to provide one or more cryptographic authentication or authorization processes associated with UCC actions, as opposed to existing UCC platforms. For example, by providing a smart UCC platform on a DLT or blockchain, in some embodiments, the system can require authentication or authorization of a user and/or action, thereby preventing third parties from filing subsequent UCC filings that may affect pre-existing UCC filings such as on traditional UCC systems. In some embodiments, by providing a smart UCC platform on a DLT or blockchain, UCC filings and related actions can be made irrevocable and irrefutable, require digital signatures, utilize cryptographic authentication, auditable by any node or user on the DLT network.

Furthermore, in some embodiments of systems, methods, and devices described herein for submitting and tracking UCC filings, the DLT platform or blockchain can be the primary substantiation of the UCC as opposed to an open system, such as the existing system used by the State of Delaware. In other words, as opposed to using a DLT or blockchain as a secondary backup system to an existing or external system, in some embodiments herein, a smart UCC platform on a DLT or blockchain can be canonical and/or primary substantiation of the UCC. In addition, in some embodiments, one or more smart contracts deployed on the DLT or blockchain platform can be configured to automate certain actions or corporate actions associated with the UCC. For example, in some embodiments, a smart UCC platform can be configured to provide automated renewals.

In some embodiments, a smart UCC platform can provide a unified, distributed, and valid view of UCC filings, compared to certain existing UCC systems which may comprise a single, invalid view. In other words, in some embodiments, a smart UCC platform can cryptographically relieve responsibility for an invalid view of UCC filings and ensure validity of all existing UCC filings.

In some embodiments, a smart UCC platform can allow tracking of an asset, as opposed to UCC filings. In other words, it can be possible to track, query, and/or retrieve all UCC filings that have been made on a particular asset or a particular owner. Similarly, the complete history of filings on a particular asset and/or owner and the current state thereof can be easily traceable and/or retrievable in some embodiments.

More specifically, in some embodiments, a UCC filer may initiate filing of a UCC on a smart UCC platform that is deployed on a DLT platform. The smart UCC platform can comprise one or more smart contracts that are configured to facilitate filings, management, and/or tracking of UCCs, including one or more automated processes. For example, in some embodiments, the system may display a user interface in which the user can be prompted to insert one or more descriptions and/or input for the UCC filing, such as the asset(s) which is the subject of a lien, term, conditions, or the like. In some embodiments, the system can be configured to assign a unique identifier to the user and/or the asset or collateral and/or the proposed UCC filing. The same unique identifier assigned to the asset or collateral can be used throughout the smart UCC platform for any other filings on that asset or collateral. Further, the proposed UCC filing can be assigned a universal timestamp for tracking purposes.

In some embodiments, a single smart UCC filing can comprise one or more assets or one or more entire asset classes, such as in the case of specifying "all inventory." In some embodiments, discrete units of inventory may have unique identifiers. Also, in some embodiments, it can be possible to put conditions, such as date ranges for production or a fractional interest in a given asset.

As such, in some embodiments, it can be possible to track any and all filings on a particular asset(s) or collateral using a unique identifier for the asset(s) or collateral. This can be a substantial technical improvement over existing UCC systems that do not track the asset or collateral itself. Rather, existing UCC systems generally track individual pieces of paper or the UCC filings that tie back to the underlying collateral in a roundabout way. In some embodiments described herein, however, it can be possible to track the state of the collateral or asset in real-time as opposed to tracking the individual UCC filings.

Further, in some embodiments, it can be possible to search for an asset(s) owner, such as a company or individual. In some embodiments, in response to such search, the system can be configured to generate a single consolidated view of all of a particular owner's registered assets and security interests that have been claimed on those assets. In addition, in some embodiments, such consolidated view can include other obligations of the debtor or asset(s) owner, using data from one or more databases, which can include other official and/or government systems. For example, in some embodiments, the system can be configured to generate a consolidated view of an owner of an asset(s) that can also include unpaid taxes, whether state or federal, employee benefit liabilities, environmental cleanup liabilities, child support, ERISA, or the like. In addition, in some embodiments, a consolidated view can also include policy of one or more courts with jurisdiction over a particular matter or obligation of the asset owner, such as for example a general policy or trend of a court in a bankruptcy proceeding in case the asset owner goes bankrupt.

In some embodiments, an owner of an asset(s) can include an individual, corporation, company, organization, partnership, group of individuals or the like. For example, an asset owner can be a series within a Series LLC or a person under special provisions, such as consumer transactions. In addition, in some embodiments, the smart UCC system can be configured to pull names and/or other personal information of an asset owner from state driver's license databases or the like. In some embodiments, the smart UCC platform can be configured to search and retrieve from one or more databases, such as state driver's license databases, official records, financial databases, all known aliases of an individual and/or related information.

In some embodiments, the smart UCC platform can be configured to automatically review and/or reject certain filings. For example, if a subsequent UCC filing is proposed that is in conflict with a pre-existing and valid UCC filing, for example because they are on the same asset or collateral, the system can be configured to automatically reject the subsequent UCC filing by tracking the state of the asset or collateral before recording on the DLT.

In some embodiments, when a user or registered agent (RA) proposes a UCC filing, the smart UCC platform can be configured to automatically review, accept, and/or reject the proposed filing, for example for compatibility and/or other requirements built into the smart contract. Further, in some embodiments, when a user proposes a UCC filing, the smart UCC platform can be configured to transmit the proposed UCC filing to the State or a State node on the platform for review and/or approval. In some embodiments, once the State or State node approves or acknowledges a proposed UCC filing, an acknowledge message, either encrypted or decrypted, can be sent out to all of the nodes on the Smart UCC filing or DLT platform. In some embodiments, this can provide the State an opportunity to protect a transaction before it gets broadcasted to the network, for example due to some private information that is only available to the State.

In some embodiments, a proposed UCC filing is broadcasted and recorded on the smart UCC platform or DLT network, either privately or publicly, as described in more detail below. If the State rejects the proposed UCC filing, then in some embodiments, the State node can broadcast a decline acknowledgement, which can comprise code for reverting the filing, which can subsequently update the state of the proposed filing on every node on the network. Conversely, if the proposed UCC filing is accepted, in some embodiments, the State node can broadcast an acknowledgement, which can update the state of proposed filing accordingly on every node on the network. In some embodiments, the state accepts all proposed UCC filings.

In some embodiments, State approval is not required. In some embodiments, State approval requires only an acknowledgement or check. In some embodiments, through a synchronization process, the proposed UCC filing can be posted to the State's existing or external database of UCC filings. In some embodiments, a proposed UCC filing can be transmitted just to the State node and/or all of the other nodes on the network for review and/or approval. In some embodiments, the State and/or other node(s) on the network can cryptographically sign off on a proposed UCC filing as desired.

In some embodiments, if or only if a proposed UCC filing meets the review or approval process, which can be automated and/or manual, either by one or more smart contracts on the DLT or an external system, the proposed UCC filing can be written onto the DLT or smart UCC platform operating on the DLT. In some embodiments, the posting and/or validity of a UCC filing(s) can be conditioned on acceptability of the UCC filing, for example based on legal requirements built into the smart UCC platform and/or the State's existing second line database.

In some embodiments, the proposed UCC filing and/or application can be private among the necessary actors, for example by utilizing one or more private data sharing techniques described herein in connection with DLT platforms, and/or entirely public. In some embodiments, a privately proposed UCC filing can subsequently be made public upon acceptance and/or publication on the smart UCC platform or DLT platform, for example through one of more techniques described herein in connection with changing membership of privately shared data on a DLT platform. In some embodiments, a publicly proposed UCC filing can subsequently be made private upon acceptance on the smart UCC platform or DLT platform, for example through one of more techniques described herein in connection with changing membership of privately shared data on a DLT platform. In some embodiments, a UCC filing, whether proposed or accepted, can always be privately shared among certain actors, but still be verifiable or auditable, for example by utilizing one or more private data sharing techniques described herein in connection with DLT platforms. In some embodiments, a UCC filing, whether proposed or accepted, can always be public on the DLT.

In some embodiments, regardless of whether the proposed and/or accepted UCC filing is private or public, each and every node and/or user on the smart UCC platform or DLT platform can receive a message that can form a log of messages. If a particular node or user is meant to be privy to a certain proposed and/or accepted UCC filing, the message to that node or user for that UCC filing can be unencrypted or decrypted by the user or node. However, if a particular node or user is not meant to be privy to a certain proposed and/or accepted UCC filing, the message to that node or user for that UCC filing can be encrypted and not be decrypted by that node or user. In other words, in some embodiments, only those nodes and/or users with the appropriate exclusive permission can be able to decrypt messages, while all nodes and/or users can still receive encrypted versions of all messages such that an identical log of messages is stored on the DLT platform with identical timestamps.

As such, in some embodiments, a proposed UCC filing can be accepted and/or recorded on every node on the smart UCC filing or DLT platform. In some embodiments, once a UCC filing is made on the smart UCC platform operating on a DLT platform, it can be possible for any and every user and/or node on the platform to have the same, unified view of the UCC filing(s), thereby providing a unified and trusted system without a centralized trusted actor.

In some embodiments, the smart UCC platform can be configured to allow a user to file an amendment to an existing UCC filing. In other words, one or more smart contracts of the smart UCC platform can allow for amendments to be made to a pre-recorded smart UCC filing. In some embodiments, the system can allow for an existing smart UCC filing to be amended for a variety of reasons, such as for extending the term of a claim, terminating a claim, correcting one or more details, such as a name change for example, or the like.

In some embodiments, the smart UCC platform can be configured to track and/or monitor the status of smart UCC filings, claims, assets, asset owners, and/or any other detail of a smart UCC filing. In some embodiments, the smart UCC platform can be configured to utilize external data from one or more other databases, such as those maintained by the State or other agency. As a non-limiting example, in some embodiments, the system can be configured to track legal entity name changes and/or corporate actions or the like, for example from receiving notifications from a state office(s). In addition, in some embodiments, the system can comprise one or more oracles that can track the value of collateral in real-time or in substantially real-time. In some embodiments, an oracle can refer to a party that is trusted to feed in a specific type of correct information.

In some embodiments, the smart UCC platform can be configured to automatically perform certain actions based on predetermined triggers. For example, in some embodiments, when a user proposes a UCC filing on an asset(s) on which a security interest or previous filing exists, the system can be configured automatically reject such filing or prevent such filing from ever being submitted to the network, thereby preventing duplicate interests from being taken on a single asset. However, in certain situations, there may be legitimate reasons to allow duplicate interest from being taken on a single asset. As such, in some embodiments, a second security interest being proposed to be recorded on an asset already claimed can be sent to the network and/or acknowledged by a central authority. In some embodiments, the system can then be configured to dynamically generate and transmit an alert to the original lien holder who submitted the previous security interest on the same asset.

In some embodiments, the smart UCC platform can be configured to dynamically generate and/or transmit alerts to one or more related parties, which can be triggered by certain predetermined events. For example, in some embodiments, the system can be configured to automatically generate and transmit an alert to a creditor(s) whenever an additional filing is made or proposed against an asset that they already claimed a security interest in. Further, in some embodiments, if a proposed security interest is rejected or prevented from being broadcasted to the network, the system can be configured to automatically generate and transmit an alert to the user that proposed the security interest.

Further, in some embodiments, the smart UCC platform can be configured to dynamically generate and/or transmit alerts to one or more related parties, which can be triggered by certain predetermined events while tracking an existing UCC filing. For example, in some embodiments, upon filing of a UCC-1 Financing Statement ("UCC-1"), the system can be configured to dynamically and/or immediately notify the filer if there is any variation from debtor's name in the state's records and/or highlighting the differences. In some embodiments, upon filing of a UCC-1, the system can be configured to dynamically and/or immediately notify the debtor and to all other secured parties of record with filings against this debtor, in which the notification can comprise additional information such as a description of collateral, nature of filing (e.g., consignment), or the like.

In some embodiments, the system can be configured to dynamically and/or automatically notify the continuation date of a UCC-1 filing, such as six months in advance of the lapse date, to a secured party of record for a filing. In some embodiments, the system can be configured to automatically and/or dynamically notify any debtor name changes to all secured parties of record with filings against this debtor. Such debtor name change notices can be made by the system immediately upon occurrence and can highlight the change. In some embodiments, the system can be configured to automatically and/or dynamically notify any secured party name changes to the debtor and all secured parties of record with filings against this debtor. Such secured party name change notices can be made by the system immediately upon occurrence and can highlight the change.

In some embodiments, whenever there is an addition of a debtor or secured party to a UCC-1 filing, the system can be configured to dynamically and/or automatically notify the debtor and all secured parties of record with filings against this debtor, for example immediately upon occurrence. In some embodiments, whenever a change in collateral description occurs, the system can be configured to dynamically and/or automatically notify the debtor and all secured parties of record with filings against this debtor, for example immediately upon occurrence. In some embodiments, such notification of a change in collateral description can comprise a redline against the former description to highlight the change.

In some embodiments, whenever a debtor or secured party is removed from a security filing, the system can be configured to automatically and/or dynamically notify the debtor and all secured parties of record with filings against this debtor, for example immediately upon occurrence. In some embodiments, whenever a UCC-1 filing is assigned to another party, the system can be configured to automatically and/or dynamically notify the debtor and all secured parties of record with filings against this debtor, for example immediately upon occurrence and/or identifying the old and new secured party.

In some embodiments, whenever a UCC-1 filing is lapsed, the system can be configured to automatically and/or dynamically notify the debtor and all secured parties of record with filings against this debtor, for example immediately upon occurrence. In some embodiments, whenever a UCC-1 filing is terminated, the system can be configured to automatically and/or dynamically notify debtor and all secured parties of record with filings against this debtor. Such notification of UCC-1 termination can be made by the system immediately upon occurrence and/or immediately upon filing of a continuation or amendment of the terminated financing statement and/or identifying date on which termination was filed and by whom.

In some embodiments, whenever there is an address change or change in other information of a debtor or secured party, the system can be configured to automatically and/or dynamically notify the debtor and all secured parties of record with filings against this debtor, for example immediately upon occurrence. In some embodiments, the address change or change in information of a debtor or secured party can be dynamically and/or automatically detected and/or retrieved by the system querying one or more other databases, such as a state-maintained database, for these types of events. In some embodiments, whenever a debtor is reincorporated or removed to another jurisdiction, the system can be configured to automatically and/or dynamically notify all secured parties of record with filings against this debtor, for example immediately upon occurrence. In some embodiments, whenever a debtor's good standing lapses, the system can be configured to automatically and/or dynamically notify the debtor and all secured parties of record with filings against this debtor, for example immediately upon occurrence. In some embodiments, if a relevant state has a procedure for reinstatement of erroneously terminated UCC-1 filings, the system can be configured to automatically and/or dynamically notify the debtor and all secured parties of record with filings against this debtor.

In some embodiments, the system can be configured to automatically and/or dynamically notify all secured parties of record of rejection of a filing of UCC-1 financing statement. In some embodiments, the system can be configured to automatically and/or dynamically notify all secured parties of record of changes in the state's search logic or filing criteria. In some embodiments, the system can be configured to automatically and/or dynamically provide a link to fixture filings of the same debtor, even if in another state.

Additional Details of UCC Smart Contract Implementations on a DLT Platform

In some embodiments of a smart UCC platform and/or a smart UCC filing, one or more parties can be involved, such as: (1) the party on whose behalf the UCC is being filed (the "Creditor"); (2) the party against whom the Creditor is filing the UCC (the "Debtor"); (3) the filing party (the "Registered Agent"); and (4) the State or other central authority, such as the State in which the debtor is incorporated with which the UCC is to be filed (the "State").

FIG. 1 is a schematic diagram illustrating an example embodiment(s) of a system comprising nodes and users that may be involved in a smart UCC system utilizing one or more smart contracts on a distributed ledger technology platform. As illustrated in FIG. 1, in some embodiments of a smart UCC platform, the Registered Agent 106 and State 110 can each run a node in the DLT or blockchain network, such as a Registered Agent Node or State Node respectively, while the Creditor 104 can be an API client of the Registered Agent 106. Additionally, in some embodiments, the State node 110 can connect to its external system for administering UCCs (the "External System") 114 via an API, where the External System 114 can contain the UCCs in their legally valid and canonical form. In some embodiments, at each of the Creditor 104, Registrant Agent Node 106, the State Node 110, and External System 114 can each comprise and/or maintain one or more network identities 102, 108, 112, 116, which can include one or more Registered Agent ("RA") IDs, State IDs, Creditor IDs, and/or Debtor IDs.

In some embodiments, independent parties and/or users in the DLT or blockchain network can publish messages to the DLT or blockchain network. In some embodiments, a user in the DLT or blockchain network is identified by a unique public identity on the network (also referred to as its "network identity"). In some embodiments, a network identity should meet the following criteria: (1) it should be possible to verify the authenticity of a message purported to be from a network identity; (2) it should be possible to share information privately with the network identity (e.g., a cryptographic public key); and (3) every network identity should be able to see every other network identity.

In some embodiments, a Creditor 104, Debtor, Registered Agent 106, and State 110 each have a network identity. However, currently, the State of Delaware does not include authentication for UCC filings, which has in the past resulted in spurious UCC filings. To address such shortcomings, in some embodiments described herein, the authenticity of messages published by network identities on a DLT or blockchain network can be verified by means of verification of cryptographic signatures on those messages. For example, as illustrated in FIG. 1, in some embodiments, a smart UCC platform can be configured to utilize one or more network identities 102, 108, 112, 116 to authenticate messages and share information privately.

Figure 2A:
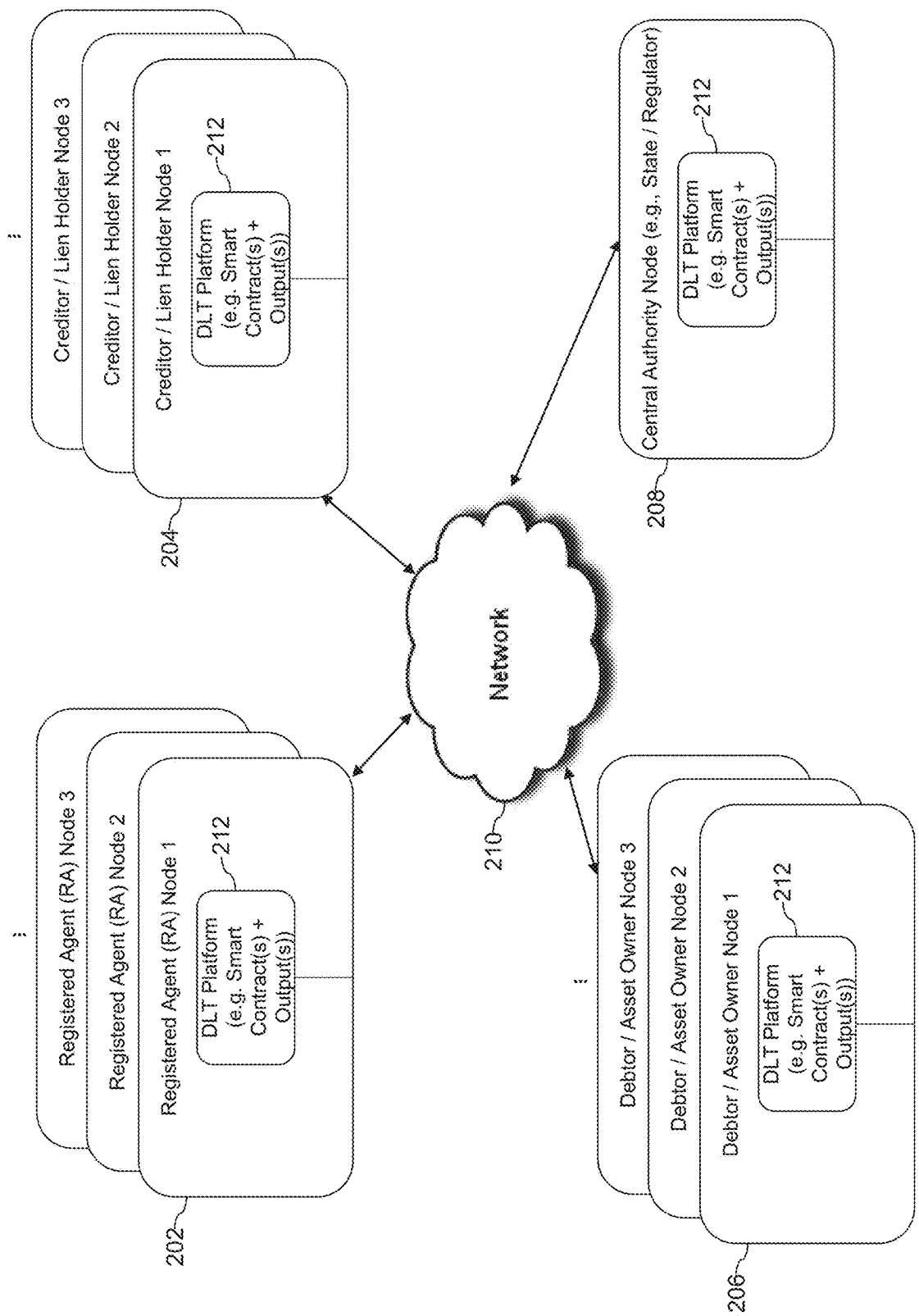
FIG. 2A is a schematic diagram illustrating an example embodiment(s) of a system comprising nodes and users that may be involved in a smart UCC system utilizing one or more smart contracts on a distributed ledger technology platform.
Figure 2B:
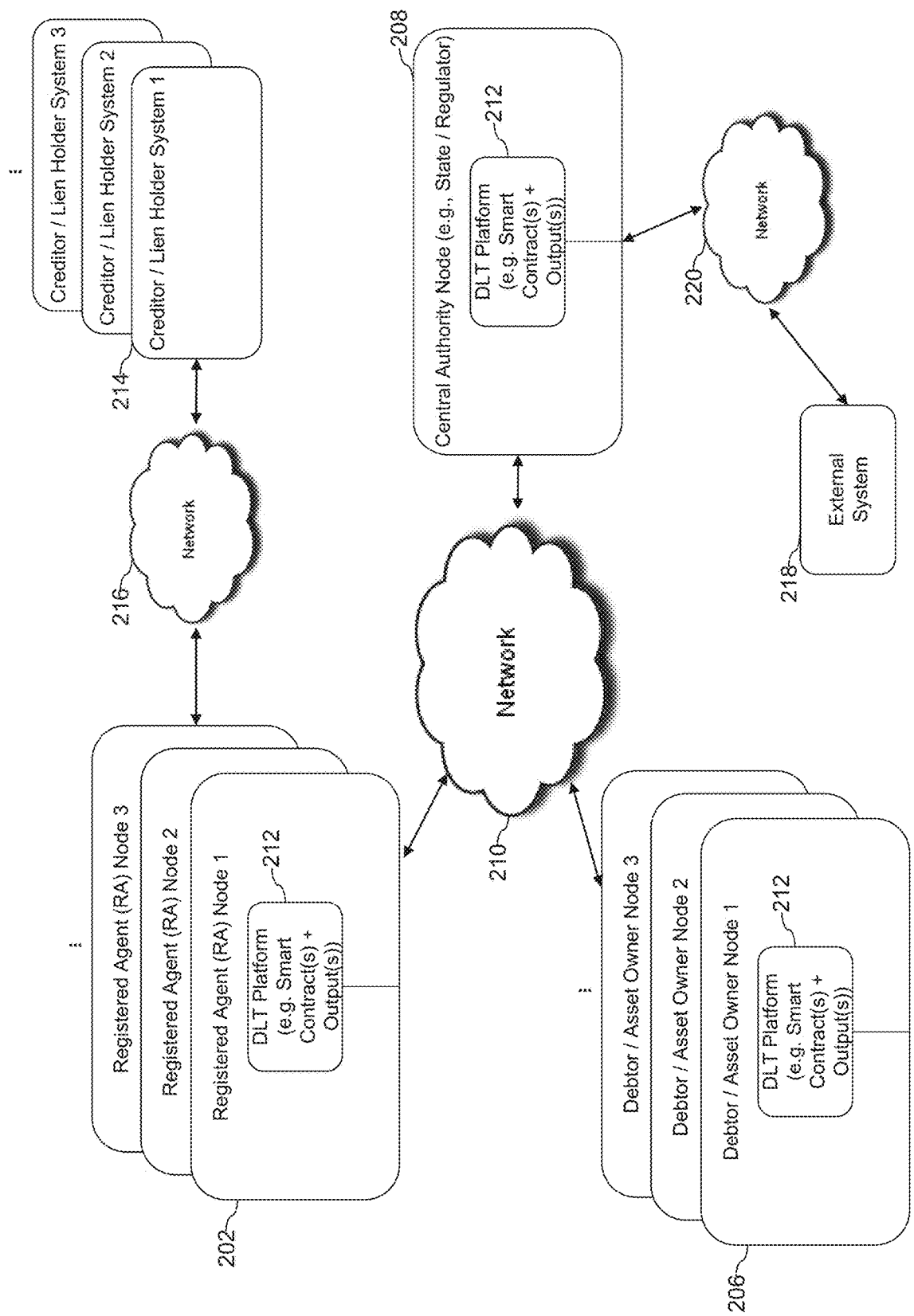
FIG. 2B is a schematic diagram illustrating an example embodiment(s) of a system comprising nodes and users that may be involved in a smart UCC system utilizing one or more smart contracts on a distributed ledger technology platform.

FIGS. 2A and 2B are schematic diagram illustrating example embodiments of a system comprising nodes and users that may be involved in a smart UCC system utilizing one or more smart contracts on a distributed ledger technology platform. As illustrated in FIG. 2A, in some embodiments, a smart UCC platform can comprise one or more registered agent (RA) nodes 202, one or more creditor/lien holder nodes 204, one or more debtor/asset owner nodes 206, and/or a central authority node 208, which can be in communication with one another through a network 210. In some embodiments, one or more of the RA node(s) 202, creditor/lien holder node(s) 204, debtor/asset owner node(s) 206, and central authority node 208, such as a state or regulator node, can comprise a DLT platform 212 on which the smart UCC platform, one or more smart contracts and smart contract outputs thereof, and/or one or more private data sharing channels may be implemented. In some embodiments, the DLT platform 212 can be configured to facilitate the filing, tracking, management, communications, notifications, or the like of the smart UCC platform as described herein.

As illustrated in FIG. 2B, in some embodiments, one or more creditor/lien holder systems 214 may not comprise a DLT platform. Rather, the one or more creditor/lien holder systems 214 can be configured to communicate with one or more RA nodes 202 comprising a DLT platform 212 through a separate network 216, for example through an API. As such, in some embodiments, one or more creditor/lien holder systems 214 may not be on the DLT itself. Further, in some embodiments, a central authority node 208 can be configured to maintain a separate external system 218 as described above. In some embodiments, the separate external system 218 can be in communication with the central authority node 208 through a separate network connection 220, such as an API, for example for purposes of maintaining legally valid versions of the UCC filings. In some embodiments, the smart UCC filings on the DLT itself can be the legally valid and canonical version of the filings.

Generally speaking, a UCC filing must contain certain information, which may vary State-by-State, in order to be considered valid. As such, in some embodiments, the data model for a smart UCC filing contains all of the necessary parameters to meet the associated requirements of the State in which it is being filed. In fact, in some embodiments, the smart UCC platform can comprise one or more smart contracts to ensure that only those filings that include all of the required information for the state in which the UCC is to be filed, are submitted for filing. In other words, in some embodiments, the smart UCC platform can prevent or reject non-complying filings from being submitted. In some embodiments, the smart UCC platform can also contain additional fields that are not legally required as part of the UCC filing, such as a field to confirm whether to automatically extend the lien, in contrast to existing systems.

In some embodiments, network identities can be assigned to one or more creditors, one or more debtors, one or more registered agents, and/or one or more States, all of whom may see the Smart UCC filing(s), as being part of the DLT or smart UCC platform. In practice, however, there can be additional network identities in the DLT or blockchain network with which a UCC filing(s) should not be shared. As such, some embodiments allow selective and/or private sharing of data with certain network identities on a smart UCC filing or DLT platform, for example by utilizing one or more private data sharing techniques on a DLT as described herein. In some embodiments, any smart UCC filing which uses the privacy-preserving techniques described herein may also be made without preserving privacy if need be.

In some embodiments, one or more smart UCC filing, tracking, management, and/or notification processes described herein can be configured to utilize one or more network topologies or systems illustrated in FIGS. 1, 2A, and 2B. In some embodiments, the systems, devices, and methods herein can be modified to accommodate other network topologies or systems.

An example embodiment(s) of a smart UCC filing is described below. In some embodiments, a smart UCC-1 filing can be initiated when a Creditor makes a request to the Registered Agent's node via the API client of the Registered Agent to file a UCC-1 against the Debtor. In some embodiments, the Registered Agent makes a request to file a smart UCC-1 on the Creditor's behalf, which it broadcasts to the blockchain network. In some embodiments, the Registered Agent prescribes that only the Creditor, Debtor and State can process the request; these network identities can be called the "Smart UCC-1 Group" (or the "Group").

In its current operations, the State of Delaware, for example, may process a UCC without performing any validation, and consequently have to mark the UCC filing as invalid post facto. By contrast, in some embodiments, an invalid Smart UCC filing will be rejected as such ante facto. In some embodiments, when processing a request to file a Smart UCC-1, the filing is validated against the rules for filing a Smart UCC-1 in the smart contract. For example, validation checks can include ensuring that, for example, necessary parameters are provided and that the parameters that are provided are correctly formatted, and in addition, that the transaction signature is valid. In some embodiments, if any of the validation checks fails, the Smart UCC-1 Group can reject the Smart UCC-1 filing as invalid. In contrast, in some embodiments, if all of the validation checks pass, the Group can mark the filing as valid, putting the Smart UCC-1 in an "unfiled" state. Moreover, in some embodiments, every member of the Smart UCC Group can validate the Smart UCC filing request independently. Put differently, in some embodiments, the entire Group can mark a Smart UCC filing as either valid or invalid. In other words, all members of Smart UCC Group can have the same view of the state of the Smart UCC filing in some embodiments.

In some embodiments, once the Smart UCC-1 is marked as "unfiled," the State node sends a message via an API to the External System, which includes the necessary fields for filing a UCC-1. In some embodiments, if the Smart UCC-1 contains a superset of the fields that can be processed by the External System, the additional fields can be removed before the message is sent, so as to ensure compatibility.

In a traditional UCC filing, the State may have to provide an endorsement, known as its "imprimatur," in order for the UCC to be legally filed. In some embodiments described herein, the concept of a "cryptographic imprimatur" for a Smart UCC filing can be provided. In some embodiments, when the message containing the UCC-1's information is received by the External System, the State provides its imprimatur and the UCC is entered into the External System. In some embodiments, a message is then sent from the External System to the State's node, acknowledging the receipt of the UCC filing. In some embodiments, the State network identity then makes a request to put the Smart UCC in a "filed" state. In doing so, in some embodiments, the State network identity provides a signature using the private key corresponding to its network identity's public key, thereby providing a "cryptographic imprimatur." In contrast to traditional electronic or wet signature, a cryptographic imprimatur's authenticity can be cryptographically verified. In some embodiments, this request is broadcast to the network, and is in turn processed by the Group. In some embodiments, the Smart UCC-1 is now in a "filed" state, thereby completing the filing.

Generally speaking, a UCC-1 filing records a claim of a Creditor against a Debtor's assets. Over time, the claim may change. According to the current operations, in order to effect changes to a claim, a "follow-on" UCC may have to be filed by a Registered Agent, referencing the original UCC-1 filing, which includes the asset against which the Creditor has a claim. In some embodiments, the Smart UCC platform can comprise one or more processes for automating and tracking the filing of follow-on UCCs from a Smart UCC-1, and allowing tracking of the underlying asset(s).

In some embodiments, the parameters to a Smart UCC filing are defined in the Smart UCC filing's data model. As stated above, in some embodiments, a Smart UCC filing contains the necessary parameters to be considered valid by the State in which it is being filed. The data model can include additional parameters in order to automate corporate actions associated with a given Smart UCC filing. In that case, in some embodiments, the Smart UCC filing is stripped of any fields which the External System cannot process. Put differently, in some embodiments, fields which cannot be processed by the External System can be added in the Smart UCC filing.

As described above, in some embodiments, it is possible to track the state of a particular collateral or asset, unlike in existing UCC systems. In particular, in some embodiments, the assets against which a lien is being made are parameters to a UCC filing. In current operations, in order to determine whether there is a lien against an asset that a debtor proposes to use as collateral in order to receive a loan from a prospective creditor, the latter may need to (1) search for the debtor in the UCC database; (2) retrieve a full list of the debtor's outstanding UCCs; and (3) read the parameter detailing the collateral associated with the UCC. In current operations, one reason the above described process exists is that assets which are used as collateral have no ledger state within a UCC filing.

In contrast, in some smart UCC systems described herein, whether there is a lien on an asset can be tracked in real-time. Specifically, in some embodiments, the debtor can use a smart contract to issue an asset to be used as collateral on the DLT or blockchain platform. In some embodiments, when it is issued, the asset has a globally unique ID. In some embodiments, when filing a Smart UCC, the creditor can use the asset's ID as the parameter to specify which asset the creditor is creating a lien against. In some embodiments, when a Smart UCC has been filed according to the process described above, the asset's state will be updated to reflect that there is a lien against it. In some embodiments, if another creditor tries to file a lien against the same asset, an error will be raised ante facto.

Figure 3:
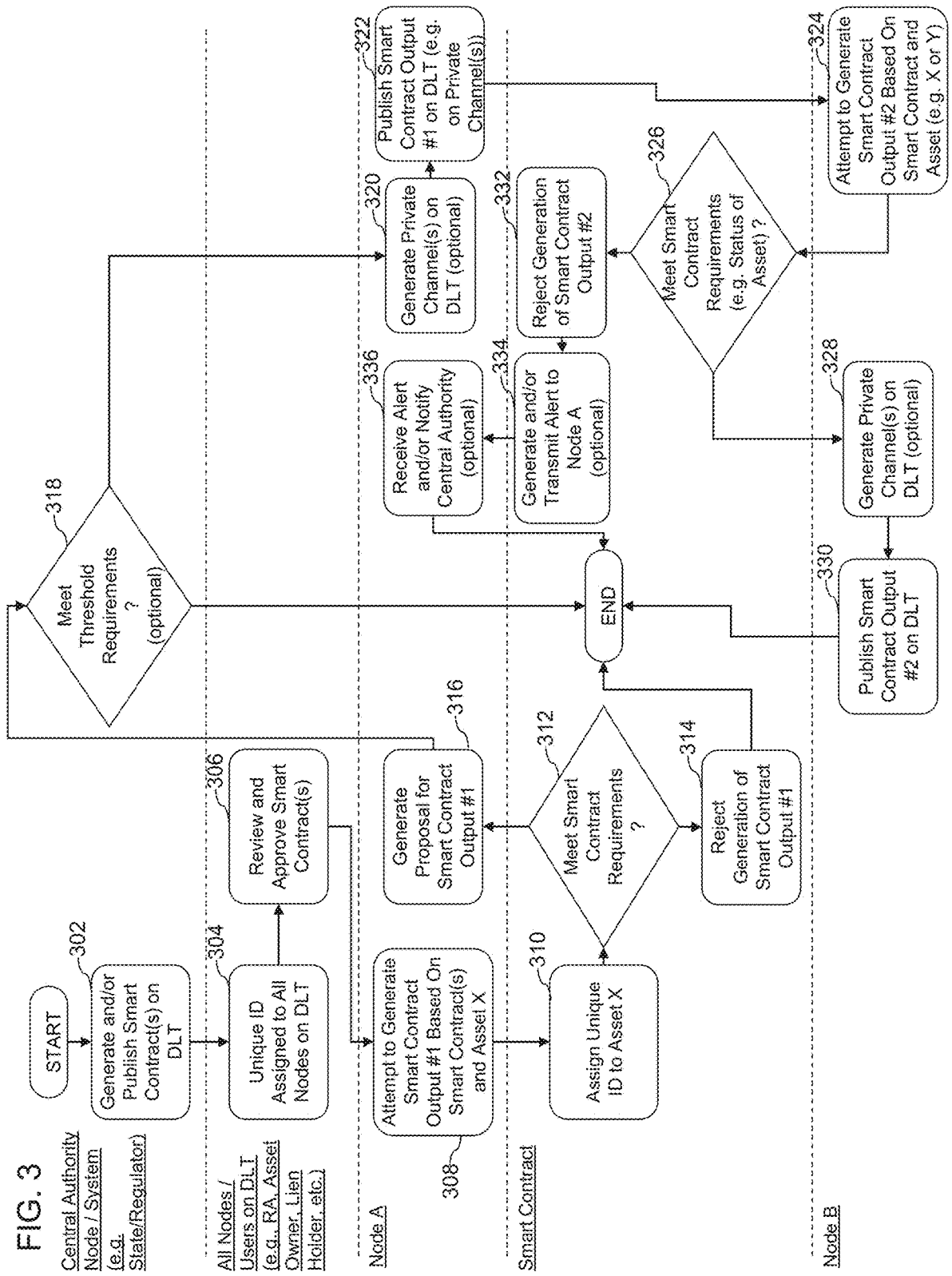
FIG. 3 is a flowchart illustrating an example embodiment(s) of submitting, tracking, and/or managing a smart UCC filing(s) utilizing one or more smart contracts on a distributed ledger technology platform.

FIG. 3 is a flowchart illustrating an example embodiment(s) of submitting, tracking, and/or managing a smart UCC filing(s) utilizing one or more smart contracts on a distributed ledger technology platform. As illustrated in FIG. 3, in some embodiments, a central authority or system, such as a state or regulator, can generate and/or publish one or more smart contracts for implementing the smart UCC platform on the DLT or blockchain network at block 302. For example, the one or more smart contracts for implementing the smart UCC platform can be configured to facilitate one or more processes described herein in relation to the Smart UCC platform.

In some embodiments, all or some nodes and/or users on the DLT or smart UCC platform can each be assigned a unique network identifier or identity at block 304. The nodes and/or users on the DLT or smart UCC platform can comprise one or more registered agent nodes, asset owner nodes, lien holders, central authorities, or the like. In some embodiments, all or some of the nodes and/or users on the DLT or smart UCC platform can review and/or approve the published one or more smart contracts at Block 306.

In some embodiments, a node, such as Node A which can be a registered agent node, can propose or attempt to generate a first smart contract output based on the published one or more smart contracts and/or an asset, such as Asset X, at Block 308. For example, in some embodiments, a registered agent can propose or attempt to generate a Smart UCC filing on Asset X by inputting one or more parameters into user interface generated by one or more smart contracts of the smart UCC platform.

In some embodiments, one or more smart contracts of the smart UCC platform can be configured to assign a unique identifier to Asset X at Block 310. In some embodiments, the unique identifier assigned to Asset X can be used to track the state of Asset x and/or any previous or future UCC filings on Asset X. In some embodiments, the smart contract or smart UCC platform can be configured to determine whether the proposed UCC filing or inputted parameters meet certain requirements for generating a smart contract output or smart UCC filing at Block 312. For example, in some embodiments, the smart UCC platform can be configured to determine whether all of the legally required and/or system required parameters have been inputted. If not, in some embodiments, the Smart UCC platform can be configured to automatically reject generation of the proposed Smart UCC or first smart contract output at Block 314.

In contrast, if it is determined that the proposed UCC filing or inputted parameters do meet the requirements for generating a smart contract output or Smart UCC filing, the smart UCC platform can allow generation of the proposed Smart UCC filing. As such, in some embodiments, Node A can then generate the proposal for the first smart contract output or Smart UCC at Block 316.

In some embodiments, a central authority can be involved in the validation process by reviewing and/or issuing an acknowledgement if certain requirements are met. As such, in some embodiments, the central authority can be configured to determine whether certain threshold requirements for the proposed UCC filing are met at Block 318; however, this can be optional. In some embodiments, if the central authority determines that the necessary requirements are not met, the central authority may not issue an acknowledgement. However, if the central authority determines that the necessary requirements are met, the central authority may issue an acknowledgement to the network.

In some embodiments, once a proposed UCC filing is approved, either by the smart UCC platform and/or central authority, Node A may then generate one or more private channels on the DLT or smart UCC platform at Block 320 in order to control sharing of data; however, this can be optional. In some embodiments, Node A can then publish the first smart contract output or Smart UCC at Block 322, for example on a private channel or publicly. If published on a private channel, only those nodes or individual network identities that are members of the private channel will be able to decrypt the Smart UCC or first smart contract output and access the underlying information; other nodes or network identities that are not members of that private channel will only be able to see an encrypted version of the Smart UCC or first smart contract output. Once published, the Smart UCC can be considered to be recorded; in other words, the Smart UCC filing process can be considered complete.

In some embodiments, another node, such as Node B, may attempt to generate a second smart contract output or Smart UCC on either the same or different asset at Block 324. For example, Node B may be attempting to generate a completely different UCC-1 or a follow-on UCC on the UCC previously recorded by Node A. In some embodiments, the Smart UCC platform can be configured to determine whether the second smart contract output or second Smart UCC proposed by Node B meets certain criteria of the one or more smart contracts at Block 326. For example, as described above, in certain situations, the Smart UCC platform may be configured to prevent or reject certain additional UCCs attempted to be recorded on the same asset, Asset X. In other situations, the Smart UCC platform may be configured to allow certain additional UCCs to be recorded on Asset X. Further, in some situations, the UCC or second smart contract output attempted to be generated by Node B may be for a wholly different Asset Y, which may not have any UCC filings of record.

In some embodiments, if the second smart contract output or Smart UCC proposed by Node B is determined to meet the predetermined smart contract requirements, the Smart UCC platform can allow Node B to continue to record the second smart contract output or second Smart UCC. Similar to the case above with Node A, Node B may, in some embodiments, generate one or more private channels on the DLT or Smart UCC platform for sharing information about the second smart contract output or Smart UCC at Block 328; however, this can be optional. In some embodiments, Node B can publish or record the second smart contract output or second Smart UCC on the DLT or Smart UCC platform at Block 330, for example either on one or more private channels or publicly.

In some embodiments, if the second smart contract output or Smart UCC proposed by Node B is determined to not meet the predetermined smart contract requirements, the Smart UCC platform can reject generation of the second smart contract output or Smart UCC at Block 332. In some embodiments, one or more smart contracts of the Smart UCC platform can be configured to automatically and/or dynamically generate and/or transmit an alert based on the rejection to Node A at Block 334 or any other alert as described above. In some embodiments, Node A can receive the alert and/or notify the central authority at Block 336.

Company Smart Contract Implementations on a DLT Platform

As mentioned above, in some embodiments, implementation of one or more specific smart contracts and/or private data sharing technologies on a DLT platform can provide frameworks and/or solutions for controlling, managing, and/or communicating company documents and/or communications on a distributed ledger or blockchain platform.

Generally speaking, company and related instrument management can involve the coordination between the numerous stakeholders of a Company, the State of Incorporation/Organization, the signing and tracking of company documents, bilateral and multilateral agreements, and the accurate tracking of ownership and operating rules. Much of this is generally captured, maintained, and managed via emails, printed and signed documents, phone calls, of the like, requiring the Company's operating agreements and processes be codified manually on paper, spreadsheets, or through limited electronic tools for recording disparate sources. The onus of keeping necessary information accurate and up-to-date is generally on the specific individual(s) tasked with doing so. These/this individual may need to collate and correctly input all data points and documents without error. In addition, agreed upon terms will need to be correctly interpreted for corporate governance and execution, via manual and/or semi-automated mechanisms. In such instances, a single source of truth does not exist. The process of inscribing and interpreting can require either complete trust, or relies on validation by corporate lawyers and stakeholders to ensure the agreed to terms have been followed. Thus, errors are fairly common, allowing for discrepancies between the Company, its stakeholders, and the State of Incorporation/Organization.

By utilizing one or more specific smart contracts and/or private data sharing technologies on a DLT platform, in some embodiments described herein, company and instrument management on a blockchain platform can be implemented via one or more smart contracts deployed on the blockchain or DLT network. In particular, in some embodiments, smart contracts can manage inter-party interactions (between the Company, Shareholders, Directors/Managing Members, Corporate Officers, and other member entities and individuals), maintain data privacy, insure accuracy and consistency of shared data, and/or execute predefined set of actions to be taken by the company, company secretary, stakeholder(s), shareholder(s), director(s), managing member(s), corporate officer(s), auditor(s), legal advisor(s), or the like, involved in the Company. In some embodiments, each of the foregoing actors can be assigned a network identity by the system. In some embodiments, the system can be configured to grant and/or control read/write by network identity or role. In other words, in some embodiments, the role of a user or network identity can represent how that network identity or user participates in a given set of one or more smart contracts. As such, in some embodiments, each of these actors or stakeholders in a company can use their network identities to take view and/or take actions on the network.

In some embodiments, smart contracts can also be used to connect companies to services available on the blockchain or DLT network, such as for example State services. Additionally, in some embodiments, smart contracts can be used to model the financial instruments and manage their issuance and transactional rules as informed by the company documents, such as a shareholder agreement(s), in a manner compliant with the agreements between the Company and its Directors/Managing Members, Shareholders, and/or State of Incorporation/Organization or any government entity responsible for registering companies and regulating operations within their jurisdiction. Further, in some embodiments, Companies can incorporate and/or organize though smart contracts right from their genesis and can establish their capitalization table, initiate and record board resolutions, share company documents, and provide stakeholders with direct access to view company information, private agreements, company communications, and act in their predefined capacity. In some embodiments, corporate actions can be recorded and cryptographically signed by the designated parties in an auditable, immutable, record on the blockchain.

In some embodiments, company and instrument management on a blockchain provides: (1) a single source of truth verified by stakeholders of the Company; (2) connectivity to State or Incorporation/Organization via authenticated services or services provided on the network by authenticated parties; (3) corporate governance with predefined methods, for example, by means of invokable functions/logic within the smart contracts, conforming to established terms and agreements with all parties involved; (4) direct participation by stakeholders of a company; and/or (5) issuance of transferable company stock, derivatives, and other instruments to shareholder accounts, establishing ownership and direct access to act on it.

As discussed, in some embodiments, a smart company can be incorporated or organized on a DLT or blockchain by utilizing one or more smart contracts implemented on a smart company platform. In some embodiments, a smart company DLT or blockchain platform comprises one or more specifically written smart contracts that govern all read and/or write access by all stakeholders and/or network identities on the platform. In particular, in some embodiments, one or more company documents and/or instruments, such as a company charter and/or bylaws, can be uploaded or otherwise inputted onto a smart company platform on a DLT or blockchain comprising one or more specifically written smart contracts that facilitate incorporation or organization of a company. Further, in some embodiments, an existing company can be migrated onto a DLT or blockchain by inputting one or more company documents and/or instruments onto a smart company platform comprising one or more specifically written smart contracts.

In some embodiments, one or more stakeholders and/or related parties, such as a company, company secretary, board members, directors, officers, shareholders, registered agents, law firm, state and/or regulatory authorities can be on the smart company platform on a DLT, for example by having a node on the DLT. In some embodiments, the smart company platform on a DLT can provide a single source of truth for all such nodes on the network and/or facilitate communications between one or more such nodes. In some embodiments, each or a subset of the different nodes can have access to different company information, for example by utilizing one or more private channels as discussed herein.

Further, in some embodiments, a plurality of states and/or regulatory authorities can have access to the smart company platform on a DLT through one or more nodes on the network. As an illustrative example, both Delaware and Texas can each have a node on the smart company DLT platform in some embodiments. As such, in this example, a user may be able to incorporate a company in one state, such as Delaware, using the smart company DLT platform and then do the same in another state, such as Texas, simply by transmitting company documents, such as the articles of incorporation, to state authorities through the DLT. The appropriate state authority, such as the secretary of state, can then go through a pre-generated process on the smart company DLT platform to review and/or approve the charter and this part of the incorporation.

In some embodiments, all or a subset of all processes, corporate actions, and/or corporate documents inputted or activated on the smart company DLT platform can be broadcasted to the entire network. For example, in some embodiments, any or some corporate actions for a private company can be broadcasted privately on the network, sharing information only with relevant parties as necessary. Further, in some embodiments, any or some corporate actions for a public company can be broadcasted publicly on the network. As such, in some embodiments, access to certain corporate actions, information, and/or documents can be controlled by role. In other words, in some embodiments, a smart company DLT platform, through use of one or more smart contracts and/or private channels, can control privacy visibility of nodes and/or users by role.

More specifically, in some embodiments, a smart company DLT platform can comprise one or more product administrators. The one or more product administrators can facilitate and/or manage the creation of one or more companies and provide access to information and/or actions of each company only to those parties with roles that require access to the same, such as a company secretary of each company. In some embodiments, once incorporated or migrated, a company secretary or other user can access the company on the blockchain or DLT to complete one or more further actions, such as for example completing the articles of incorporation, updating the charter, setting bylaws, defining the board of directors, setting voting rights and/or weights, and/or any other action that can be required to codify the company and/or make modifications to the company. In some embodiments, one or more smart contracts on the smart company DLT platform can be configured to facilitate one or more such processes and/or corporate actions. For example, in some embodiments, a user who is running the application can access a user interface of the smart company DLT platform and instruct one or more such actions and/or generating one or more private channels.

In some embodiments, different actors can have different levels of access to certain company information and/or actions. For example, in some embodiments, a company secretary may define the board of directors on the smart company DLT platform, at which point the system may dynamically generate an invite to each of the selected directors to share certain information. Similarly, a user, such as a company secretary, may utilize the smart company DLT platform to provide access to certain information and/or actions to the board of directors, shareholders, option holders, or the like, while certain other actors may not be aware of certain information or corporate actions. For example, in some embodiments, the state in which a company is incorporated may have access only to the articles of incorporation and/or any changes made thereto via the smart company DLT platform, while the state may not have access to any other information, such as who the board of directors are.

As such, in some embodiments, a smart company DLT platform can comprise and/or be configured to utilize a plurality of private channels. For example, the secretary of state can be on its own private channel with the company on which only information the company is required to and/or desires to share with the state can be accessed. Further, the board members can be on a separate private channel with the company for accessing information and/or actions the board should be aware of.

In some embodiments, one or more additional private channels can be generated and/or one or more existing private channels can be utilized for every corporate action by one or more smart contracts on the smart company DLT platform. For example, the company secretary may initiate a vote on a certain action item, such approving bylaws or issuing shares, on behalf of the board. In some embodiments, information relating to this vote may be dynamically generated and/or transmitted by one or more smart contracts implemented on the smart company DLT platform over one or more private channels on the DLT to the board members, who can then cast their votes. In some embodiments, based on the voting requirements that are already built into the smart company DLT platform through one or more smart contracts and the vote results, the smart company DLT platform can be configured to dynamically and/or automatically generate and/or distribute a board resolution to all related parties, again by one or more smart contracts implemented on the platform.

In some embodiments, one or more smart contracts implemented on the smart company DLT platform can be specific to the laws and/or regulations of each state. For example, a certain state may have certain requirements for company incorporation or other corporate action which can be different from another state. As such, in some embodiments, by using pre-built smart contracts, the smart company DLT platform can automatically determine whether state requirements for a certain proposed corporate action have been satisfied and allow only those proposals that meet the requirements to be accepted and/or published on the network.

In some embodiments, the smart company DLT platform can be utilized to issue all or some of the company assets, such as common stock, preferred stock, restricted stock or the like. In other words, in some embodiments, a smart company can use the smart company DLT platform to issue certain shares to a particular individual or recipient, at which point, the smart company DLT platform can dynamically generate the share issuance and/or related documents, such as the shareholder agreement for the company that has been previously uploaded to the DLT platform, and transmit the same to the recipient for acceptance. In some embodiments, the smart company DLT platform can require the recipient to cryptographically sign to accept shares.

In some embodiments, as discussed herein, the smart company DLT platform can facilitate issuance and/or transfer of assets, such as shares of a company. For example, a seller and buyer may agree on a transfer of shares of a company, which can be facilitated by the smart company DLT platform. In some embodiments, a seller or issuer can input information about the buyer or recipient on the smart company DLT platform, which can then dynamically and/or automatically generate transfer documents on the fly. In some embodiments, the generated transfer documents can be dynamically transmitted to the seller or recipient, as well as any other documents relating to the transfer, such as an updated capitalization table. In some embodiments, wire instructions can be made part of the transmitted documents. In some embodiments, any updates to the wire instructions can be incorporated by the system into the transfer. In some embodiments, the smart company DLT platform can generate and facilitate a digital escrow in which the shares are transferred when the write transfer is executed. In some embodiments, a share transfer may require a board resolution, which the smart company DLT platform can be configured to facilitate by generating and/or prompting votes by board members according to the company documents.

In some embodiments, the smart company DLT platform can allow migration of an existing company and/or migration of responsibility onto the DLT platform. For example, in some embodiments, the smart company DLT platform can migrate a company that has already been incorporated and having certificated shares into uncertificated shares on the DLT. More specifically, such company may pass a board resolution that switches to uncertificated shares, which may require a certain percentage of votes to pass depending on its bylaws. Once such board resolution has passed, such company may switch over to the smart company DLT platform and establish its preliminary smart charter.

In particular, in some embodiments, the company secretary or authorized person can inscribe and codify the smart charter of the company using a certificate of good standing for the company which is verified with the state. For example, in some embodiments, if the details recorded by the state match the facts of the company, the smart company DLT platform can confirm and generate a smart charter for the company. In some embodiments, if the details do not match, the smart company DLT platform can notify the company secretary, who may then decide to update the charter and send to the state.

In some embodiments, any and every action that changes the state of any company document or instrument, such as its charter, bylaws or the like, can be broadcasted to the whole network in encrypted form, regardless of whether a certain node or user has access to the same. For example, in some embodiments, those users or nodes with access will be able to decrypt the message and access the underlying information, whereas those without access will only be able to see the encrypted version and not the underlying information, thereby maintaining data consistency throughout the network while managing information access.

In some embodiments, the smart company DLT platform can facilitate governance of a company by utilizing one or more smart contracts implemented thereon. For example, in some embodiments, if a company wishes to pass a board resolution that change the total number of shares outstanding, the smart company DLT platform can be configured to dynamically determine what the necessary requirements are for doing so based on the company bylaws and generate one or more action items that may be necessary. For example, the bylaws may require voting by the board, in which case the smart company DLT platform may be configured to automatically generate and transmit voting prompts to the board members through the DLT. In some embodiments, once all requirements of the bylaws are met, the smart company DLT platform can be configured to dynamically generate and/or transmit an amendment to the state authority to approve the corporate action, such as issuance of additional shares. As such, in some embodiments, all or some corporate governance actions for a smart company can be implemented dynamically on the smart company DLT platform via one or more smart contracts implemented thereon.

Further, in some embodiments, the smart company DLT platform can allow tracking of assets or smart securities that can potentially be moved around to various nodes on the network. In some embodiments, the smart company DLT platform can issue real securities on a DLT or blockchain, meaning real ownership can be established as opposed to simple documentation. In other words, in some embodiments, if a real security of the DLT is moved to another persons' account, the actual shares would be moved. As such, in some embodiments, the smart company DLT platform can allow, prevent, and/or reject certain individuals from owning certain assets, for example during issuance and/or transfers, according to preset rules. In some embodiments, such restrictive rules can be changed over time and can be applied through the management process. In some embodiments, such features of the smart company DLT platform can be used to enforce lockup schedules, co-sale rights, rights of first refusal, by deploying the same as smart contracts that codify how a certain smart security is allowed to operate. Further, in some embodiments, by allowing direct ownership, the smart company DLT platform can provide the ability to transfer rights to a proxy. For example, through the smart company DLT platform, a shareholder, board member, or any user can permit a third party to take actions on behalf of the user via one or more smart contracts.

In some embodiments, the smart company DLT platform can be configured to automatically and/or dynamically generate a capitalization table in real-time based on updated corporate actions, such as issuance of shares, which can be privately shared with necessary users and/or nodes on the network. As such, in some embodiments, the smart company DLT platform can guarantee that any node or user on the network with the necessary access can view the most up-to-date capitalization table at any given point in time. Further, in some embodiments, a company at any given point in time can determine who owns what assets of the company. Similarly, in some embodiments, any holder of a company can at any given point in time be aware of exactly how much of the company the holder owns, how many options the holder owns, and/or project future ownership based on certain conditions, for example if everyone exercises their options or if the company is acquired at a certain price, or the like. In other words, in some embodiments, the whole waterfall depending on certain conditions.

In some embodiments, the smart company DLT platform can allow any user or node with access pursuant to the company documents to view ownership and/or the capitalization table at the present time, in the past, or in the future based on certain conditions. For example, in some embodiments, a user with the necessary access can be able to go back in time and view previous capitalization tables. Further, in some embodiments, a user with the necessary access can be able to go back in time and view asset ownership and/or any modifications to company documents. In other words, in some embodiments, the smart company DLT platform can provide a full history of the state of ledger at any point, which can be valid and consistent across all network nodes.

In some embodiments, the smart company DLT platform can initially comprise one or more smart contract templates, which can be configurable based on the specific terms or conditions required for a company. For example, in some embodiments, the one or more smart contract templates can comprise one or more standard terms that can be applicable to and/or configurable by most companies, such as tag-along rights for a series of share class, vesting schedules, voting requirements, voting weight or the like. Further, in some embodiments, the one or more smart contracts can comprise one or more completely customizable features or additional features as may be required by one or more companies and/or jurisdictions. In some embodiments, a smart company can be formed or migrated on the smart company DLT platform by uploading and/or configuring one or more smart contracts on the platform.

Additional Details of Company Smart Contract Implementations on a DLT Platform

As described herein, in some embodiments, a company, its stakeholders, state of incorporation/organization, and other entities/intermediaries can operate on the same blockchain or DLT network. In some embodiments, one or more smart contracts deployed on this network facilitate the creation of new companies, migration of existing companies, and the management of said companies on the blockchain. In some embodiments, the process of establishing the company on the blockchain includes capturing company documents, state authorizations, agreements with shareholders, decisions made by its directors/managing members, and inputs from other stakeholders, and codifying them in one or more smart company contracts, thereby fundamentally enshrining all agreements governing the company and its stakeholders, thus, resulting in an accurate, up-to-date, and verifiable single source of truth with regards to corporate governance.

In some embodiments, smart company contracts can therefore be the record of facts, elections, and characteristics of the various agreements governing the company, and are used as configuration/inputs to the smart contracts deployed. Put differently, in some embodiments, smart company contracts can be a set of configurations and/or properties that one or more smart contracts can take into consideration when one or more predefined methods within the one or more smart contracts are invoked. In some embodiments, one or more smart company contracts can be deployed on the network in a manner similar to a smart contract. In some embodiments, changes to governing agreements are then performed though predefined and accepted methods via one or more smart contracts, such as for example board resolutions, that automatically and dynamically update the company records, such as for example one or more documents and one or more smart company contracts, on the blockchain or DLT, the results of which are viewable to the stakeholders, and tracked in a fully auditable manner. For instance, consider a non-limiting example of a smart contract that includes a specific board resolution as a predefined method. The specific board resolution can allow the Company or an acting Company secretary to go through a standard set of processes as defined by the Company's charter, bylaws, or other agreements, such as voting as required, prior to changing the governing agreements that are codified in the one or more smart company contracts. If the expectations are met, a change can be made to the one or more smart company contracts, reflecting the decisions made as a part of the board resolution.

In some embodiments, each individual/entity has a unique identifier on the blockchain or DLT network called a network identity. In some embodiments, actions can be taken by each individual/entity by publishing messages to the blockchain or DLT using their network identity. In some embodiments, a network identity should meet the following criteria: (1) ability to verify the authenticity of a message that is published to the blockchain or DLT using network identity; and (2) ability to share information privately between a group of network identities. In some embodiments, network identities can be permissioned via the smart contracts to act in their predefined capacities based on their role(s), such as a shareholder for example, within the company.

Figure 4:
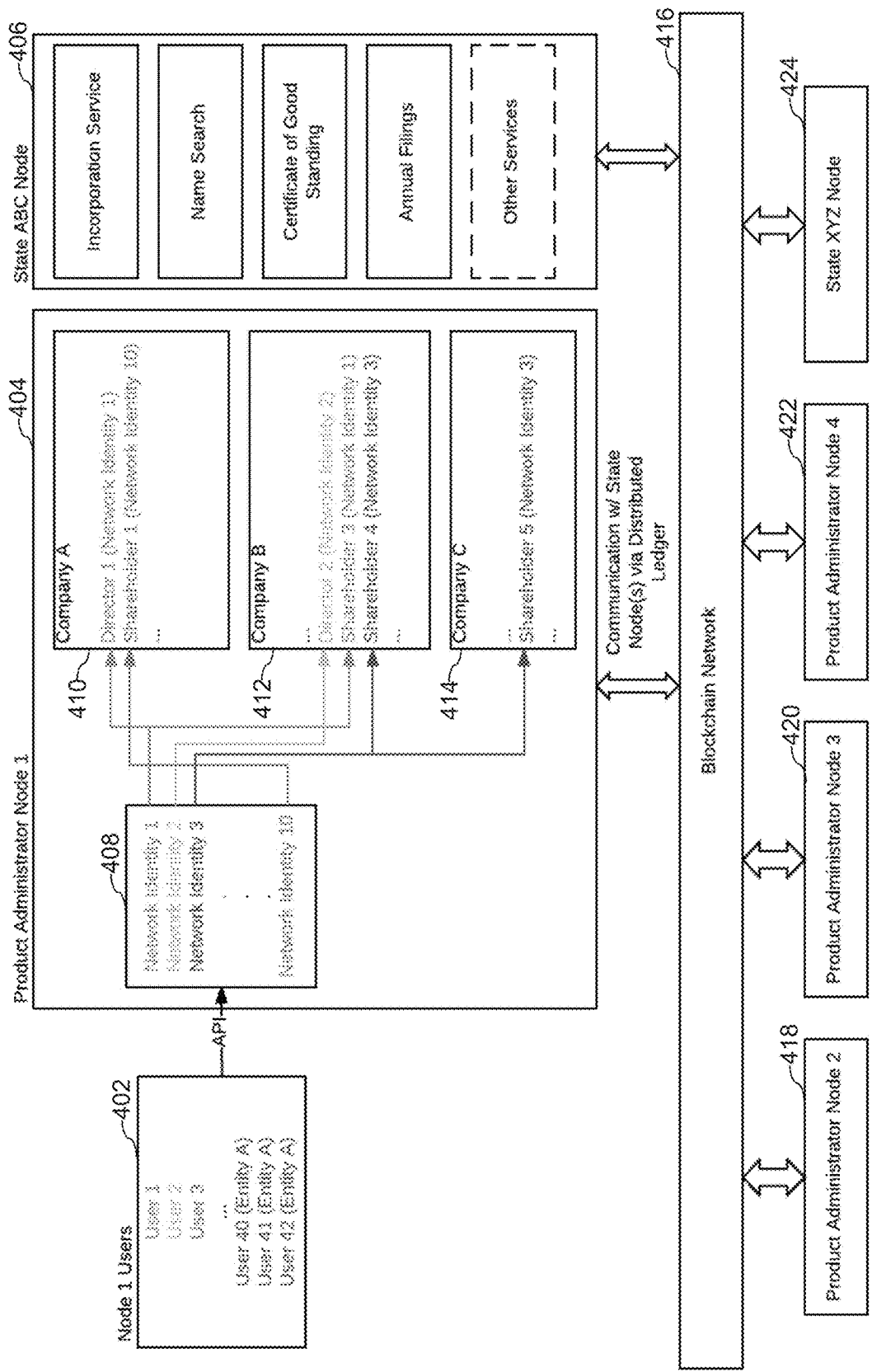
FIG. 4 is a schematic diagram illustrating an example embodiment(s) of a system comprising nodes and users that may be involved in a smart company instrument control, communication, and management system utilizing one or more smart contracts on a distributed ledger technology platform.

FIG. 4 is a schematic diagram illustrating an example embodiment(s) of a system comprising nodes and users that may be involved in a smart company instrument control, communication, and management system utilizing one or more smart contracts on a distributed ledger technology platform. As illustrated in FIG. 4, in some embodiments, a smart company platform can comprise one or more user nodes 402 in communication through an API to one or more product administrator nodes 404, 418, 420, 422. The one or more user nodes 402 can comprise one or more users and/or entities. The one or more product administrator nodes 404 can assign and/or store one or more network identities 408 for the one or more users or entities, for example assigned by one or more smart contracts implemented on the smart company platform.

In some embodiments, the one or more product administrator nodes 404, 418, 420, 422, 424 can be configured to manage, control, and/or communicate corporate documents or instruments for one or more companies, such as Company A 410, Company B 412, and/or Company C 414, among others. Through management and/or control of network identities 408, the smart company platform can be configured to manage and/or control the type of information each network identity is proxy to for certain companies as illustrated.

In some embodiments, one or more state nodes 406, 424 can also be on the smart company platform. Each of the one or more state nodes 406, 424 can each comprise an incorporation service, a name search service, a certificate of good standing service, an annual filings service, and/or other services. In some embodiments, the one or more product administrator nodes 404, 418, 420, 422 and the one or more state nodes 406, 424 can be in communication with each other through a DLT or blockchain network 416.

In some embodiments, the smart company platform can be configured to facilitate the incorporation and/or organization of a corporation, such as a C-corporation, LLC, partnership, LLP, and/or other business entities with the State via a blockchain or DLT. In particular, in some embodiments, one or more types of smart company contracts can be deployed on the network. In some embodiments, the facts and/or elections in each type of smart company contract can be tailored to at least one specific purpose in order to prevent a Company from taking actions that can violate its own agreements.

In some embodiments, the incorporator or authorized person can record the pertinent details relevant to incorporate/organize with the state, and can inscribe the preliminary smart charter, which can be a type of smart company contract. In some embodiments, the smart charter can be used to generate the appropriate articles, such as certificate of incorporation, articles of organization, or the like, to be submitted to the state of incorporation/organization via the blockchain or DLT, at which point the preliminary smart charter is locked and cannot be modified. In some embodiments, for descriptive purposes, the certificate of incorporation or charter can be the operating company document. In some embodiments, the state performs its due diligence and follows its standard formation practices, responding via the blockchain confirming the registration of the company, or rejecting it. In some embodiments, upon rejection, the preliminary smart charter can be unlocked for further revisions, and can be resubmitted to the state. In some embodiments, upon confirmation, the smart charter can be codified and can serve as the baseline agreement for corporate governance, which can be the genesis of the company.

In some embodiments, as described herein, the smart company DLT platform can allow migration of an existing company to a blockchain or DLT. In particular, in some embodiments, the smart company DLT platform can allow migration of an existing company with uncertificated stock on a blockchain or DLT. In some embodiments, the smart company DLT platform can allow migration of an existing company with certificated stock into uncertificated shares on a blockchain or DLT.

More specifically, in some embodiments, an authorized person can request the long form certificate of good standing from the state via the blockchain or DLT. In some embodiments, the state can review the request and can respond by issuing the certificate of good standing to the company via the blockchain or DLT. In some embodiments, the company secretary or authorized person can inscribe the preliminary smart charter using the certificate of good standing. In some embodiments, in the case where the certificate of good standing is insufficient to establish the complete smart charter, the operative charter already signed by the state, and other relevant signed documents can be recorded and the appropriate details can be inscribed into the smart charter. In some embodiments, once designated as complete, the smart charter is considered codified.

In some embodiments, the smart company DLT platform can allow modifications to a company charter post smart charter codification. In some embodiments, the codified smart charter constitutes the rules by which the company operates as registered with the state of incorporation/organization. In some embodiments, further modifications to the governing smart charter may require the passage of a board resolution amending the charter, resulting in the amended and restated certificate of incorporation being submitted to the state for review.

For example, companies with certificated stock can take an additional step to pass a board resolution to convert to uncertificated stock, resulting in an amended and restated charter being submitted to the state. In some embodiments, confirmation from the state, via the blockchain or DLT, can automatically adjust the smart charter, allowing for the issuance of distributed ledger shares.

In some embodiments, the smart company DLT platform can facilitate corporate governance via one or more smart company contracts. In some embodiments, smart company contracts can also model the company bylaws, the board of directors/managing members, corporate officers, and the agreements between the company and its stakeholders, defining how the corporation must operate as well as the process by which changes can be made to corporate governance. In some embodiments, the company secretary or authorized person can record and codify the governing requirements into their respective smart company contracts, along with the associated company documents which govern the company and its stakeholders. Relevant company documents can also be stored on the blockchain or DLT and can be permissioned to be viewable to the appropriate stakeholders. In some embodiments, once codified, changes to the operating agreements can be modified via board resolutions recorded to the blockchain or DLT, or other predefined methods known to all stakeholders.

In some embodiments, the company secretary or authorized person can initiate a board resolution at the direction of the board of directors/managing members, with the codified smart company contracts. In some embodiments, this can automatically determine the appropriate workflow and actions required by stakeholders in order for the resolution to move forward. Generally speaking, board resolutions can therefore fall into 3 categories: (1) recording decisions made, meeting minutes, and information to be shared with specific parties with no impact to the capital structure or corporate governance, such as board committee formation; (2) executing on actions as codified in the smart company contracts which result in changes to the capital structure, such as issuance of authorized shares; and (3) modifications to corporate governance resulting in changes to the smart company contracts, such as change to the board composition, or the re-definition of a quorum.

In some embodiments, these predefined methods, including but not limited to board resolutions, are deployed as smart contracts that rely on the smart company contracts as configurations to determine the correct workflow(s), the voting requirements, and any network services necessary to complete the workflow. In some embodiments, each company, having established their own smart company contracts, can operate in a compliant manner utilizing these configurable workflows.

For example, consider a company secretary or authorized person initiating a board resolution to amend the charter to increase the authorized common stock thus establishing a new preliminary smart charter to be reviewed and confirmed. The smart company contracts can require that the board record their vote on the blockchain or DLT using the default definition of a quorum within a board meeting. In some embodiments, members of the quorum established are notified to login, review details of the proposed resolution and all associated documents, then vote. In some embodiments, each member's vote is recorded and the resolution moves forward, provided it meets the codified requirements for a passing vote- to the next stage of the workflow requiring a shareholder vote. In some embodiments, shareholders are notified to login, review, then vote within a specified period of time. In some embodiments, provided shareholders also vote to approve, the resolution moves forward to the next stage and the amended certificate of incorporation is submitted to the State. In some embodiments, if the State approves, the new smart charter is codified and the operating charter is updated. In some embodiments, one or more steps in this workflow are handled in an automated manner through the deployed smart contracts with stakeholder actions signed by their network identities.

In some embodiments, the smart company DLT platform can facilitate privacy, communication, and/or stakeholder participation. In some embodiments, messages published to the blockchain can be cryptographically signed to ensure the authenticity and integrity of the message. In some embodiments, messages can be encrypted to insure that only the authorized network identities are able to view and take action within the context of the companies and their respective role(s). In some embodiments, smart contracts managing these network identities can be deployed to support the on board of the stakeholders to join the network and take ownership of their unique network identity. In some embodiments, stakeholders, such as individuals or entities can be invited by the company secretary or authorized person to accept their role(s) in the company, such as a shareholder, director/managing member, corporate officer, auditor, or the like, and to participate in said capacity via their network identity.

In some embodiments, the smart company DLT platform can be configured to control privacy or visibility of certain information by role. In some embodiments, each role within the company can be permissioned to view the privately stored company information and documents as required to participate. In some embodiments, access can differ by role, but the information can be retrieved directly, or derived, from the single source of truth on which the company operates. As a non-limiting example, board of directors can have access to view the charter, bylaws, board resolutions, and/or the capitalization table. In some embodiments, shareholders can also have access to view the same charter and bylaws (not copies), but only board resolutions on which their vote is/was required, and potentially just the subset of documents shared by the company for the vote. In some embodiments, shareholders can only view their own position, not the entire capitalization table in which all positions are represented. In some embodiments, actions taken via smart contracts that are deployed on the network can result in a shared state and/or ledger state that represents the single source of truth.

In some embodiments, the smart company DLT platform can be configured to control privacy or visibility of certain information by network identity. In some embodiments, a network identity, which is unique to each stakeholder, such as an individual or entity, can have multiple roles within a single company, or have roles in multiple companies. In some embodiments, a single network identity therefore allows a stakeholder to access and participate within the capacity designated by their role(s) across all companies in which they have a stake. In some embodiments, privacy is therefore maintained by the company or managed by its company secretary or authorized person and by their role within the context of the specific company.

For example, consider a shareholder in company A who is also a managing member in company B. Authorized person A of company A can invite Jane Doe as a shareholder of company A. In some embodiments, the onboarding smart contracts will identify that Jane Doe does not have a network identity and create one for her and invite her to take ownership. Authorized person A can permission Jane Doe to see all information about company A visible to a shareholder, all agreements between Jane Doe and company A, and act in said capacity. Authorized person B of company B can invite Jane Doe as a managing member of company B. In some embodiments, the onboarding smart contracts will detect that Jane Doe has a network identity. Authorized person B can permission Jane Doe to see all information about company B visible to Managing Members, and act in said capacity. As such, in this example, authorized person A cannot see any company B information, authorized person B cannot see any company A information. Jane Doe, via her single network identity, can see and act in her designated capacities within both company A and B.

In some embodiments, the smart company DLT platform can facilitate communication and/or participation. In other words, in some embodiments, the smart company DLT platform can facilitate group actions by role. In some embodiments, communications relevant to the operation of the company, such as requiring information be shared with, or actions taken by stakeholders, are disseminated via the blockchain or DLT using the predefined methods, which are described herein as part of corporate governance. In some embodiments, stakeholders participate in the smart contract workflows by publishing constructed messages with their input onto the blockchain, cryptographically signed by their network identity. In some embodiments, these actions include, but are not limited to, the signing of various agreements, voting, recording of instructions, providing specific inputs as part of a workflow, or the like. In some embodiments, actions taken by the network identity are signed and recorded on the blockchain or DLT and can therefore be verified by all participants with visibility.

In some embodiments, the smart company DLT platform can be configured to facilitate communication and/or participation for stakeholder specific actions. In some embodiments, companies can manage agreements directly with shareholders, which are sometimes unique in content, that are to be codified into smart company contracts governing how a specific shareholder may act within the context of the company. In some embodiments, these include, but are not limited to, the signing of individual agreements, the acceptance of issued shares, and rules by which the shareholder must act with regards to their share ownership or derivative assets, such as right of first refusals.

In some embodiments, the smart company DLT platform can facilitate one or more services on the network, such as for the state of incorporation/organization or state of operation. In some embodiments, the blockchain or DLT network is extensible and can support various services. In some embodiments, the state of incorporation/organization, being on the same network, can provide services to the company via the blockchain or DLT. In some embodiments, the smart contracts deployed for state services can define what is available to the company and how to interact with the state in order to make use of said services. In some embodiments, communication can therefore be recorded and interactions can be visible to the state of incorporation/organization and the company, while not being visible to other participants on the network. In some embodiments, services include but are not limited to: incorporation/organization, request for certificate of good standing, name search, annual filings, or the like. In some embodiments, services available may differ from state to state. In some embodiments, states can also provide services relevant to the operation within their jurisdictions for companies incorporated/organized in another state.

In some embodiments, the smart company DLT platform can be configured to manage company instruments on a blockchain or DLT. Generally speaking, companies keep track of ownership, such as issued stock, member interest/ units, or the like. To fully consider the future state of ownership, all other issued securities must also be tracked, and the impact to ownership must be well understood. A capitalization table is generally used as a system of record for tracking holders and company issuances impacting the capital structure. Traditionally, the capitalization table is tracked on spreadsheets or through other electronic tools/services by an authorized person (ex. CFO). Thus, various manual processes are often employed to keep track of, and to execute agreements impacting said capitalization structure. It can therefore be a representation of ownership, and can be modifiable by a central authority via manual updates.

In contrast, in some embodiments herein, instrument management on a blockchain can comprise of: (1) one or more smart contracts that adhere to the issuance and transactional agreements as governed by the smart charter as well as the other smart company contracts, including the unique agreements cryptographically signed by the shareholder; (2) instruments issued as smart securities with direct shareholder ownership; (3) an issuance process utilizing (1) and (2) as part of the company on blockchain solution; and/or (4) an automatic and up-to-date capitalization table representation that results from (1), (2), and (3), thereby providing a single source of truth with regards to ownership of all issued securities.

In some embodiments, the smart company DLT platform can be configured to govern and/or facilitate the issuance of securities and/or transactional agreements. In particular, in some embodiments, codified smart company contracts can govern the issuance of securities to the shareholder's network identity (or network identities), and how they are transacted between the network identities. In some embodiments, these include, but are not limited to, vesting, lock up, co-sale, right of first refusal, or the like. In some embodiments, smart contracts can configure the instrument to adhere to the rules as set forth within the various smart company contracts. In some embodiments, shareholder specific agreements are validated when an action is taken on securities held by said shareholder, ensuring all actions are compliant with corporate governance.

In some embodiments, the smart company DLT platform can be configured to facilitate issuance of smart securities. In some embodiments, financial instruments can themselves be issued by the company to the shareholder as smart securities. In some embodiments, smart securities are fully modeled financial instruments including characteristics and functionality that can be deployed as smart contracts on the blockchain or DLT. In some embodiments, smart securities can be privately transacted on using cryptographic mechanisms. In some embodiments, the smart securities support include, but is not limited to, common stock, preferred stock, options, warrants, rights, debt instruments, restricted stock, restricted stock units, SAFEs, KISSs, or the like. In some embodiments, smart securities can be transacted exclusively and directly by network identities that hold them; issuers may have limited visibility and control. As a non-limiting example, consider governance of an issuance. In some embodiments, the codified smart charter can contain the total number of authorized common and preferred stock that can be issued, governing both the issuance of the smart securities and any derivative instrument that results in conversion to stock, keeping the company in line with the charter registered with the state. As such, in some embodiments, it is therefore not possible to accidentally issue more than what is available.

In some embodiments, the smart company DLT platform can facilitate the issuance process. In particular, in some embodiments, a company secretary or authorized person may initiate the issuance of the smart security during initial setup of the company. In some embodiments, the company secretary or authorized person declares the intent to issue the smart security, along with all the signed and/or to be signed agreements, to the shareholder via the blockchain or DLT. In some embodiments, the shareholder reviews all documents, agrees to cryptographically sign any documents requiring it, and accepts the intended issuance. In some embodiments, the company, via the instrument management smart contracts, can then issue the smart securities having received confirmation from the shareholder. In some embodiments, this is repeated until all shareholders are onboarded and all previously issued instruments are now issued and distributed to their respective shareholders as smart securities. In some embodiments, once the initial setup of the company is completed, all operating governing documents are recorded, existing stakeholders onboarded, and "smart company contracts" codified, issuances henceforth are subject to board resolutions, conforming the corporate governance model established.

Figure 5:
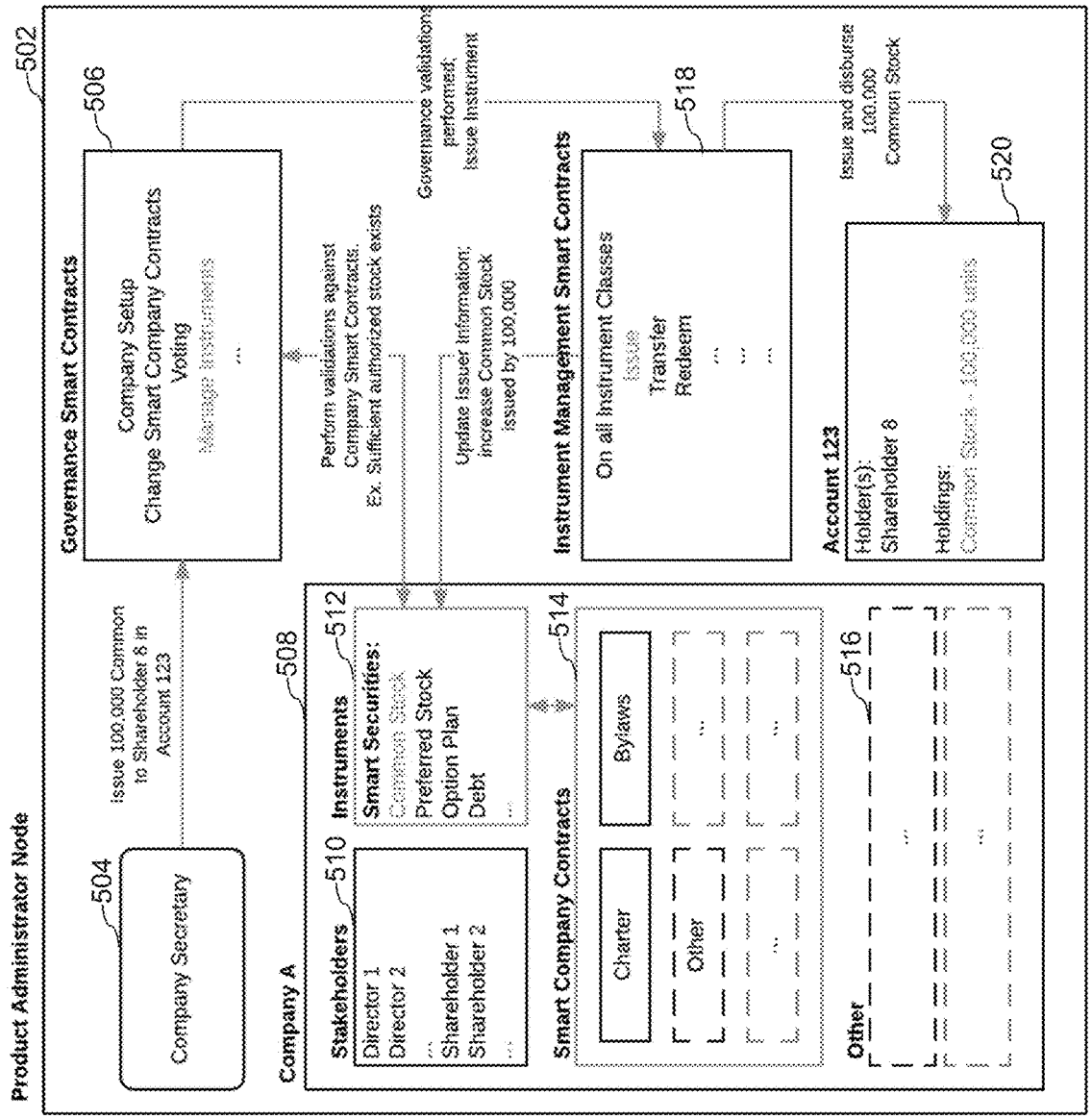
FIG. 5 is a schematic diagram illustrating an example embodiment(s) of issuance on a smart company instrument control, communication, and management system utilizing one or more smart contracts on a distributed ledger technology platform.

FIG. 5 is a schematic diagram illustrating an example embodiment(s) of issuance on a smart company instrument control, communication, and management system utilizing one or more smart contracts on a distributed ledger technology platform.

As illustrated in FIG. 5, in some embodiments, a smart company DLT platform comprises a product administrator or product administrator node 502. In some embodiments, the product administrator 502 can be a user who accesses the network via any node on the network, a node on the network that is shared with other users, and/or a non-dedicated product administrator node. In some embodiments, the product administrator or product administrator node 502 can comprise one or more governance smart contracts 506, for example for company setup, changing smart company contracts, voting, managing instruments, and/or the like. In some embodiments, the product administrator node 502 can comprise one or more instrument management smart contracts, for example for issuing, transferring, redeeming, or the like of all instrument classes. In some embodiments, the product administrator or product administrator node 502 can comprise one or more accounts, such as the illustrated Account 123 520, which can include information about a holder, such as a shareholder, and holdings, such as common stock. In some embodiments, the product administrator or product administrator node 502 can comprise information about one or more companies, such as the illustrated Company A 508. Information about a company can include its stakeholder 510, such as its directors, shareholders, or the like. Company information can also include its instruments 512, such as smart securities for common stock, preferred stock, option plans, debt, or the like. Company information can also include one or more smart company contracts 514, such as its charter, bylaws, or other smart contracts, and/or other information 516.

In the example illustrated in FIG. 5, in some embodiments, a company secretary 504 may propose to issue a certain number of smart securities (e.g., 100,000 common stock) to a certain shareholder (e.g., Shareholder 8) in a certain account (e.g., Account 123). In some embodiments, the product administrator or product administrator node 502 can facilitate the provisioning of access to the company secretary and start the company so the company secretary can manage it. In some embodiments, the product administrator or product administrator node 502 can permission itself as the company secretary or an authorized person on behalf of the company. In some embodiments, the product administrator or product administrator node 502 can also dynamically perform governance validations and/or issue the requested instrument. In some embodiments, one or more smart contracts implemented on the network can dynamically perform governance validations and/or issue requested instrument(s). In some embodiments, an organization or company can run its own node on the network and manage one or more corporate governance, actions, issuance of requested instruments, or the like. In some embodiments, different nodes on the network may provide different services as they are responsible for specific steps in a workflow.

In some embodiments, the smart company DLT platform can dynamically issue and disburse the requested stock, for example 100,000 common stock, to Shareholder 8 in Account 123 520. Further, in some embodiments, once one or more instrument management smart contract issues the requested stock, the smart company DLT platform can update issuer information accordingly, for example by increasing the common stock used by 100,000, on the Company A 508 instruments 512 on the DLT.

In some embodiments, the smart company DLT platform can allow for direct ownership, accounts, and/or proxies. In particular, in some embodiments, network identities, permissioned as shareholders can have direct ownership and exclusive access to the smart securities via their account. In some embodiments, shareholders may permission other network identities to act on their behalf, at either a limited or full capacity, for example, proxy voting, or full power of attorney, by adding them as a permissioned third party to the account, with access to specific functions available to the shareholder. In some embodiments, the issuer may have no inherent ability to act on the accounts owned by the shareholders and by design may not be a permissioned third party.

In some embodiments, the smart company DLT platform can provide additional features relating to smart securities and/or corporate actions. In particular, in some embodiments, the modeling of a smart security can include additional capabilities for the issuer in order to locate the accounts in which the instrument is held, and additional information on the shareholders with access to the account. In some embodiments, the additional capabilities and additional information can be provided without violating privacy and ownership of the account holders. In some embodiments, each and every additional capability and/or additional information is provided without violating privacy and ownership of each account holder.

In some embodiments, additional capabilities and additional information include the minimum amount of information shared with the issuer to manage their instruments. In some embodiments, the issuer does not have access to the account itself. In contrast, in some embodiments, a shared state between account holder(s) and the issuer is accessible via the instrument itself. In some embodiments, the issuer can therefore communicate directly with the holders of their smart securities for example, notification of corporate event. In some embodiments, the modeling of a smart security can further include capabilities for the issuer to take predefined actions that are designated during the creation of the smart security, adhering to the characteristics instrument and the terms of issuance, known to all shareholders thereby, allowing for the execution of corporate actions.

In some embodiments, a smart security can be created with specific and clearly defined issuer rights such as, redeemable instruments. In such instances, the issuer may take predefined limited redemption action conforming to said issuance as agreed to by shareholders. In some embodiments, smart securities therefore allow the issuer through limited and predefined functions the capability to execute any mandatory or voluntary corporate action without intermediaries, while maintaining the shareholders direct and exclusive access to their accounts.

In some embodiments, the smart company DLT platform can dynamically generate and/or provide access to a company's capitalization table. In particular, in some embodiments, the issuer of the smart security or the company can have visibility into the shareholders currently holding any issued instruments. In some embodiments, the capitalization table is therefore a representation of the allocation of the issued instruments to the respective shareholders, and is automatically kept up to date based on actions taken by the company and its shareholders. In some embodiments, the capitalization table cannot be modified directly, as is possible with traditional paper or electronic solutions, thereby providing an accurate current state, and history, of the capitalization table that is immutable and auditable. As such, in some embodiments, it is no longer possible to have an unperfected capitalization table.

Figure 6:
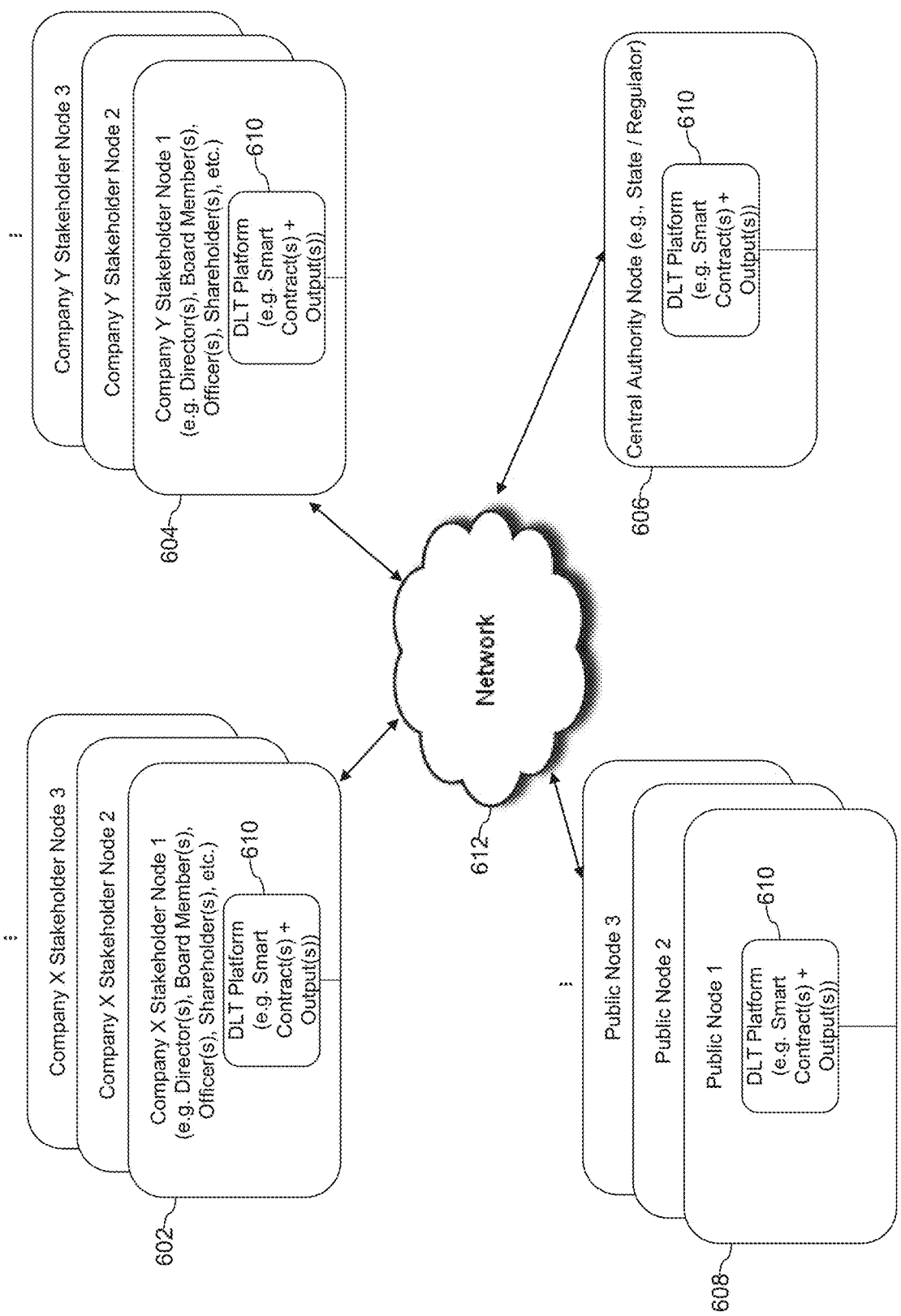
FIG. 6 is a schematic diagram illustrating an example embodiment(s) of a system comprising nodes and users that may be involved in a smart company instrument control, communication, and management system utilizing one or more smart contracts on a distributed ledger technology platform.

FIG. 6 is a schematic diagram illustrating an example embodiment(s) of a system comprising nodes and users that may be involved in a smart company instrument control, communication, and management system utilizing one or more smart contracts on a distributed ledger technology platform. As illustrated in FIG. 6, in some embodiments, a smart company DLT platform can comprise one or more stakeholder nodes of a first company, such as Company X 602, one or more stakeholder nodes of a second company, such as Company Y 604, one or more third-party public nodes 608, and/or a central authority node, such as a state or regulator node 606, which can be in communication with one another through a network 612, such as a DLT. In some embodiments, one or more of the Company X stakeholder nodes 602, Company Y stakeholder nodes 604, public nodes 608, and/or central authority node 606, can comprise a DLT platform 610 on which the smart company DLT platform, one or more smart contracts and smart contract outputs thereof, and/or one or more private data sharing channels may be implemented. In some embodiments, the DLT platform 610 can be configured to facilitate one or more smart company processes described herein, such as for example company incorporation, stock issuance, stock transfer, communication between stakeholders, regulation, governance, or the like.

In some embodiments, one or more private channels can be utilized to control access to company information, for example depending on the role, user, and/or network identity. For example, in some embodiments, one or more Company X stakeholder nodes 602 can comprise one or more nodes and/or users for a director, board member, company secretary, officer, shareholder, or the like of Company X. Similarly, in some embodiments, one or more Company Y stakeholder nodes 604 can comprise one or more nodes and/or users for a director, board member, company secretary, officer, shareholder, or the like of Company Y. In some embodiments, each of these users and/or nodes can be provided different levels of access to different information, via one or more private channels on a DLT, thereby controlling access while maintaining consistency of information across the network. The same can be true for one or more public nodes 608. For example, for a private company, in some embodiments, one or more public nodes 608 may be on the DLT, but not provided any access to information about the private company by not including them in any company-related private channels. In some embodiments, for a private company, no public nodes 608 may be on the DLT network itself. In some embodiments, for a public company, one or more public nodes 608 can be provided access to certain information, such as stock price, and/or the like that is legally required to be available to the public. In some embodiments, the central authority node 606, such as a secretary of state or the like, can be provided access to only such company information that may be required to be reported to the state.

Figure 7:
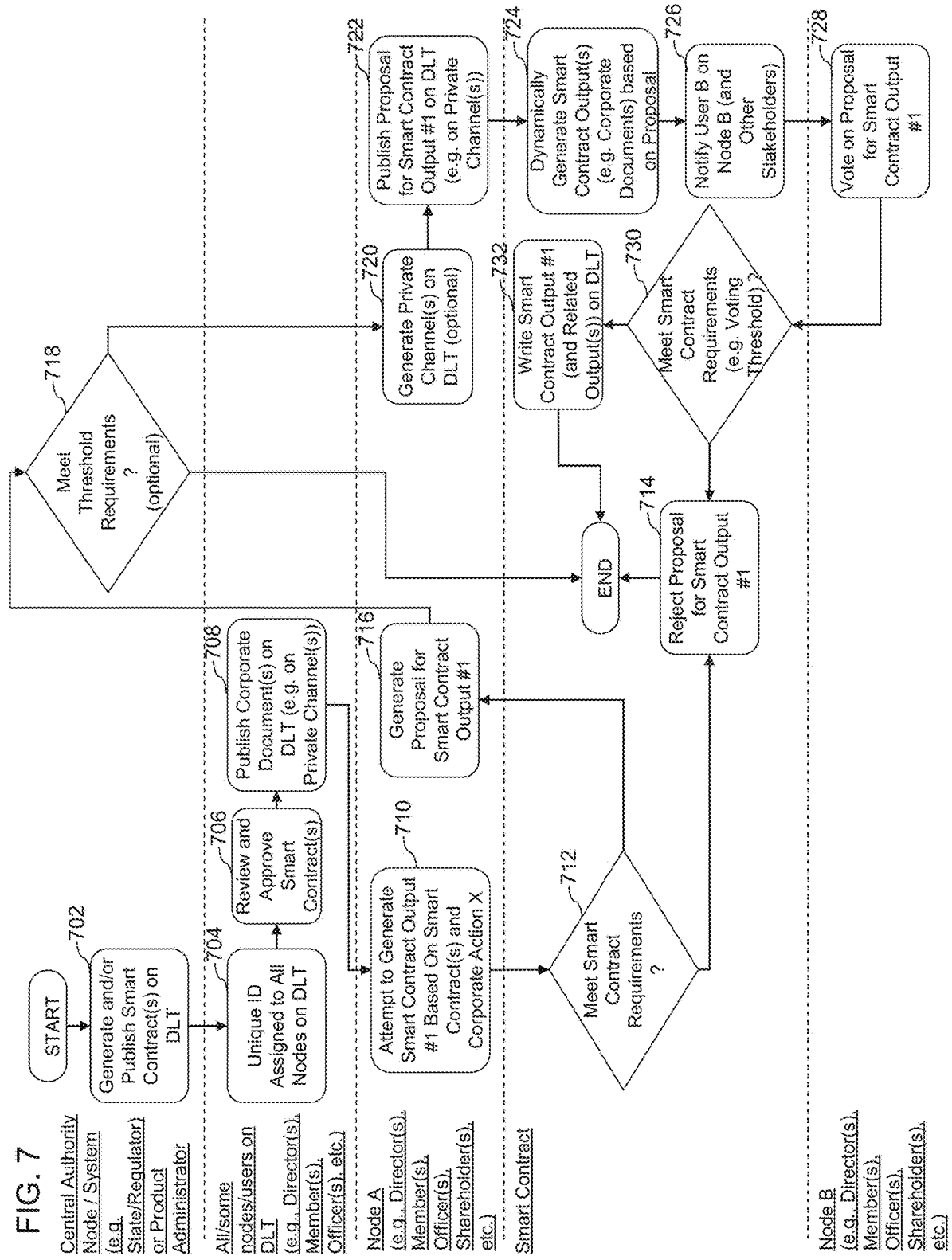
FIG. 7 is a flowchart illustrating an example embodiment(s) of controlling, communicating, and/or managing smart company instruments utilizing one or more smart contracts on a distributed ledger technology platform.

FIG. 7 is a flowchart illustrating an example embodiment(s) of controlling, communicating, and/or managing smart company instruments utilizing one or more smart contracts on a distributed ledger technology platform. As illustrated in FIG. 7, in some embodiments, a central authority or system, such as a state or regulator, and/or a product administrator can generate and/or publish one or more smart contracts for implementing the smart company DLT platform on the DLT or blockchain network at block 702. For example, the one or more smart contracts for implementing the smart company DLT platform can be configured to facilitate one or more processes described herein in relation to the smart company DLT platform.

In some embodiments, all or some nodes and/or users on the DLT or smart company DLT platform can each be assigned a unique network identifier or identity at block 704. The nodes and/or users on the DLT or smart company DLT platform can comprise one or more company secretaries, shareholders, company officers, directors, members, central authorities, or the like. In some embodiments, all or some of the nodes and/or users on the DLT or smart company DLT platform can review and/or approve the published one or more smart contracts at Block 706.

In some embodiments, a node, such as Node A which can be a company secretary, company director, officer, and/or shareholder, or the like, can propose or attempt to generate a first smart contract output based on the published one or more smart contracts and/or some corporate action, such as share issuance, board resolution, incorporation, or the like as described herein, at Block 708. In some embodiments, one or more smart contracts of the smart company DLT platform can be configured to determine whether the proposed corporate action or smart contract output or inputted parameters therefor meet certain requirements for generating a smart contract output or smart corporate action at Block 712. For example, in some embodiments, the smart company DLT platform can be configured to determine whether all of the legally required and/or system required parameters have been inputted. If not, in some embodiments, the Smart company DLT platform can be configured to automatically reject generation of the proposed smart corporate action or first smart contract output at Block 714. In contrast, if it is determined that the proposed corporate action or inputted parameters do meet the requirements for generating a smart contract output or smart corporate action, the smart company DLT platform can allow generation of the proposed first smart contract output. As such, in some embodiments, Node A can then generate the proposal for the first smart contract output or corporate action at Block 716.

In some embodiments, a central authority and/or product administrator can be involved in the validation process by reviewing and/or issuing an acknowledgement if certain requirements are met. As such, in some embodiments, the central authority and/or product administrator can be configured to determine whether certain threshold requirements for the proposed corporate action are met at Block 718; however, this can be optional. In some embodiments, if the central authority and/or product administrator determines that the necessary requirements are not met, the central authority and/or product administrator may not issue an acknowledgement. However, if the central authority and/or product administrator determines that the necessary requirements are met, the central authority may issue an acknowledgement to the network.

In some embodiments, once a proposed corporate action is approved, either by the smart company DLT platform and/or central authority and/or product administrator, Node A may then generate one or more private channels on the DLT or smart company DLT platform at Block 720 in order to control sharing of data; however, this can be optional. In some embodiments, Node A can then publish the first smart contract output or smart corporate action at Block 722, for example on a private channel or publicly. If published on a private channel, only those nodes that are members of the private channel will be able to decrypt the smart corporate action or first smart contract output and access the underlying information; other nodes that are not members of that private channel will only be able to see an encrypted version of the smart corporate action or first smart contract output.

In some embodiments, the smart company DLT platform and/or one or more smart contracts implemented thereon can be configured to dynamically generate one or more smart contract outputs in response to the published first smart contract output at Block 724. For example, the one or more smart contract outputs that are generated can include the first smart contract output as well as any other related actions or outputs that may be triggered by the first smart contract output. For example, if the first smart contract output was for issuance or transfer of company shares, the smart company DLT platform and/or one or more smart contracts implemented thereon can be configured to dynamically generate one or more related corporate documents, such as an updated capitalization table, voting prompts, or the like at Block 724.

In some embodiments, if the first smart contract output requires input, such as votes, from one or more other nodes or users, the smart company DLT platform can be configured to dynamically generate and/or transmit one or more communications and/or notifications to the necessary stakeholders, such as Node B, at Block 726. For example, in order to issue new shares, the company documents or bylaws may require a vote to be held by the company board of directors, in which case the smart company DLT platform can be configured to dynamically generate voting prompts and/or any necessary documents for the vote and transmit the same to each board member user and/or node. In some embodiments, recipients of such communications, such as Node B, can then vote or provide other input on the proposed corporate action or first smart contract output at Block 728. In some embodiments, Node B can comprise one or more directors, officers, members, company secretary, shareholders, or the like as may be necessitated by the proposed corporate action and company documents/requirements.

In some embodiments, once the necessary input and/or votes by related users and/or nodes are received, the smart company DLT platform or one or more smart contracts operating thereon can be configured to determine if the necessary smart contract requirements, such as quorum, votes, or the like, have been satisfied at Block 730. If such requirements have not been met, in some embodiments, the smart company DLT platform can be configured to reject the proposed corporate action or first smart contract output at Block 714. In some embodiments, if such requirements have been met, however, the smart company DLT platform or one or more smart contracts implemented thereon can be configured to record or write the first smart contract output or corporate action and/or any related smart contract outputs, such as an updated capitalization table, shares, or the like, at Block 732.

Private Data Sharing on a DLT Platform

In some embodiments, systems, methods, and devices disclosed herein enable trusted sharing of private data and/or transactions via a distributed ledger, while maintaining data consistency properties. Some embodiments described herein provide and utilize one or more independent and/or dependent channels. In particular, in some embodiments, one or more independent and/or dependent channels can exist on a single distributed ledger, wherein the participants or nodes that are members of a particular channel can view and access the information in a given network transaction. To other participants or nodes not on the particular channel, however, only an encrypted or redacted version of the information can be viewable, thereby not disclosing the transaction information to such participants or nodes. In some embodiments, consistency properties may be preserved even in the presence of this selective sharing of transaction information with proofs of validity, such as transaction replay from a shared log containing encrypted or redacted versions of the same information, or built on cryptographic techniques.

In some embodiments, the systems disclosed herein utilize state machine replication, which is a general method for implementing fault-tolerant services in a distributed system/network. The replicated state machine (RSM) model can guarantee that any two nodes in the network that access the same set of data, process the same set of transactions and run the same deterministic code will reach the same state. However, the RSM model can break down in the presence of privacy in a decentralized network, where individual nodes may access different sets of data, process different sets of transactions, and reach different states (hence inconsistent view of the states). Accordingly, there can be a conflict between consistency and privacy in a decentralized network.

To address this possible conflict, some embodiments of the systems disclosed herein are configured to be a modification to the RSM model to achieve both consistency and privacy in a decentralized network and on a distributed ledger. As such, some embodiments described herein comprise certain features of both an RSM model and distributed ledgers.

In some embodiments, the systems, methods, and devices disclosed herein are configured to enable trusted sharing of private data and/or transactions via a distributed ledger technology. In some embodiments, the distributed ledger technology can be a public and/or a private distributed ledger technology. In some embodiments, the systems disclosed herein are configured to utilize encryption to encrypt data and/or transactions before storing the information within the distributed ledger technology. In some embodiments, the systems disclosed herein are configured to utilize other mechanisms for securing the data and/or transactions before storing the information within the distributed ledger technology. In some embodiments, some network participants that can access the distributed ledger technology will be able to see the existence of the data/transaction but will not be able to read the actual data/transaction stored in the distributed ledger technology because the actual data/transaction is encrypted (or otherwise obscured or hidden or made inaccessible) before it is stored in the distributed ledger technology. In some embodiments, participants that have access to the encryption key used for encrypting the transaction data can access and read the encrypted transaction data that is stored in the distributed ledger technology. In some embodiments, the foregoing encryption key or pair of encryption keys for encrypting transaction data before storing such data on the distributed ledger enables the trusted sharing of private data on a distributed ledger technology, whether the distributed ledger is a public or a private distributed ledger.

For example, a first participant can utilize the systems disclosed herein to encrypt data and/or transaction using an encryption key and publish and/or store the encrypted data on a distributed ledger, such as a blockchain. In this example, a second participant with access to the encryption key can be configured to access the encrypted data/transaction stored on the distributed ledger and use the encryption key to decrypt the transaction data in order to read the private data/transaction information. By publishing the encrypted transaction data, participants of the systems disclosed herein can take advantage of the ability to ensure that the data/transaction is consistent across the entire distributed ledger system. As such, in some embodiments, the systems disclosed herein provide a technical solution to allow private and/or controlled sharing of data/information among certain nodes and/or identities on a distributed ledger with data/information consistency.

In some embodiments, the use of the systems disclosed herein can create one or more secure and/or private channels within the distributed ledger. In some embodiments, such secure channels can be utilized for trusted sharing of private data between selected participants that have access to the encryption key used for encrypting and decrypting the transaction data that is stored in the distributed ledger. Further, such secure channels can also be used for preventing participants that do not have access to the encryption key from accessing the encrypted transaction information stored on the distributed ledger. Additionally, such secure channels can also be used for allowing the encrypted transaction data to be published throughout the entire distributed ledger thereby ensuring the consistency and/or accuracy of the data throughout the distributed ledger system and allowing the transaction data to be accessed by other authorized participants at a later time. In some embodiments, the systems disclosed herein can generate secure channels, also known as encrypted channels, that comprise one or more transactions that are encrypted using the same encryption key. In some embodiments, participants with access to the same encryption key can create a secure channel and access all the data/transactions stored in the secure channel by using the systems disclosed herein.

In some embodiments, the systems disclosed herein can comprise secure channels that can be independent channels and/or interdependent or dependent channels. In some embodiments, an independent channel can comprise transaction data that does not depend upon any data and/or transaction stored in a second secure channel, and/or does not affect any data and/or transaction stored in a second secure channel. In some embodiments, an interdependent or dependent channel can comprise a transaction that relies upon data and/or a transaction stored in a second secure channel, and/or can affect data and/or a transaction stored in a second secure channel.

In some embodiments, the systems disclosed herein can be configured to create a secure channel by generating an identity for a particular participant, wherein the identity is a network-wide unique identifier that can map to a set of cryptographic keys that the identity is associated with. In some embodiments, a first identity can create a secure channel by generating an encryption key, and provide the encryption key to a second identity. By sending the encryption key to the second identity, the first and second identities can use the secure channel to store and/or access encrypted data/transaction by utilizing the encryption key. In some embodiments, the first identity can generate data/transactions and encrypt such data/transactions using the encryption key in order for the system to store such encrypted data/transactions in the distributed ledger. Subsequently, the second identity can utilize the encryption key to access and read the transaction data stored in the distributed ledger. In some embodiments, a third identity, which does not have access to the encryption key, can only determine that the encrypted data/transactions exist in the distributed ledger but cannot access and/or read the transaction data.

In some embodiments, the secure channel is a dependent or an interdependent channel wherein an identity can access a first data/transaction in the first secure channel that is stored on the distributed ledger by using the encryption key of the first secure channel but also needs to access a second secure channel stored on the same distributed ledger in order to process the first data/transaction, which is dependent on one or more data/transactions stored in the second secure channel. In some embodiments, the first data/transaction comprises a second encryption key that enables the identity to access the one or more data/transactions stored in the second secure channel.

In some embodiments, the systems disclosed herein can be configured to implement an identity feature in the network. In some embodiments, an identity is a network-wide unique string identifier that maps to a set of cryptographic keys. In some embodiments, the set of cryptographic keys include at least a key pair for encryption and a key pair for signature.

In some embodiments, the systems disclosed herein can be configured to process a first type of transaction, also referred to as RegisterIdentity. In some embodiments, the RegisterIdentity transaction is a transaction message that contains the string representing the identity and the set of cryptographic key pairs associated with this identity, where each cryptographic key pair consists of a public key and a corresponding private key In some embodiments, RegisterIdentity establishes an identity in the network, and in some embodiments, the identity can execute other types of transactions and/or validate transactions posted by other identities.

In some embodiments, all smart-contract level matters (including identity, privacy, and the like) are completely independent of network topology. In some embodiments, an identity is the role that executes various actions/transactions in the network, and there can be multiple identities on a single node. In some embodiments, a node, when processing an action of a given identity, that can originate from another node, cannot tell from what node that action originated or which node hosts a particular identity, and in some embodiments, there may be no way to find out within the protocol. In some embodiments, the system may be configured to potentially sniff network traffic with the appropriate instrumentation in SmartLog etc. to determine what node that action originated or which node hosts a particular identity.

In some embodiments, identities can create encrypted channels, which can be referred to as secure channels as discussed above. In some embodiments, a channel is a sequence of states. In some embodiments, a secure channel is a namespace for executing a set of transactions among a group of identities. In some embodiments, the transactions in a single channel are encrypted with the same key. In some embodiments, independent channels are independent insofar as a transaction in one channel has no effect on any other channel on the distributed ledger. In some embodiments, the set of independent channels can be viewed as a set of independent replicated state machines.

In some embodiments, the systems disclosed herein can be configured to process one, two, three or more transactions for establishing a new secure channel. In some embodiments, the systems disclosed herein can be configured to distribute or electronically transmit the channel encryption key to various identities or participants that are authorized to join (or be part of) the channel. In some embodiments, an identity or participant that is authorized to join a secure channel has the permission and ability to access and/or read data/transactions within the secure channel and/or be able to or be permitted to write transactions to the secure channel.

In some embodiments, the systems disclosed herein can be configured to execute another type of transaction referred to as MakeNewChannel. In some embodiments, the MakeNewChannel transaction is configured to create each new secure channel. In some embodiments, the channel creator is referred to as the owner of the channel. In some embodiments, the owner generates the initial channel encryption key (for example, a symmetric key) and uses this key to encrypt the MakeNewChannel transaction.

In some embodiments, the systems disclosed herein can be configured to execute another type of transaction referred to as SendKey. In some embodiments, the SendKey transaction is configured to allow the owner of a channel to send or electronically transmit the current channel encryption key to an identity or participant that the owner wants to invite to join the channel. In some embodiments, the systems disclosed herein can be configured to use the transaction message to include the channel information (for example, channel name) and/or the channel key. In some embodiments, the systems disclosed herein are configured to encrypt the transaction message using the public encryption key of the identity (which in some embodiments has already been provided in the RegisterIdentity transaction).

In some embodiments, the systems disclosed herein can be configured to generate a public channel wherein all participants in the network can access the data/transactions stored in the channel. In some embodiments, the systems disclosed herein are configured to use RegisterIdentity and SendKey transactions, which can both be posted in the public channel.

In some embodiments, the systems disclosed herein can be configured to establish an identity on a particular node of the network. Therefore, in some embodiments, only that node stores the secrets for the identity, wherein such secrets include the private keys of the identity (for signing and for decryption and/or encryption) and/or the channel keys for all the channels that the identity has joined. In some embodiments, it can be said that a node is able to decrypt a transaction posted in channel A to refer to the fact that the node has a registered identity that belongs to channel A. In some embodiments, the systems disclosed herein are configured such that each node keeps track of which identities have which channel access rights, as many different identities may be registered on a single node. In some embodiments, the systems disclosed herein can be configured such that a node controls which identity's credentials to use for which transaction in the network.

In some embodiments, the systems disclosed herein can be configured such that each transaction is signed by the identity that posts the transaction using its private signing key. In some embodiments, the systems disclosed herein can be configured to omit the signing step. In some embodiments, the systems disclosed herein can be configured to require that each transaction be signed by the identity that posts the transaction using the identity's signing key.

In some embodiments, the systems disclosed herein can be configured to allow for a set of identities associated with a channel A to overlap with a set of identities associated with a channel B.

In some embodiments, the systems disclosed herein can be configured to allow an identity to directly or indirectly correspond to a real-world participant. In some embodiments, the systems disclosed herein can be configured to allow an identity to typically correspond to a real-world participant.

In some embodiments, the systems disclosed herein can be configured to implement independent secure channels, wherein the transactions in different channels are completely independent of each other. However, in certain real application scenarios, it can be possible that in order to process a transaction in a given channel, information about another channel is needed. For example, for managing share ownership in a company, one can want shareholder workflows to be dependent on the information about the company as a whole (for example, total shares outstanding), but such information about particular shareowners' positions should be private. Without channel interdependencies, either every shareholder could see everyone else's positions, or a stock split at the company-level would not be able to affect the shareholder positions.

In some embodiments, the systems disclosed herein can be configured to allow transactions posted in any of the secure channels to depend on the data in a public channel, since information in the public channel is accessible by all members.

In some embodiments, the systems disclosed herein can be configured to allow execution of a transaction that only results in the modification of data associated with a single channel, which can be referred to as a write channel.

In some embodiments, the systems disclosed herein can be configured to process a transaction using data in other channels, which can be referred as a read channel, so long as the data carries a proof of validity.

In some embodiments, the systems disclosed herein can be configured to provide the proof of validity through a set of channel encryption keys for each of the dependent read channels. This can be sufficient to prove the validity of the data since the keys allow us to decrypt past transactions in the dependent channels and verify the transactions. In some embodiments, the foregoing process is called replay. In some embodiments, a proof of validity can take different forms, such as a zero-knowledge proof (ZKP), verifiable computation, authenticated data structures, and the like.

In some embodiments, the systems disclosed herein can be configured to perform another type of transaction referred to as Execute. In some embodiments, the Execute transaction is configured to take all necessary inputs from the read channels and the corresponding channel keys, verify the inputs and execute the code embedded in the transaction. In some embodiments, the transaction message is encrypted using the current channel key.

In some embodiments, the systems disclosed herein can be configured to change channel membership. In some embodiments, the systems disclosed herein can be configured to store a set of identities associated with a particular secure channel wherein the set of identities can be dynamic. In some embodiments, the systems disclosed herein can be configured to allow new identities to be added, and/or to allow existing identities to be removed. In some embodiments, the systems disclosed herein can be configured to revoke an identity's access to future transactions in the channel, which can be accomplished by key rotation.

In some embodiments, the systems disclosed herein can be configured to use key identifiers also referred to as keyId, which can be a string that uniquely identifies each channel key. In some embodiments, security properties can be associated with a key identifier in order to protect the key identifier from being impermissibly modified and/or used and/or transmitted and/or accessed.

In some embodiments, the systems disclosed herein can be configured to implement key rotation using the FreezeChannel transaction and/or the RotateKey transaction.

In some embodiments, the systems disclosed herein can be configured to utilize the FreezeChannel transaction, wherein the transaction can be configured to inform all the members in a given channel that key rotation is about to happen. In some embodiments, the systems disclosed herein can be configured to use a transaction message that contains the channel name and the key identifier of the new channel key. The message can be encrypted with the current channel key, for example, the encryption key prior to rotation. In some embodiments, the systems disclosed herein can be configured to view encrypted transactions in a given channel as a chain, and the new key identifier in FreezeChannel is the link between a transaction encrypted with the current key and the next transaction encrypted with the new key.

In some embodiments, the systems disclosed herein can be configured to utilize the RotateKey transaction, wherein the transaction message is posted immediately after the FreezeChannel transaction and contains the old channel key that is encrypted with the new channel key. This allows the recovery of all past channel keys—when an identity receives the current channel key, it can replay and/or execute all past transactions posted in the channel by retrieving all past channel keys that are stored (in encrypted form) in the RotateKey transactions.

In some embodiments, the systems disclosed herein can be configured to allow for changing channel ownership. In some embodiments, the systems disclosed herein can be configured to allow ownership of a channel to be dynamic or changeable. In some embodiments, the systems disclosed herein can be configured to change channel ownership by utilizing the AddOwner transaction and/or the RemoveOwner transaction.

In some embodiments, the systems disclosed herein can be configured to utilize the AddOwner transaction, wherein the transaction can include the channel name and/or the identity of the owner to be added.

In some embodiments, the systems disclosed herein can be configured to utilize the RemoveOwner transaction, wherein the transaction can include the channel name and/or the identity of the owner to be removed.

In some embodiments, the systems disclosed herein can be configured to allow each transaction to be posted by one of the owners of the channel and/or encrypted with the channel key. In some embodiments, the systems disclosed herein can be configured to allow the creator of the channel to add other identities as an owner; however, such actions can potentially result in the creator losing control of the channel if one of the other owners removes the channel creator from the list of owners and/or rotates the channel key. In some embodiments, the foregoing can be an advantageous feature of the systems disclosed herein.

In some embodiments, the systems disclosed herein can be configured to allow for the reserving of channel names. In some embodiments, the systems disclosed herein can be configured to allow for the use the ReserveIdentifier transaction to avoid the issue of channel name collision, wherein more than one identity desires to use the same channel name.

In some embodiments, the systems disclosed herein can be configured to utilize the ReserveIdentifier transaction, wherein the transaction can be executed together with the MakeNewChannel transaction. In some embodiments, when a channel is created, the state name needs to be reserved so that there cannot be two different channels with the same channel name.

In some embodiments, the systems disclosed herein can utilize the following specifications and/or definitions:

Asymmetric encryption:

$$ASym.Gen(\ )\rightarrow(pk\_enc,sk\_enc)$$

$$ASym.Encrypt(pk\_enc,m)=c$$

$$ASym.Decrypt(sk\_enc,c)=m$$

In some embodiments, the systems disclosed herein can be configured to allow posting encrypted channel keys on the distributed log. In some embodiments, the systems disclosed herein can be configured to use other mechanisms.

Symmetric encryption:

$$Sym.Gen(\ )\rightarrow(key)$$

$$Sym.Encrypt(key,m)\rightarrow c$$

$$Sym.Decrypt(key,c)\rightarrow m$$

Signature:

$$Sig.Gen(\ )\rightarrow(pk\_sig,sk\_sig)$$

$$Sig.Sign(sk\_sig,m)\rightarrow s$$

$$Sig.Verify(pk\_sig,s,m)\rightarrow\{0,1\}$$

In some embodiments, the systems disclosed herein can use one or more of the following crypto algorithms, among others:

Asymmetric encryption: RSA, Elliptic Curve based asymmetric encryption
Symmetric encryption: AES
Signature: ECDSA, RSA
Hash function: SHA256

In some embodiments, it can be specified how the transaction is composed for each type of transaction (for example, through the generation process mechanism) and/or how transaction is parsed and/or verified by each node (for example, through a verification process mechanism). Some example transaction types and/or algorithm details are provided below.

In particular, to help parse the algorithm specifications below, certain steps that can be common in all the transactions, which may not necessarily be the case, are highlighted.

For example, the transaction message format can be written as follows (note: "x∥y" can be used to denote concatenation of the two messages x and y):

$$m=requestId\|identity\|specific\_message\|nonce,$$

where requestId is a job identifier from a contract and nonce is a (pseudo)random string of length 32 bytes that is unique to each transaction.

For signing, in some embodiments, each transaction message can be signed by the identity who posts the transaction using its private signing key.

For encryption, in some embodiments, for a transaction posted in a secure channel, the signed message can be encrypted using the current channel key, and a key identifier can be attached to the encrypted message so that the key can be easily identified and retrieved during the verification process.

Further, in some embodiments, for SendKey, the payload can be encrypted using the recipient's public key.

In addition, in some embodiments, for a transaction posted in the public channel, the message can be encrypted using the public key of the public channel. In some embodiments, RegisterIdentity, ReserveIdentifier, SendKey are posted in the public channel, and/or all the other transactions are posted in a secure channel. In some embodiments, there can be a special public/private key pair for the public channel.

For owner-only posting, in some embodiments, anyone can post RegisterIdentity, Execute, and SendKey. In some embodiments, all other types of transactions can only be posted by the owner of a channel.

Figure 9:
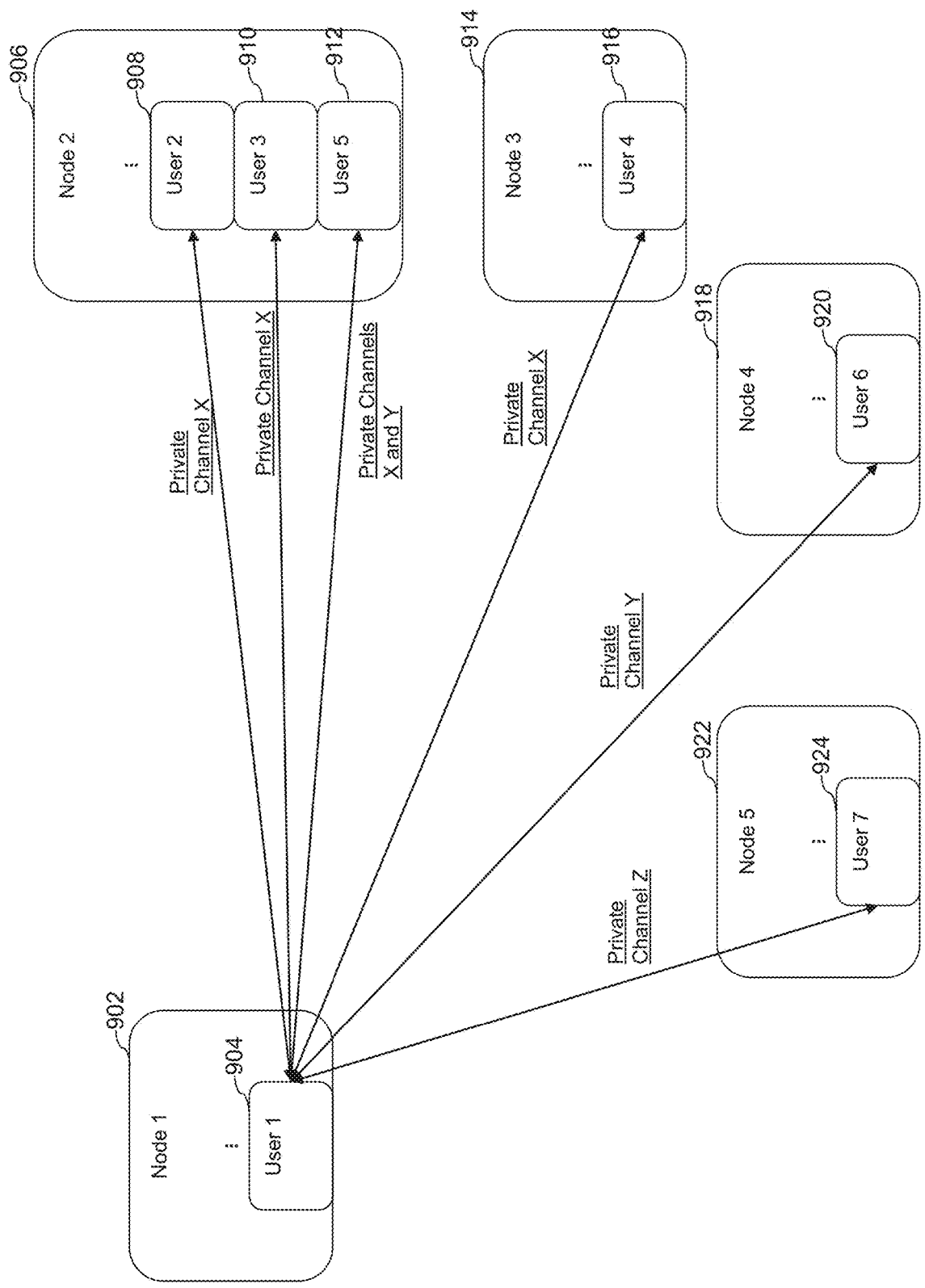
FIG. 9 is a schematic diagram illustrating an example embodiment(s) of private or controlled sharing of information on a distributed ledger through one or more secure, private channels.

FIG. 9 is a schematic diagram illustrating an example embodiment(s) of private or controlled sharing of information on a distributed ledger through one or more secure, private channels. As discussed herein, in some embodiments, sharing of information and/or data on a DLT can be controlled, such that only certain nodes and/or users on the DLT have access to certain information or data. In some embodiments, controlled or private sharing of data on a DLT can be based on a particular node(s) and/or user(s). For example, one or more users can be on a single node; however, by even if on the same node, different users thereon can be given different levels of access to information, such as through utilization of network identities as described herein.

As illustrated in FIG. 9, in some embodiments, a DLT platform, such as a smart UCC platform or smart company DLT platform as discussed herein, can comprise one or more nodes, such as Node 1 902, Node 2 906, Node 3 914, Node 4 918, Node 5 922, and/or any additional nodes. Each of the nodes can comprise one or more users on different private channels with access to different information. For example, in the illustrated embodiment, User 1 904 on Node 1 902 and User 2 908 on Node 2 906 can be on Private Channel X, sharing certain information privately on a DLT. Further, User 3 910 on Node 2 906, the same as User 2 908, can also be on Private Channel X, as well as User 4 916, which can be on a different node, Node 3 914. Similarly, User 6 920 on Node 4 918 can be on a different private channel, Private Channel Y, with User 1 904, sharing different information. Further, user 5 912 on Node 2 906 can be on both Private Channels X and Y, thereby having access to information on both private channels. Furthermore, there can be third private channel, Private Channel Z on which only User 1 904 of Node 1 902 and User 7 924 of Node 5 922 can be members of, thereby sharing certain information only between such two users and/or nodes.

State Machine Replication

In some embodiments, the systems, methods, and devices described herein are configured to utilize state machine replication or a modified version thereof, whether in connection with independent or dependent channels. In other words, in some embodiments, one or more features/processes described herein for state machine replication can be used for and/or in combination with one or more features/processes described herein for independent channels and/or dependent or interdependent channels. In some embodiments, one or more processes described herein relating to state machine replication can allow for and/or facilitate controlled and private sharing of data and information while maintaining data and information consistency on a distributed ledger.

Figure 10A:
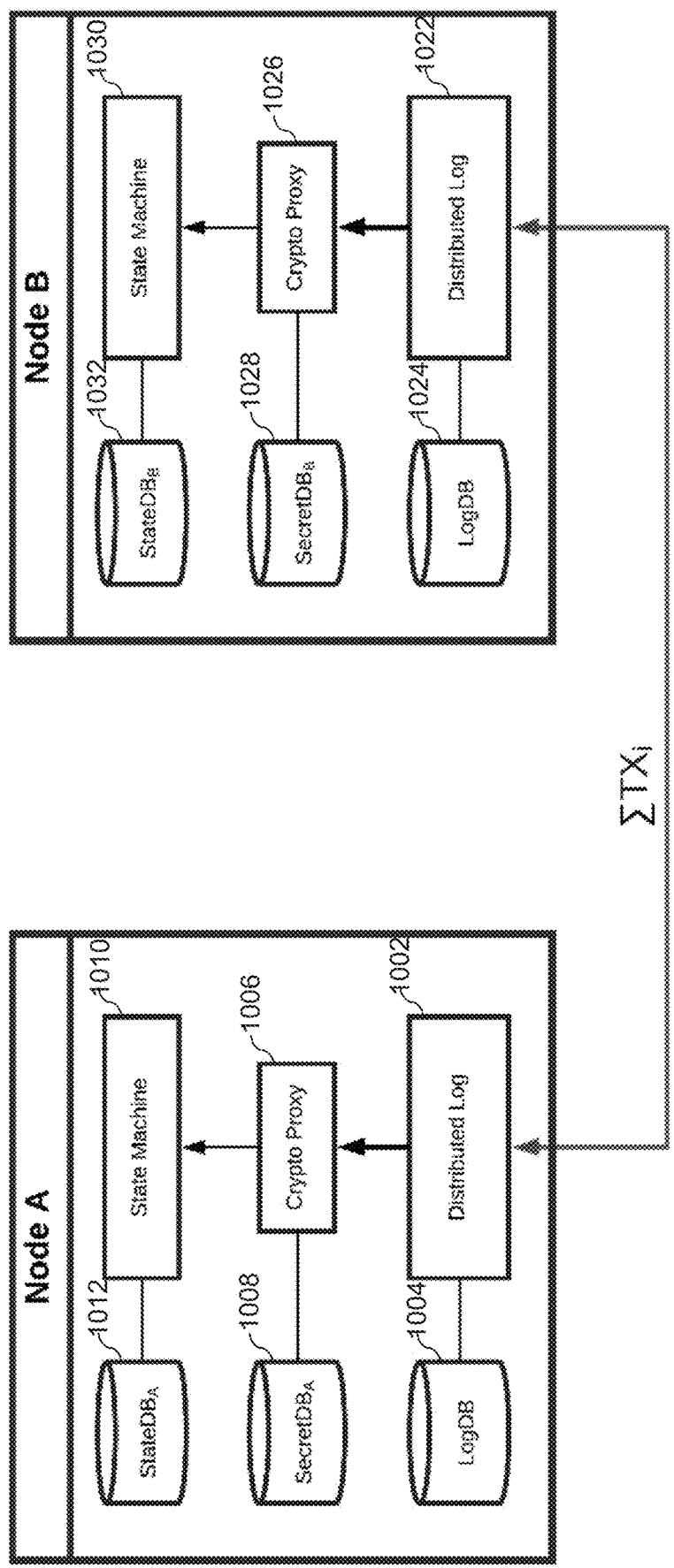
FIG. 10A is a schematic diagram illustrating an example embodiment(s) of nodes in the network and state machine replication.

FIG. 10A illustrates an example embodiment(s) of nodes in the network and state machine replication. As illustrated in FIG. 10A, in some embodiments, each of the nodes on the system can comprise a Distributed Log 1002, 1022. In other words, the same Distributed Log 1002, 1022 can exist on every node on the system, which can include Nodes A and B in the illustrated example. Nodes A and B can be the same node and/or different nodes. In some embodiments, one or more identities can be present on each node.

In some embodiments, the Distributed Log 1002, 1022 can be shared and ordered identically among one or more and/or all of the nodes on the system. In other words, in some embodiments, the same sequence of operations and how one operation depends upon the previous operation(s) can be tracked by every node on the distributed ledger system or network to guarantee and maintain data/information consistency. For example, every arbitrary transaction in the Distributed Log or a set thereof ("$\Sigma\ TX_i$") can be logged in the Distributed Log 1002, 1022 in the same order on every node in the system, including Node A and Node B. In some embodiments, every arbitrary transaction in the Distributed Log ("$\Sigma TX_i$") can be encrypted.

In some embodiments, each or some nodes on the system, such as Node A and Node B, can comprise a Log Database 1004, 1024 for storing the contents or transactions logged in the Distributed Log, such as $\Sigma\ TX_i$. In some embodiments, the same encrypted set of arbitrary transactions ("$\Sigma\ TX_i$") can be stored in the Log Database 1004, 1024 of every node on the system, including Nodes A and B.

In some embodiments, each or some nodes on the system, comprises a Crypto Proxy 1006, 1026 for encrypting and/or decrypting one or more transactions using an encryption key, such as a symmetric key or asymmetric key. In some embodiments, each or some nodes on the system, comprises a Secret Database 1008, 1028 for storing one or more encryption keys. The Secret Databases 1008, 1028 of each or some nodes on the system may have different encryption keys stored thereon. For example, in some embodiments, a Secret Database on Node A 1008 ("SecretDB$_A$") can have stored thereon an encryption key for Channel X but not for Channel Y, for instance if Node A is a member of Channel X but not Channel Y. However, a Secret Database on Node B 1028 ("SecretDB$_B$") can have stored thereon an encryption key for Channel Y but not for Channel X, for instance if Node B is a member of Channel Y but not Channel X.

In some embodiments, the Crypto Proxy 1006, 1026 on each or some nodes on the system can be configured to retrieve an appropriate encryption key from its respective Secret Database 1008, 1028 for encrypting and/or decrypting a particular transaction for a particular channel. For example, if a node is generating a new transaction and/or a new channel, a Crypto Proxy 1006, 1026 on that node can encrypt the new transaction using an encryption key for that channel, which can be stored on the Secret Database 1008, 1028 of that node. Further, in some embodiments, a Crypto Proxy 1006, 1026 on a node may decrypt an encrypted transaction on the Distributed Log 1002, 1022 if the node has stored in its Secret Database 1008, 1028 the applicable encryption key for that transaction and channel. If so, then a Crypto Proxy 106, 126 on the node may retrieve an encrypted transaction from the Distributed Log 1002, 1022 or Log Database 1004, 1024 and also retrieve the applicable encryption key from the Secret Database 1008, 1028 on that node and decrypt the transaction.

In some embodiments, each or some nodes on the system, comprises a State Machine 1010, 1030 for executing one or more transactions that have been decrypted. In some embodiments, each or some nodes on the system, comprises a State Database 1012, 1032 for storing state information obtained by executing one or more decrypted transactions. The State Databases 1012, 1032 of each or some nodes on the system may have different states stored thereon for one or more channels. For example, in some embodiments, a State Database 1012 on Node A ("StateDB$_A$") can have stored thereon up-to-date state information for Channel X but not for Channel Y, for instance if Node A is a member of Channel X but not Channel Y. However, a State Database 1032 on Node B ("StateDB$_B$") can have stored thereon up-to-date state information for Channel Y but not for Channel X, for instance if Node B is a member of Channel Y but not Channel X.

In some embodiments, the State Machine 1010, 1030 on each or some nodes on the system can be configured to retrieve a decrypted transaction from its respective Crypto Proxy 1006, 1026 and execute the decrypted transaction for a particular channel. In some instances, if a transaction is not encrypted in the first place, for example because there is no reason to privately share that transaction among only a select number of nodes, the State Machine 1010, 1030 on every node on the system can be configured to execute the transaction to reach the same state without need for decryption.

As such, in some embodiments, the system can be configured to utilize a state machine replication scheme or process, in which two inputs are inputted into the state machine on each or some of the nodes on the system. More specifically, in some embodiments, one or more encrypted transactions from a Distributed Log 1002, 1022 or Log Database 1004, 1024 can be inputted into a Crypto Proxy 1006, 1026, which can use an encryption key retrieved from a Secret Database 1008, 1028 to decrypt the one or more encrypted transactions, if the particular node has the applicable encryption key stored in its Secret Database 1008, 1028. Then, in some embodiments, the decrypted one or more transactions can be inputted into the State Machine 1010, 1030 at each or some nodes on the system for execution to obtain the resulting state information. As such, in some instances, only those nodes (and state machines thereon) on the network or system with an applicable encryption key for that transaction (and/or on the particular channel for that transaction) will be able to execute the transaction and obtain the resulting state information for that channel; other nodes not on the channel and without the applicable encryption key may have different state information for the same channel as they are not able to execute the transaction.

Moreover, in some embodiments, for transactions that were never encrypted in the first place, the State Machine 1010, 1030 on each and every node on the system can be configured to execute such transactions without having its Crypto Proxy decrypt such transactions; as such, for such transaction that were not previously encrypted, all nodes on the system (and state machines thereon) can have the same state information for that transaction or public channel. In some embodiments, transactions that were not previously encrypted prior to broadcasting on the distributed log can be deemed to be on a public channel without any encryption.

In some embodiments, the Log Database 1004, 1024 on each and every node on the system can comprise the same data/information in the same order. However, in some embodiments, the Secret Database 1008, 1028 on at least some of the nodes on the system can comprise a set of different encryption key data if these nodes are on a different set of channels. At the same time, in some embodiments, the Secret Database 1008, 1028 on at least some of the nodes on the system can share at least some of the same encryption key data if these nodes are on at least one common channel. Also, in some embodiments, the State Database 1012, 1032 on at least some of the nodes on the system can comprise different state information if these nodes are on a different set of channels. At the same time, in some embodiments, the State Database 1012, 1032 on at least some of the nodes on the system can share at least some of the same state information for at least one channel if these nodes are on at least one common channel.

In some embodiments, each and every node on the system can comprise identical components of a Distributed Log 1002, 1022, Log Database 1004, 1024, Crypto Proxy 1006, 1026, Secret Database 1008, 1028, State Machine 1010, 1030, and State Database 1012, 1032. In some embodiments, each and every node on the system can comprise at least one or more of the foregoing components but not necessarily all. In some embodiments, each and every node on the system can comprise all of the foregoing identical components but different additional components.

State Information v. Log Information

In some embodiments, one or more encrypted transactions can be broadcasted to all nodes on a distributed ledger system or network. These encrypted transactions can be written/stored on the distributed log by each and every node on the distributed ledger in some embodiments.

Further, in addition to storing these encrypted transactions, in some embodiments, those nodes on the distributed ledger that possess the appropriate encryption key for decrypting a particular encrypted transaction can decrypt the transaction using the encryption key, execute the decrypted transaction according to the program logic, and/or update state information as a result of the execution. In some embodiments, state information is also stored in a database on, attached to, and/or accessible by each node, such as in a State Database. In some embodiments, those nodes on the distributed ledger without the appropriate encryption key will not be able to decrypt or execute the encrypted transaction and as such will not be able to update state information accordingly.

Figure 10B:
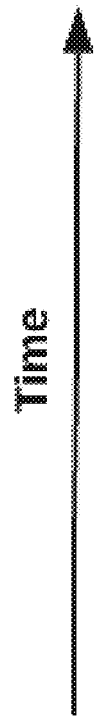
FIG. 10B is a schematic diagram illustrating an example embodiment(s) of data stored on a Log Database and data stored on a State Database.

FIG. 10B illustrates an example embodiment(s) of data stored on a Log Database and data stored on a State Database, regardless of whether from utilizing an independent, interdependent or dependent channel, or public channel. In the illustrated example, the top row, denoted $TX_X^j$ refers to arbitrary and encrypted transactions in some channel, Channel X. For example, a First Encrypted Transaction ("$TX_X^1$"), a Second Encrypted Transaction ("$TX_X^2$"), and a Third Encrypted Transaction ("$TX_X^3$") may be generated and broadcasted to nodes on a distributed ledger.

In some embodiments, every node on the distributed ledger can store each encrypted transaction on Channel X, once broadcasted, in a Log Database ("Log DB'"). In other words, the Log Database can have stored thereon a list of transactions that are ever created and broadcasted on the distributed ledger. In particular, in the illustrated example, after the First Encrypted Transaction is broadcasted, the First Encrypted Transaction $TX_X^1$ can be stored on the Log Database. For illustrative purposes, the First Encrypted Transaction can contain the information x=0. Similarly, in the illustrated example, after the Second Encrypted Transaction is broadcasted, then the Log Database at that time can have stored thereon both the First Encrypted Transaction $TX_X^1$ and the Second Encrypted Transaction $TX_X^2$. For illustrative purposes, the Second Encrypted Transaction can contain the information x+=3. Further, in the illustrated example, after the Third Encrypted Transaction is broadcasted, then the Log Database at that time can have stored thereon both the First Encrypted Transaction $TX_X^1$, the Second Encrypted Transaction $TX_X^2$, and the Third Encrypted Transaction $TX_X^3$. For illustrative purposes, the Third Encrypted Transaction can contain the information x+=5.

In some embodiments, those nodes with an applicable encryption key to decrypt the encrypted transactions will be able to decrypt and execute the transaction and update the State Database on that node with the updated state information for Channel X. In the illustrated embodiment, "$State_X^j$" denotes the contents of the State Database corresponding to Channel X as of Transaction j in Channel X. For example, a node with an encryption key to decrypt the First Encrypted Transaction $TX_X^1$ will be able to decrypt and execute the First Encrypted Transaction to obtain the state information x=0, which can be stored in the State Database of that node. In other words, the State of Channel X after the first transaction ("$State_X^1$") can be x=0.

Further, after the Second Encrypted Transaction $TX_X^2$ is broadcasted, a node with an encryption key to decrypt the Second Encrypted Transaction $TX_X^2$ can decrypt and execute the same to obtain the state information x=3 (by executing x+=3 to the last previous state x=0) for Channel X. In other words, the State of Channel X after the second transaction ("$State_X^2$") can be x=3. Similarly, after the Third Encrypted Transaction $TX_X^3$ is broadcasted, a node with an encryption key to decrypt the Third Encrypted Transaction $TX_X^3$ can decrypt and execute the same to obtain the state information x=8 (by executing x+=5 to the last previous state x=3) for Channel X. In other words, the State of Channel X after the third transaction ("$State_X^3$") can be x=8.

Independent Channel

As described above, generally speaking, one advantage of a distributed ledger technology (DLT) system can be that consistency can be guaranteed across all one or more nodes on the distributed ledger system. In other words, every node on the DLT platform or network can be known to have an identical set of information, at any point in time. However, in order to do so, all information on the distributed ledger can be generally viewable on all nodes on the system, which may not be ideal or acceptable. Rather, it may be desirable to keep certain information private or secret from certain participants, which may not be technically possible on certain existing distributed ledger technologies. As such, applications of DLT can be limited due to the lack of ability privately share information on a distributed ledger.

One way to address this technical shortcoming of DLTs can be to use pseudonyms to handle anonymity and privacy, as in some cryptocurrency systems. However, there are significant limitations to this solution, as data besides the identities are not hidden, and even the identity information may be leaked this way. Another possible solution can be to split a single distributed ledger into two or more distributed ledgers—either logical or physical—in which only those participants proxy to the same information would be on a same distributed ledger. However, if multiple distributed ledgers are used, then data/information consistency may no longer guaranteed among the plurality of distributed ledgers, thereby negating one of the key technical advantages of distributed ledgers.

As such, to address such technical problems, namely to allow private or controlled sharing of information on a single distributed ledger while preserving consistency of all information among all of the nodes on the distributed ledger, certain systems described herein provide and utilize one or more independent and/or dependent or interdependent channels. In particular, in some embodiments, one or more independent and/or dependent or interdependent channels can exist on a single distributed ledger, wherein participants or nodes on a particular channel are able to view and access the same underlying information of a broadcasted transaction. To other participants or nodes not on the particular channel, however, only an encrypted version of the information can be viewable, thereby not disclosing the underlying information to such participants or nodes not on the channel. At the same time, however, encrypted versions of the same underlying information can be written onto the distributed ledger at every node, thereby maintaining data consistency of the distributed ledger, while allowing controlled and private sharing of information as desired among only certain identities or nodes on the distributed ledger.

In particular, FIG. 11A illustrates an example embodiment(s) of private or controlled sharing of information on a distributed ledger through an independent secure channel. However, certain processes and/or features described in connection with FIG. 11A can also be applicable to dependent or interdependent channels. Referring to FIG. 11A, in some embodiments, a participant or Identity A ("$I_A$") can be on Node A ("$N_A$"), which is part of a distributed ledger network or system. Node B ("$N_B$") and Node C ("$N_C$") can also be part of the same distributed ledger network or system. Nodes A, B, and/or C can be the same node and/or different nodes. In some embodiments, one or more identities can be present on each node.

In some embodiments, Identity A can create private channel, Channel X ("$C_X$") just with members Node A and Node B, but not including Node C. In particular, Identity A can generate an encryption key, which can be a symmetric or asymmetric key, for the new channel. More specifically, in the illustrated example, Identity A can generate Symmetric Key X ("$K_X$") at block 1102. In some embodiments, Node A can store Symmetric Key X in a database or a secure database, such as Secret Database A ("$SecretDB_A$") that Node A has access to. In order to create Channel X, in some embodiments, Node A and/or Identity A through Node A can send Symmetric Key X to Node B at block 1104. Upon receipt of Symmetric Key X, Node B can store Symmetric Key X in a database or a secure database, such as Secret Database B ("$SecretDB_B$"), on and/or accessible by Node B at block 1106. As such, in some embodiments, at this stage, only Nodes A and B have access to Symmetric Key X.

In some embodiments, at block 1108, Node A and/or Identity A through Node A can create an unencrypted or decrypted Transaction X ("$TX_X^d$") to add to Channel X at block 1108. In other words, this Transaction X can be generated by Node A for sharing only with Node B among all nodes on the distributed ledger network or system. However, prior to broadcasting Transaction X on the distributed ledger network or system, Node A can encrypt Transaction X at block 1108 with Symmetric Key X. The encrypted version of Transaction X with Symmetric Key X can be denoted "$Enc_x(TX_X^d)$." In some embodiments, Node A can then broadcast Transaction X in an encrypted form with Symmetric Key X to all nodes on the DLT at block 1108.

In some embodiments, all nodes on the distributed ledger network or system can then write the encrypted version of Transaction X to the Distributed Log at block 1110, thereby maintaining data/information consistency throughout the whole distributed network/system and nodes thereon. However, not all nodes will be able to decrypt the encrypted version of Transaction X to access the underlying plaintext or information of Transaction X.

For example, in the illustrated example, Node C does not have access to Symmetric Key X. In other words, the Crypto Proxy on Node C may not have Symmetric Key X and therefore cannot decrypt the encrypted version of Transaction X with Symmetric Key X. As such, in some embodiments, Node C can rather simply ignore Transaction X after logging the encrypted version of Transaction X on its Distributed Log for data/information consistency of the distributed ledger at block 1112.

In contrast, in the illustrated example embodiment, Node A and Node B have access to Symmetric Key X. In other words, in the illustrated example embodiment, the Crypto Proxy on Node A and the Crypto Proxy on Node B both have Symmetric Key X and therefore are able to decrypt Transaction X previously encrypted with Symmetric Key X at block 1114 to access the underlying plaintext or information. After decryption, the decrypted or unencrypted version of Transaction X can be passed by Node A and Node B to the State Machine of each node at block 1114. In some embodiments, each State Machine on Node A and Node B can then execute the unencrypted or decrypted version of Transaction X and update the State Database on Node A ("StateDB$_A$") and the State Database on Node B ("StateDB$_B$") for Channel X accordingly at block 1116. As such, in this illustrated example, all members of Channel X at this point (i.e., Node A and Node B) have now executed Transaction X.

In some embodiments, one or more processes described herein in connection with FIG. 11A can be repeated for all or a set of one or more transactions in Channel X, which can be denoted "$\Sigma\ TX_x$."

After creating a particular channel, such as Channel X in the example illustrated in FIG. 11A, it may be in the interest of the initial channel members to extend the channel membership to a new member in order to share the private or controlled information of the channel with another node. As such, in some embodiments, the system allows for addition of new members or nodes to existing channels to expand controlled sharing of information with the new member or node, while still maintaining consistency of information across the distributed ledger.

Figure 11B:
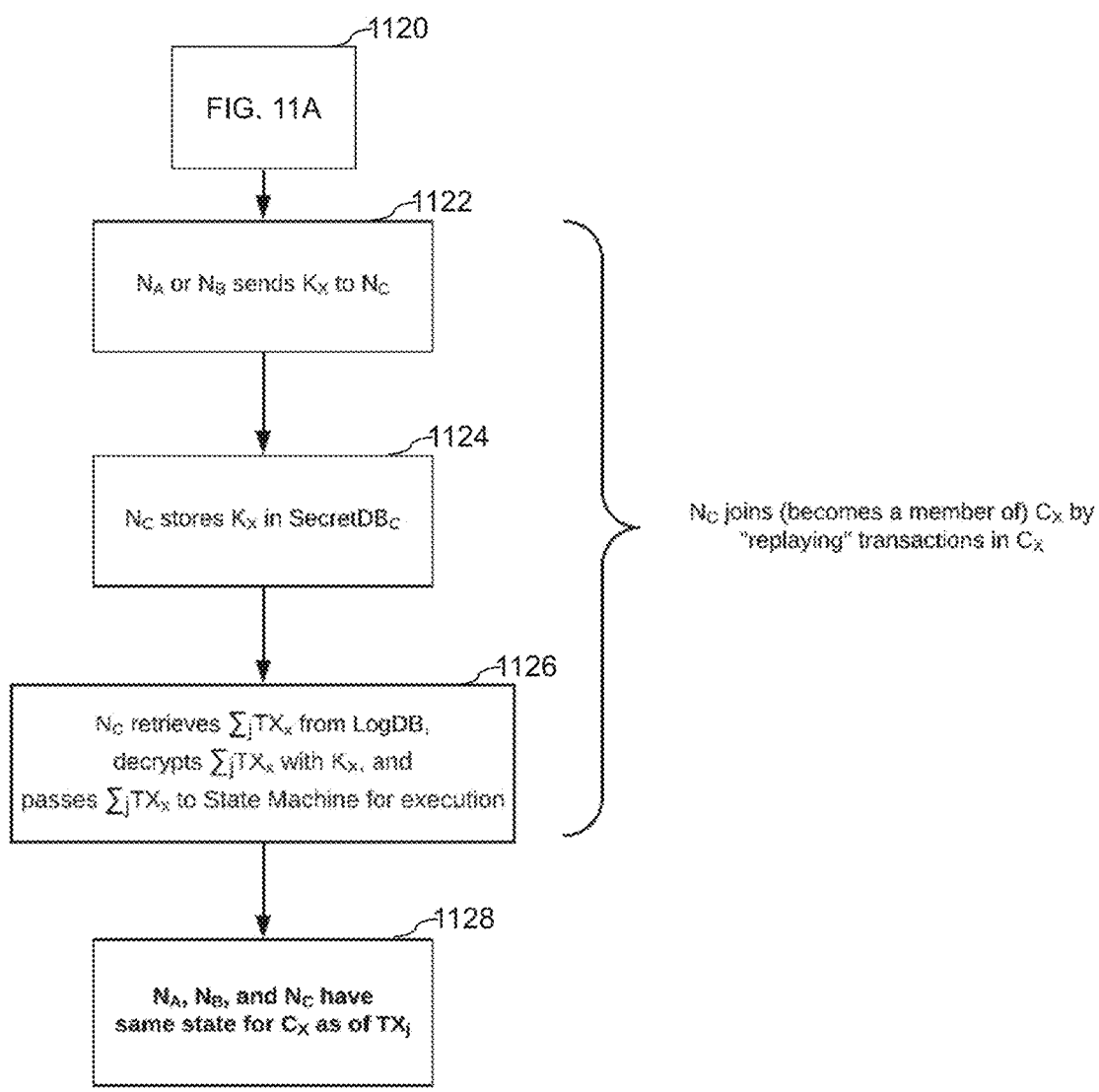
FIG. 11B is a flowchart illustrating an example embodiment(s) of adding a participant or node to an independent secure channel for private or controlled sharing of information on a distributed ledger.

FIG. 11B illustrates an example embodiment(s) of adding a member or node to an independent secure and/or private channel for private or controlled sharing of information on a distributed ledger. However, certain processes and/or features described in connection with FIG. 11B can also be applicable to dependent or interdependent channels. One or more processes described in connection with FIG. 11B can follow one or more processes described in connection with FIG. 11A 1120.

As described above, in some example embodiments illustrated in connection with FIG. 11A, at least initially Node A and Node B can be the sole members of Channel X when Channel X is first created. In other words, Node A and Node B can be the only nodes with access to Symmetric Key X when Channel X is initially created. Then, if Node A and/or Node B wish to add Node C, a new member, to Channel X, then either Node A and/or Node B can send Symmetric Key X to Node C ("$N_C$") at block 1122. In some embodiments, Node C can then store Symmetric Key X in a database or a secure database, such as Secret Database C ("SecretDB$_C$"), on and/or accessible by Node C at block 1124. Nodes A, B, and/or C can be the same node and/or different nodes. In some embodiments, one or more identities can be present on each node.

As previously discussed, in some embodiments, Node C, which is on the distributed ledger, would have been logging an encrypted version of Transaction X, and encrypted versions of other transaction(s) on Channel X if any, on the distributed log. However, as Node C previously did not have access to Symmetric Key X, Node C would not have been able to decrypt the encrypted version of Transaction X or any other transaction(s) on Channel X, if any. Similarly, Node C previously would not have been able to execute Transaction X or any other transaction(s) on Channel X, if any, without Symmetric Key X. However, now that Node C has access to Symmetric Key X, in some embodiments, Node C can now decrypt and execute Transaction X and any other transaction(s), if any, on Channel X. In other words, Node C can now "replay" all transactions previously logged as part of Channel X, using Symmetric Key X, and thus become a member of Channel X.

In particular, in some embodiments, at block 1126, Node C can retrieve the set of transactions on Channel X in the distributed log or Log Database ("Log DB") as of the last transaction on Channel X at that time, which can be denoted "$\Sigma_j\ TX_x$," to refer to the set of all transactions logged on Channel X as of the j$^{th}$ transaction on Channel X. In some embodiments, Node C can then decrypt $\Sigma_j\ TX_x$ using Symmetric Key X that it received from either Node A and/or Node B, which Node C or any other non-member node of Channel X previously would not have been able to do. After decryption, in some embodiments, Node C can execute $\Sigma_j\ TX_x$ to determine the resulting state for Channel X and one or more nodes affected by such transactions. For example, in some embodiments, Node C can pass $\Sigma_j\ TX_x$ to a State Machine on Node C for execution at block 1126. After execution or replaying the set of transactions previously logged on Channel X, Node C can then have the same state as Node A and Node B for channel X as of the j$^{th}$ transaction on Channel X at block 1128.

One or more such processes described in connection with FIG. 11B can be repeated any number of times in order to add one or more additional members to Channel X. As such, in the illustrated example with Nodes A, B, and C, all three nodes, and other nodes on the distributed ledger, always maintained consistent logged data regardless of their membership status in Channel X. In particular, with respect to Channel X, all nodes on the distributed ledger would have always logged encrypted versions of transactions on Channel X on the distributed log or Log Database in some embodiments, thereby maintaining consistency of the distributed ledger. However, in some embodiments, only those member nodes with access to Symmetric Key X would be able to decrypt such logged Channel X transactions and execute them to determine the resulting state for Channel X. As such, the information of each transaction and the resulting state thereof can be selectively shared in a controlled manner with only those members with Symmetric Key X, while maintaining data/information consistency throughout the whole distributed log at all times.

Figure 12A:
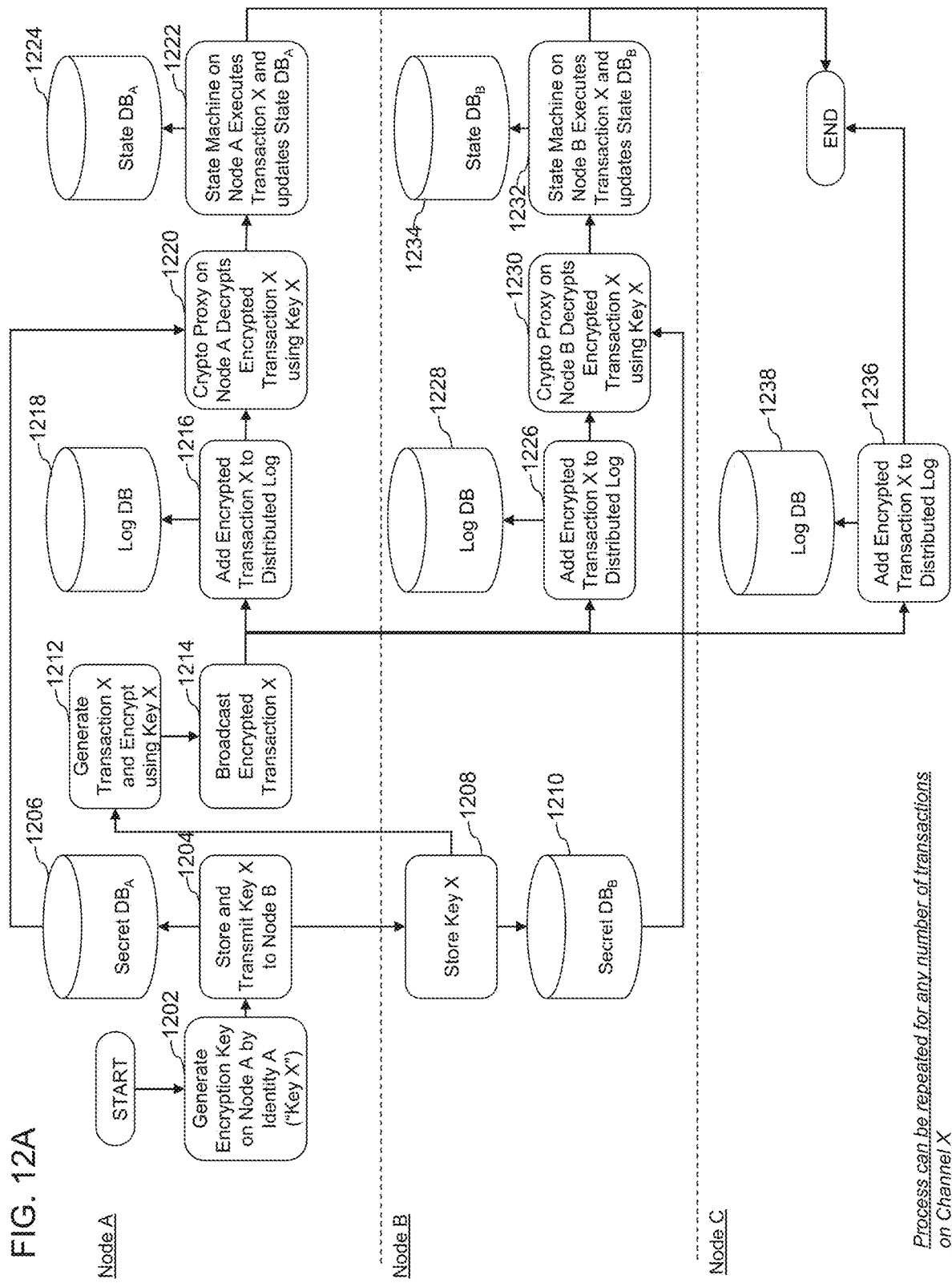
FIG. 12A is a flowchart illustrating an example embodiment(s) of private or controlled sharing of information on a distributed ledger through an independent secure channel.

FIG. 12A illustrates another example embodiment(s) of private or controlled sharing of information on a distributed ledger through an independent secure channel. However, certain processes and/or features described in connection with FIG. 12A can also be applicable to dependent or interdependent channels. In the example embodiment(s) illustrated in FIG. 12A, in some embodiments, three or more nodes can be on a distributed ledger, including Node A, Node B, and Node C. Nodes A, B, and/or C can be the same node and/or different nodes. In some embodiments, one or more identities can be present on each node. In some embodiments, every node on the distributed ledger can be configured to write or log the same information, whether encrypted or not, whenever any transaction occurs in order to maintain data/information consistency among all nodes of the distributed ledger.

However, at the same time, in some embodiments, Node A or a participant or identity on Node A may want to create or generate a private information sharing channel on the distributed ledger. In order to do so, a participant or Identity A in some embodiments, can generate an encryption key, "Key X," for a new channel, "Channel X," on Node A at block 1202. Key X can be a symmetric key or asymmetric key in some embodiments. In some embodiments, Key X can comprise a pair of encryption and decryption keys.

In some embodiments, at block 1204, Node A can store the generated Key X in a secure database that only Node A has access to, which can be denoted Secret $DB_A$ 1206. In some embodiments, Node A can also transmit Key X to another node on the distributed ledger with whom Identity A would like to share certain private information with. For example, in the illustrated example, Node A can transmit Key X to Node B at block 1204 in order to generate or create Channel X for privately sharing information between only Node A and Node B on a distributed ledger that otherwise is designed to share the same information among all nodes on the distributed ledger. In some embodiments, at block 1208, Node B can then store Key X in a secure database that only Node B has access to, which can be denoted Secret $DB_B$ 1210.

In some embodiments, Node A can generate Transaction X at block 1212, in which Transaction X reflects the information that Identity A or Node A wanted to share privately with Node B or one or more participants or identities on Node B but not with other nodes on the distributed ledger. In some embodiments, Node A can also encrypt Transaction X at block 1212 using Key X, as only Node A and Node B have access to Key X.

In some embodiments, Node A then broadcasts the encrypted version of Transaction X to all nodes on the distributed ledger at block 1214. In some embodiments, as Transaction X is encrypted with Key X, only those nodes or identities with access to Key X would be able to decrypt Key X to decrypt and determine the underlying information. In some embodiments, other nodes or identifies without access to Key X would still log the encrypted version of Transaction X, as would those nodes with Key X, onto the distributed ledger and thereby maintain data/information consistency; however, they would not be able to decrypt or determine the underlying information, thereby effectively controlling private sharing of information on a distributed ledger.

For example, in some embodiments, Node A can add or log Transaction X encrypted with Key X on the Log Database ("Log DB") 1218 at block 1216. As Node A has access to Key X, Node A can retrieve Key X from Secret $DB_A$ 1206 and decrypt the encrypted version of Transaction X using Key X at block 1220. In some embodiments, Node A can execute Transaction X after decryption using Key X and update the state machine or state machine database at Node A ("State $DB_A$") 1224 at block 1222 based on the execution of decrypted Transaction X.

As with any other node on the distributed ledger network, in some embodiments, Node B can write Transaction X encrypted with Key X to the Log Database 1228 at block 1226. As Node B also has access to Key X, Node B can similarly retrieve Key X from Secret $DB_B$ 1210 and decrypt the encrypted version of Transaction X using Key X retrieved from its own database at block 1230. In some embodiments, Node B can execute Transaction X after decryption using Key X and update its state machine or state machine database at Node B ("State $DB_B$") 1234 at block 1232 based on the execution of decrypted Transaction X.

As with Node A, Node B, and any other node on the distributed ledger network, in some embodiments, Node C can also write Transaction X encrypted with Key X to the Log Database 1238 at block 1236. In other words, all nodes on the distributed ledger can be configured to write the same encrypted version of Transaction X to the distributed log. However, unlike Node A and Node B, Node C does not have access to Key X and therefore cannot decrypt the encrypted version of Transaction X or execute Transaction X. Rather, Transaction X encrypted with Key X is simply logged without execution. In some embodiments, this process or one or more processes illustrated in FIG. 12A can be repeated for any number of transactions on Channel X.

As discussed above, circumstances may change such that Node A and/or Node B may want to share information on Channel X with Node C. In other words, a situation may arise in which Node A and/or Node B, who were previously members of Channel X, may want to share all previous and/or all future information on Channel X with a new node that was previously not a member of Channel X, such as Node C. One way to share all previous information with Node C can be to simply send all decrypted versions of previous transactions to Node C; however, this can be both time and computer resource consuming as well as unsafe from a security standpoint, particularly given the fact that Node C is on the distributed ledger with the Channel X transaction(s) as Node A and Node B, albeit in encrypted form.

As such, rather than sending the full history, which Node C already has access to an encrypted version of, in some embodiments, the system can be configured to share Key X with new member node, Node C, and have Node C decrypt and replay previous transaction(s) on Channel X to obtain the same state information for Channel X as Nodes A and B. Further, in some embodiments, for any future transactions on Channel X, Node C can decrypt and execute them in the same manner as Nodes A and B using Key X. However, if Nodes A and B would rather share some new information only between Nodes A and B, but not Node C, then Node A and/or Node B can create a new channel, such as a new independent channel with a new encryption key to be shared only among Nodes A and B but not C.

Figure 12B:
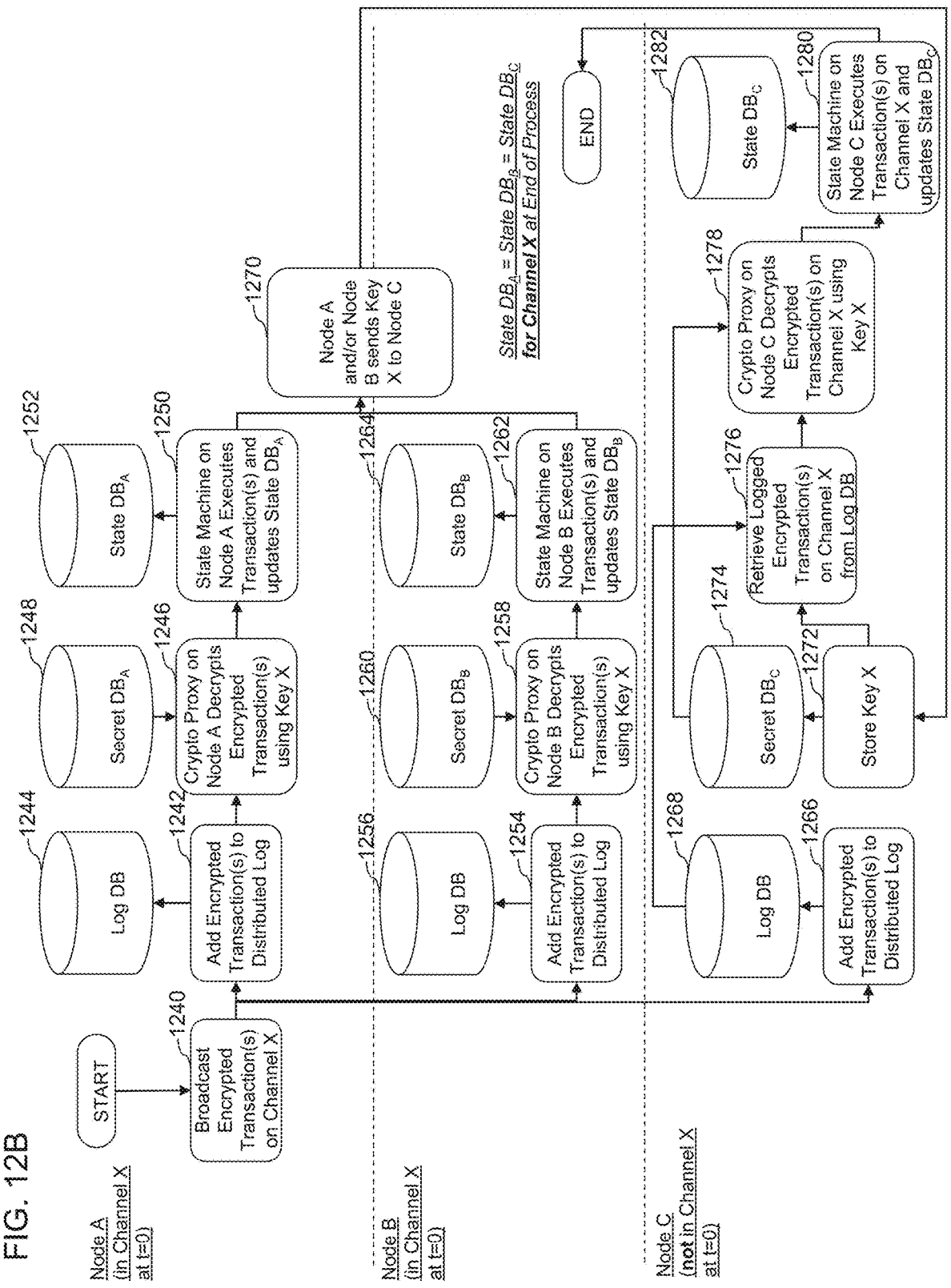
FIG. 12B is a flowchart illustrating an example embodiment(s) of adding a participant or node to an independent secure channel for private or controlled sharing of information on a distributed ledger.

FIG. 12B illustrates an example embodiment(s) of adding a member or node to an independent secure and/or private channel for private or controlled sharing of information on a distributed ledger. However, certain processes and/or features described in connection with FIG. 12B can also be applicable to dependent or interdependent channels. In the example illustrated in FIG. 12B, in some embodiments, Node A, Node B, and Node C can all be nodes on the same distributed ledger network or system. Nodes A, B, and/or C can be the same node and/or different nodes. In some embodiments, one or more identities can be present on each node. However, in some embodiments, initially or at time=0, only Nodes A and B may be members of a particular private information sharing channel, Channel X. Node C may not be on Channel X at least initially at t=0.

In some embodiments, at block 1240, Node A can generate and/or broadcast an encrypted version of a transaction(s) on Channel X to all nodes on the distributed ledger network. In some embodiments, the transaction(s) can be encrypted with an encryption key, Key X, which can be shared only among members of Channel X, which may include only Nodes A and B at t=0. Similar to the process described above in connection with FIG. 12A, in some embodiments, all nodes on the distributed ledger, including Nodes A, B, and C, can write or log the encrypted version of the transaction(s) to the distributed log.

In particular, in some embodiments, Node A can write/store the encrypted transaction(s) to the Log Database 1244 at block 1242. Since Node A is on Channel X and has access to Key X, Node A or a Crypto Proxy on Node A, in some embodiments, can decrypt the encrypted transaction(s) using Key X at block 1246. In some embodiments, Node A or the Crypto Proxy on Node A can retrieve Key X from a secure database on Node A 1248, which is denoted "Secret $DB_A$." After decryption at block 1250, in some embodiments, Node A or a State Machine on Node A can execute the transaction(s) to obtain updated state information for Channel X and update a State Database on Node A, State $DB_A$ 1252, accordingly.

Similarly, in some embodiments, Node B can write/store the encrypted transaction(s) to its Log Database 1256 at block 1254. Since Node B is also on Channel X and has access to Key X, Node B or a Crypto Proxy on Node B, in some embodiments, can decrypt the encrypted transaction(s) using Key X at block 1258. In some embodiments, Node B or the Crypto Proxy on Node B can retrieve Key X from a secure database on Node B 1260, which can be denoted "Secret $DB_B$." After decryption at block 1262, in some embodiments, Node B or a State Machine on Node B can execute the transaction(s) to obtain updated state information for Channel X and update a State Database on Node B, State $DB_B$ 1264, accordingly. At this point, in some embodiments, the State Database on Node A 1252 and the State Database on Node B 1264 can comprise the same state information for Channel X as both Nodes A and B were able to decrypt and execute the same transaction(s) on Channel X.

In some embodiments, as with any other node on the distributed ledger network, Node C can also write/store the encrypted transaction(s) to its Log Database 1268 at block 1266. In contrast to Nodes A and B, however, Node C in the illustrated example is not on Channel X at this point and does not have access to Key X. As such, in the illustrated example, Node C would not be able to decrypt or execute the transaction(s) at this point, but rather ignores it.

However, at some point in time after t=0, Node A and/or Node B may decide to include Node C in Channel X to share the previous transaction(s) on Channel X. In order to do so, in some embodiments, Node A and/or Node B can send Key X to Node C at block 1270. After receiving Key X, in some embodiments, Node C can store Key X at block 1272 in a secure database on Node C 1274, which can be denoted "Secret $DB_C$."

In some embodiments, now that Node C has access to Key X, Node C can decrypt and replay the transaction(s) on Channel X and become proxy to the same information for Channel X as Nodes A and B. In particular, in some embodiments, Node C can retrieve the logged transaction(s) on Channel X encrypted with Key X from the Log Database 1268 at block 1276.

In some embodiments, Node C or the Crypto Proxy on Node C can retrieve Key X from Secret $DB_C$ 1274 and decrypt the transaction(s) on Channel X using Key X at block 1278. After decryption at block 1280, in some embodiments, Node C or a State Machine on Node C can execute/replay the transaction(s) to obtain updated state information for Channel X and update a State Database on Node C, State $DB_B$ 1282, accordingly. At this point, in some embodiments, the State Database on Node A 1252, the State Database on Node B 1264, and the State Database on Node C 1282 can comprise the same state information for Channel X, even though Node C became a member of Channel X at a later point in time compared to Nodes A and B.

Example of Controlled Information Sharing

FIGS. 13A-B illustrate an example embodiment(s) of controlled sharing of information on a distributed ledger. Certain processes and/or features described in connection with FIGS. 13A-4B can be applicable to any and all embodiments described herein, irrespective of whether an independent, interdependent/dependent, or public channel is being utilized.

In the example embodiment illustrated in FIGS. 13A-13B, a distributed ledger can include Nodes A, B, and C. Nodes A, B, and/or C can be the same node and/or different nodes. In some embodiments, one or more identities can be present on each node. On this distributed ledger system or network, three can be at least two channels, Channel X and Channel Y. Further, at least initially, Node A and Node B can be in Channel X but not Channel Y. In addition, at least initially, Node C can be in Channel Y but not Channel X. As such, in some embodiments, a channel can be considered a set of identities and/or nodes. Furthermore, each of the nodes, Nodes A, B, and C, can comprise a Distributed Log and a State Database as described above. Each of Channel X and Y can be either an independent channel or an interdependent channel.

In the illustrated example embodiment, the Distributed Log on all of the nodes can comprise the same information, thereby maintaining data consistency. For example, each of the Distributed Logs on Nodes A, B, and C can comprise a set of all encrypted transactions broadcasted on the distributed ledger on every channel ("ΣTX"). In particular, each of the Distributed Logs on Nodes A, B, and C can comprise a set of encrypted transactions on Channel X ("$\Sigma TX_x$") and a set of encrypted transactions on Channel Y ("$\Sigma TX_y$"), as well as encrypted transactions on any other channel. $\Sigma TX_x$ and $\Sigma TX_y$ can be subsets of ΣTX. In the illustrated example, these transactions can include a First Encrypted Transaction ($TX_1$), a Second Encrypted Transaction ($TX_2$), a Third Encrypted Transaction ($TX_3$), a Fourth Encrypted Transaction ($TX_4$), a Fifth Encrypted Transaction ($TX_5$), a Sixth Encrypted Transaction ($TX_6$), or the like, in which the First, Fourth, and Fifth Encrypted Transactions are on Channel X, and the Second, Third, and Sixth Encrypted Transactions are on Channel Y.

In some embodiments, in contrast to the Distributed Log, the information stored on the State Databases on the nodes can be different or the same, depending on which channel each node is a member of. For example, the state information for Channel X stored on the State Databases of Nodes A and B can the same as both of these nodes are in Channel X. However, the State Database of Node C may not comprise any state information or updated state information for Channel X, as Node C is not a member of Channel X and cannot decrypt or execute encrypted transactions on Channel X. Further, the State Database of Node C may comprise state information for Channel Y. However, the State Databases of Nodes A or B may not comprise any state information or updated state information for Channel Y, as Nodes A and B are not members of Channel Y and cannot decrypt or execute encrypted transactions on Channel Y.

In particular, in the illustrated example embodiment, the State Databases on both Nodes A and B can comprise updated state information for Channel X as of the $j^{th}$ transaction or $State_x^j$. This can comprise state information arising from executing the decrypted versions of all transactions on Channel X until the $j^{th}$ transaction, including $TX_1$, $TX_4$, and $TX_5$, or in other words, $Execute(\Sigma_j TX_x)$. In contrast, the State Database on Node C may not comprise any or updated state information for Channel X, as Node C may not be able to decrypt or execute any of the encrypted transactions for Channel X that were broadcasted. In other words, although the encrypted transactions for Channel X are stored in the Distributed Log on Node C, thereby maintaining consistency of the data, Node C may not have access to the underlying transaction information and/or state information for Channel X.

Similarly, in the illustrated example embodiment, the State Database of Node C can comprise updated state information for Channel Y as of the $j^{th}$ transaction or $State_y^j$. This can comprise state information arising from executing the decrypted versions of all transactions on Channel Y until the $j^{th}$ transaction, including $TX_2$, $TX_3$, and $TX_6$, or in other words, $Execute(\Sigma_j TX_y)$. In contrast, the State Databases on Nodes A or B may not comprise any or updated state information for Channel Y, as Nodes A and B may not be able to decrypt or execute any of the encrypted transactions for Channel Y that were broadcasted. In other words, although the encrypted transactions for Channel Y are stored in the Distributed Log on both Nodes A and B identical to Node C, thereby maintaining consistency of the data, Nodes A and B may not have access to the underlying transaction information and/or state information for Channel Y.

In some embodiments, Node C may join Channel X. For example, either Node A and/or Node B may provide the encryption key for Channel X to Node C. In some embodiments, the encryption key for Channel X can be sent directly to Node C, for example through a side channel. In some embodiments, the encryption key for Channel X can be sent to Node C through the network, for example by encrypting the Channel X encryption key with a public key of a participant registered on Node C and then broadcasting the Channel X encryption key encrypted with the public key on the distributed ledger as a transaction. As such, in some embodiments, every node on the distributed ledger can write/store this transaction, but may be not be able to decrypt the transaction without the participant's corresponding private key and therefore not be able to obtain the Channel X encryption key. In any event, in some embodiments, Nodes A, B, and C may all be in Channel X, and only Node C may be in Channel Y as illustrated in the example embodiment of FIG. 13B. One or more processes or states depicted in FIG. 13B may follow one or more processes or states depicted in FIG. 13A.

In some embodiments, as described above, the Distributed Log of each of Nodes A, B, and C can comprise the same encrypted version of every transaction broadcasted on the distributed ledger, whether it be for Channel X or Y or another channel. The addition of a new member node to Channel X may not affect the Distributed Log in any way in some embodiments.

However, the State Database on Node C may now include updated state information for Channel X in addition to updated state information for Channel Y. More specifically, in some embodiments, now that Node C is a member of Channel X, Node C may now have access to the encryption key for Channel X and thus be able to decrypt and execute encrypted transactions on Channel X that Node C previously could not. In other words, Node C may now decrypt encrypted transactions on Channel X, including $TX_1$, $TX_4$, and $TX_5$, and execute or replay the same to obtain updated state information for Channel X, which can be stored in the State Database of Node C. As such, in some embodiments, the system allows for adding new parties to a transaction, such as a financial or other transaction, and allows the newly added party to read the history of transaction(s) and obtain the current state by having evidence of all of the previous operations on a particular channel/transaction. In other words, regardless of when a node joins a channel, every node on a particular channel can share the same state information as well as all of the previous transaction/operation history.

In addition, the State Database of Node C can continue to have stored thereon updated state information for Channel Y. However, the State Databases of Nodes A and B may continue not to comprise any or updated state information for Channel Y.

Dependent/Interdependent Channel

As described above, in some embodiments, the system can be configured to utilize one or more dependent or interdependent channels. Dependent or interdependent channels can be utilized in addition to or in lieu of independent channels. In some embodiments, a dependent or interdependent channel can refer to a channel in which a transaction thereon relies on one or more transactions or data on another channel.

Figure 14:
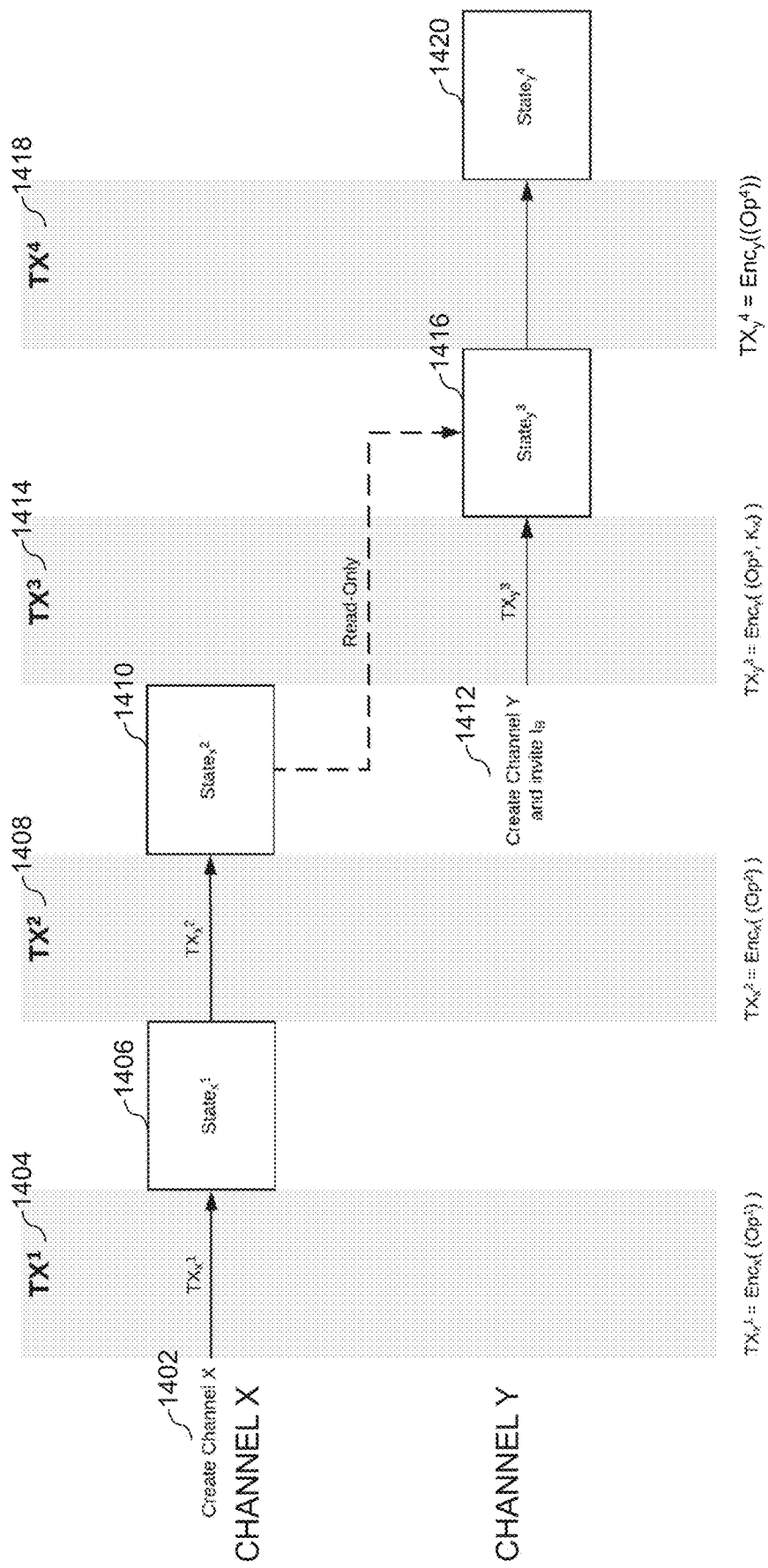
FIG. 14 is a schematic diagram illustrating an example embodiment(s) of a dependent or interdependent secure channel on a distributed ledger.

FIG. 14 is a schematic diagram illustrating an example embodiment(s) of a dependent or interdependent secure and/or private channel on a distributed ledger. In the illustrated example embodiment, the system can comprise Channel X. In particular, in some embodiments, Channel X can be created at block 1402. For example, an Identity A on Node A can create a company in Channel X, information of which can be shared with member nodes on Channel X, who have access to an encryption key for Channel X ("$K_x$").

In some embodiments, a First Transaction on Channel X ("$TX_x^1$") can be generated and broadcasted on the distributed ledger at block 1404. The First Transaction can comprise information relating to the creation of the company for example. In some embodiments, the First Transaction can comprise a First Operation in encrypted form, which can be denoted $Enc_x((Op^1))$. In some embodiments, member nodes on Channel X can use the Channel X encryption key "$K_x$" to decrypt the First Transaction and execute the same to obtain state information for Channel X after executing the First Transaction, which can be denoted $State_x^1$, at block 1406. For example, if the First Transaction comprised information relating to the creation of the company, member nodes on Channel X, but no non-member nodes, can be aware that the company was created by decrypting and executing the First Transaction.

In some embodiments, a Second Transaction on Channel X ("$TX_x^2$") can be generated and broadcasted on the distributed ledger at block 1408. For example, the Second Transaction can include company information updated by Identity A on Channel X. In some embodiments, the Second Transaction can comprise a Second Operation in encrypted form, which can be denoted $Enc_x((Op^2))$. In some embodiments, nodes on Channel X can use the Channel X encryption key "$K_x$" to decrypt the Second Transaction and execute the same to obtain state information for Channel X after the Second Transaction, which can be denoted $State_x^2$, at block 1410. For example, if the Second Transaction comprised updated company information added by Identity A, member nodes on Channel X, but no non-member nodes, can be made aware of the updated company information by decrypting and executing the Second Transaction.

In some embodiments, it may be advantageous to share information on Channel X with a node or identity that was previously not a member. One way to do this may be to add the new node to Channel X as described in some embodiments herein. However, in certain situations, it may be advantageous to give access to the information on Channel X to the new node or identity without adding the new node to Channel X itself. More specifically, it may be advantageous to share information on Channel X with a new node, but not allow members of Channel X to have access to any subsequent transactions with the new node building onto information on Channel X. In addition, it may be advantageous to allow the new node to view information on Channel X but not generate new transactions on Channel X. As an illustrative example, for managing share ownership in a company, one may want shareholder workflows to be dependent on the information about the company as a whole (for example, total shares outstanding), but it may advantageous to keep such information about particular shareowners' positions private. In order to do so, in some embodiments, a new dependent or interdependent channel can be created for actions of a particular shareholder, wherein this new channel can be dependent on an existing channel for sharing information about the company, such as total shares outstanding. Another example can be a situation in which an asset or other state information on a first channel must be verified in order to process a subsequent transaction on a second channel; the second channel can be dependent on the first channel. As such, in some embodiments, the system can provide multiparty workflows as well as transfer of assets by utilizing one or more dependent and/or independent secure channels for privately sharing information on a distributed ledger network. In particular, by utilizing one or more dependent or interdependent channels, a hierarchy of knowledge can be generated and managed, wherein members of different channels can be privy to different levels of information, while all on the same distributed ledger system and maintaining data consistency across the plurality of nodes on the distributed ledger.

Referring to the example embodiment(s) illustrated in FIG. 14, a new interdependent or dependent channel, Channel Y, can be created at block 1412. For example, Identity A, who is a member of Channel X, may want to propose sale of company shares to Identity B. In such circumstances, Identity B may want access to company information on Channel X prior to deciding whether to purchase Identity A's shares. However, it may not make sense to add Identity B to Channel X, because Identity B is not a shareholder and therefore should not have the ability to write or create transactions on Channel X. In addition, Identity A may not want all of the members of Channel X (e.g., other shareholders) to be aware that Identity A is proposing selling shares to Identity B. For any one or more of these or other reasons, in some embodiments, Identity A may create a dependent or interdependent channel, Channel Y, and invite Identity B ("$I_B$") to Channel Y at block 1412.

In some embodiments, Identity A can generate a Third Transaction on Channel Y ("$TX_y^3$"), for example to propose sale of company shares to Identity B at block 1414. Identity A and Identity B can be operating on the same node or on different nodes. In some embodiments, the Third Transaction can be encrypted with an encryption key specific to Channel Y, which is accessible only to members of Channel Y, including Identity A and Identity B. In some embodiments, the Third Transaction can comprise a set of inputs, which can include a Third Operation and the encryption key for Channel X. In other words, the Third Transaction can comprise the Third Operation and encryption key for Channel X, which can both be encrypted with an encryption key for Channel Y, which can be denoted $Enc_y((Op^3, K_x))$.

In some embodiments, Identity B can then use the encryption key for Channel Y ("$K_y$") to decrypt the Third Transaction, which comprises the Third Operation and the encryption key for Channel X. Identity B can then use the encryption key for Channel X to decrypt transactions on Channel X, which are available in encrypted form on the Distributed Log, and execute the same to determine the state information for Channel X. In addition, Identity B can execute the Third Operation after decrypting the Third Transaction using the encryption key for Channel Y. In some embodiments, the Third Operation can be dependent on or require access to the information or state information for Channel X. As such, in some embodiments, after using $K_x$ to decrypt and execute transactions on Channel X to obtain state information for Channel X and using the same to execute the Third Operation, which was obtained by decrypting the Third Transaction with $K_y$, Identity B can determine the state information for Channel Y after the Third Transaction, which can be denoted "$State_y^3$" at block 1416. In some embodiments, Identity B can only have read-only access to information on Channel X by using $K_x$ to decrypt transactions on Channel X; however, Identity B may not have write access to Channel X as Identity B is not on Channel X.

In some embodiments, after executing the Third Operation in Channel Y based at least in part on information from Channel X, Identity B can then generate a Fourth Transaction on Channel Y ("$TX_y^4$") at block 1418. For example, Identity B may review the company information in Channel X and accept the trade. The Fourth Transaction can be encrypted with the encryption key for Channel Y, as only Identity A and Identity B would need access to the underlying information or Operation of the Fourth Transaction. In other words, the Fourth Transaction $TX_y^4$ can be denoted as $Enc_y((Op^4))$. In some embodiments, the members of Channel Y, including Identity A and Identity B, can decrypt the Fourth Transaction using the encryption key for Channel Y and execute the Fourth Operation to obtain the resulting state information for Channel Y or "$State_y^4$" 1420.

Key Rotation/Change

In some embodiments, the system can be configured to allow an encryption key for a particular channel, whether independent or dependent, to be changed or rotated. Key rotation or change can be advantageous in a number of situations. For example, by changing or rotating the encryption key for a channel, security can be enhanced. As such, in some embodiments, the system can be configured to periodically rotate or change the encryption key for a particular channel.

In addition, by rotating or changing an encryption key to a channel, it can be possible to kick out a member node or identity from a particular channel, thereby denying access to future transactions on the channel. For example, in some embodiments, a member node or identity of a channel can rotate or change the channel encryption key and share the new channel encryption key with every member node or identity of the channel except for Node or Identity X. Then, in some embodiments, Node X or Identity X, the ex-member of that channel, will no longer be able to decryption and execute any future transactions on the channel; however, Node X or Identity X may still be able to access old transactions and state information that occurred while Node X or Identity X was a member on the channel.

In some embodiments, the systems disclosed herein can be configured to implement key rotation using a FreezeChannel transaction and/or a RotateKey transaction. In some embodiments, the systems disclosed herein can be configured to utilize the FreezeChannel transaction, wherein the transaction can be configured to inform all the members in a given channel that key rotation is about to happen. In some embodiments, the systems disclosed herein can be configured to use a transaction message that contains the channel name and the key identifier of the new channel key. The message can be encrypted with the current channel key, for example, the encryption key prior to rotation. In some embodiments, the systems disclosed herein can be configured to view encrypted transactions in a given channel as a chain, and the new key identifier in FreezeChannel can be a link between a transaction encrypted with the current key and the next transaction encrypted with the new key.

In some embodiments, the systems disclosed herein can be configured to utilize the RotateKey transaction, wherein the transaction message is posted immediately after the FreezeChannel transaction and contains the old channel key that is encrypted with the new channel key. This can allow the recovery of all past channel keys—when an identity receives the current channel key, it can replay and/or execute all past transactions posted in the channel by retrieving all past channel keys that are stored (in encrypted form) in the RotateKey transactions.

Example Embodiments of Private Data Sharing on a DLT Platform

As described above, in some embodiments, the systems, methods, and devices described herein are configured to allow trustless sharing of private data on a blockchain or distributed ledger, and more particularly, can include frameworks and/or solutions to ensure privacy and consistency on a distributed ledger. In some embodiments, the systems, methods, and devices described herein allow selective sharing of data across a plurality of nodes on a distributed ledger or blockchain, while at the same time maintaining consistency of the data.

In some embodiments, the systems, methods, and devices described herein comprise obtaining at a first node in a plurality of nodes a first key, for example via a key exchange protocol from a second node in the plurality of nodes. In some embodiments, the systems, methods, and devices described herein comprise decrypting at the first node, at least one transaction encrypted by the first key. In some embodiments, the at least one transaction is executed in order starting from latest transaction to earliest transaction. In some embodiments, the systems, methods, and devices described herein comprise executing at the first node, the at least one transaction. In some embodiments, executing the at least one transaction includes generating a directed acyclic graph (DAG) of the at least one transaction. In some embodiments, the systems, methods, and devices described herein comprise processing at the first node, the at least one transaction based on the generated DAG and processing at least one dependent transaction of the at least one transaction. In some embodiments, the at least one dependent transaction is processed by connecting read edges and write edges of the at least one transaction based on the generated DAG. In some embodiments, the systems, methods, and devices described herein comprise storing at the first node, a local copy of the decrypted and processed DAG.

In some embodiments, the systems, devices, and methods described herein are configured to selectively eliminate sharing data with a first node in a plurality of nodes in a blockchain in order to protect the privacy of the data is provided. In some embodiments, the systems, methods, and devices comprise at a second node in the plurality of nodes: transmitting to each node in the plurality of nodes a FREEZE transaction using a first key, generating a second key, and/or generating a rotate transaction. In some embodiments, the rotate transaction includes the first key and is encrypted with the second key. In some embodiments, the systems, methods, and devices comprise transmitting the second key to each node in the plurality of nodes except the first node.

In some embodiments, a distributed ledger, such as a blockchain, can be a network of nodes operated by different, potentially hostile, owners that maintain some shared state. In certain distributed ledgers, all nodes' transactions are completely public. However, in some situations, concealing certain transactions or elements thereof, such as for privacy reasons, while simultaneously maintaining verifiable accuracy and consistent view across all the nodes can be important.

Generally speaking, as a non-limiting example, the network of nodes that form a distributed ledger, such as a blockchain, can maintain some shared state. The ledger state and/or shared state can be often generated by a sequentially consistent log of transactions, which can be processed independently and deterministically by all nodes within the network to come to an agreement on the current state of a system. In other words, transactions can be processed sequentially in an independent manner by each node within the network. Consequently, each node can determine the current state of one or more data objects in the distributed ledger. As a non-limiting example, since the transactions are deterministic, every node must arrive at the same result. For instance, consider two individual accounts, account A having $100 and account B having $100. A sequence of transactions to move $10 from account A to account B could include a first transaction verifying if account A has enough money and debiting $10 and then a second transaction crediting $10 into account B. Each of these transactions can be processed independently and deterministically by all nodes within the network. In this example, current shared ledger state could represent account A with $90 and account B with $110.

However, in order to prevent the "double-spend" problem and to enable consistency across all nodes, every transaction can be made public across all the nodes in implementations of a blockchain such as Bitcoin for example. To give an illustrative example, when node A sends an asset to node B, every node on the network can see that node A's account has been debited. If these transactions were concealed, node A could send the same asset to node C because only node A and node B would be aware of the previous transaction. In other words, every cash transfer, credit card charge, and healthcare transaction may have to be made available to every node on the network in order to facilitate verifiable accurate and consistent view of the distributed ledger. Hence, such implementations of distributed ledgers and blockchains may not be applicable to many real-world technologies without resolving the contradiction of individual privacy and a consistent, synchronized view of the current ledger state.

In view of the above, in some embodiments, the systems, devices, and methods described herein provide frameworks and solutions to ensure both privacy and consistency on a distributed ledger. In some embodiments, the state changes of data objects in the distributed ledger can be tracked in a dependency graph. Then, in some embodiments, when data is shared amongst the nodes in the distributed ledger, the data that is shared across a subset of nodes in a network can be selectively disclosed. In some instances, the data that is shared across the subset of nodes can include additional verifiable information to allow for validation of the data across the subset of nodes. In this manner, in some embodiments, a group of nodes involved in a sequence of transactions can have a consistent view of a subset of the global state, and this subset can remain private from other nodes in the network.

Transactions and Data Dependencies

In some embodiments, transactions can be arranged in a dependency graph, where the edges represent the inputs and outputs of a transaction's function. In particular, in some embodiments, each transaction can include (1) a set of input states, (2) a function that computes over the input states, and (3) a special input for data verification. As an illustrative example, consider a transaction in a distributed ledger to credit $10 into account A. The set of input states for this transaction can represent the balance in account A at the time the transaction is executed. The function that computes over the input states can be a function to credit $10 into account A. In another example, consider a scenario in which a doctor requests a scan for a patient. An insurance company can post a transaction on a distributed ledger with a set of input states that represent the doctor's request and the patient's insurance record and the function that computes over the input states can be a function to approve the doctor's request.

In some embodiments, a special input, called the "proof," can provide a mechanism for a node to independently verify that the input states are valid. In some embodiments, whether the states represent integers or arbitrary collections of data, different types of proofs can be used to validate the states. Some non-limiting examples of concrete instantiations of such proof mechanisms include partially homomorphic encryption, zero knowledge proofs, verifiable computation, re-running all past transactions locally, which can require cryptographic keys that are used to protect past transactions, and/or the like. The end result of "proof" can be that the subset of the nodes in the network that include the transaction including the "proof" will agree on the latest value within a state of a data object within the distributed ledger and/or the ledger state.

As discussed above, in some embodiments, the transactions can be arranged in a dependency graph. By sharing this graph amongst a group of nodes within the distributed ledger, each node can independently execute the transactions to verify that the outputs are correct and consistent amongst all the nodes within that group.

Example Graph Structure

In some embodiments, the execution of a sequential log of transactions can generate a directed acyclic graph (DAG) with labeled edges. As referred to herein, in some embodiments, the graph G=(V, E) is a set V of vertices and a set E of labeled edges. In some embodiments, a transaction creates a new vertex in the graph. Each vertex can represent the state of a data item at a point in the transaction history. The structure of the data can be arbitrary, and the vertex may represent the state of a single integer or a complex data structure (e.g. to represent a corporate bond, healthcare record, car title). All edges can be labeled either Read or Write, L={W, R}. A Read edge (x, y, R) can imply that vertex y can read from vertex x. A Write edge (x, y, W) can imply that 1) vertex y can read from vertex x and 2) vertex y is a new version of vertex x. In other words, the Write edge can update the data contained within vertex x.

In some embodiments, when a transaction is posted on the distributed ledger, each node with access to the transaction (e.g., each node with which the transaction is shared) generates a vertex. As discussed above, in some embodiments, every node processes the transaction individually and independently. In some embodiments, each node can execute the transaction at different times. In some embodiments, when a node executes the transaction, Read and Write edges can be created for the transaction. In this manner, in some embodiments, by executing a sequential log of transactions each node can generates a DAG.

In some embodiments, every vertex can have exactly 0 or 1 Write edges, and 0 or more Read edges. In some embodiments, the path of the Write edges can represent the evolution of the state of a data object. For example, the path of Write edges can represent the evolution of a corporate bond, health record, car title, and/or the like. In some embodiments, the write path can be represented as:

$$\forall v \in V, p=\{v_1, v_2, v_n\} \text{ where } \{(v_1, v_2, W), (v_2, v_3, W), \ldots, (v_{n-1}, v_n, W)\} \subseteq E$$

In some embodiments, the last vertex vn in this path holds the current state of a data item, denoted curr(p). This vertex can have an outdegree of 0 Write edges, though there may, in some instances, be many outgoing Read edges. In some embodiments, all or some of the write paths are disjoint sets, forming a linear forest. In some embodiments, since there is a unique write path for every state or data object, the set of all write paths p can be denoted P, where $\forall p_i, p_j \in P, p_i \cap p_j = \emptyset$.

As an illustrative example, consider a distributed ledger for corporate bonds. The evolution of each corporate bond can be represented by at least one unique write path. The history of a corporate bond can be tracked by tracing the vertexes in the write path for that bond. That is, each vertex in the write path for a corporate bond can represent a state of the corporate bond. The last vertex in the write path for the corporate bond can represent the current state of the corporate bond.

In some embodiments, a transaction inserts a new vertex in the graph. In some embodiments, a special type of transaction (e.g., "new" transaction) can create a new vertex with no edges. It can initialize an empty state and create a write path of one vertex. As an illustrative example, consider adding a new account, say account C, to an existing distributed ledger. The addition of new account C can be a special type of transaction that creates a vertex for account C with an empty state. The changes to the balance of account C (i.e., crediting and/or debiting account C) can create a write path.

In some embodiments, a regular transaction T names a path $p^w$ to create exactly one Write edge, and a set of 0 or more paths $p^r$ to create Read edges. It can also contain a function F that can read from the curr(p) vertex from all the listed paths (i.e., all listed write paths and read paths), and produces a new vertex to append to $p^w$.

$$T=(p^w, \{p_i^r\}, F(\text{curr}(p^w), \text{curr}(\{p_i^r\})))$$

In some embodiments, when the transaction executes, it can update the graph with a new vertex v and a set of edges:

$$G'=(V \cup \{v\}, E \cup \{(w,v,W),(ri,v,R)\}) \text{ where } w, ri \in V$$

Figure 15:
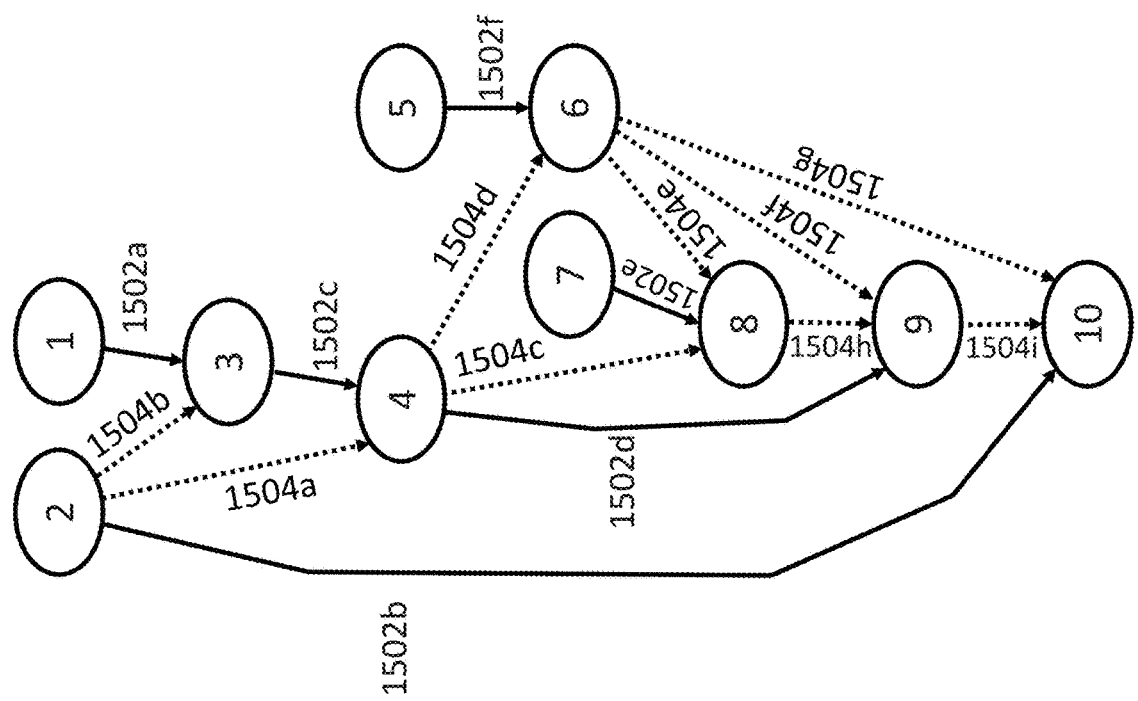
FIG. 15 is a schematic diagram illustrating an example transaction graph with write and read edges.

FIG. 15 illustrates a sample transaction graph with Write and Read edges. In the illustrated example of FIG. 15, the solid lines (e.g., 1502a-1502f) represent Write edges (collectively, Write edge 1502), the dotted lines (e.g., 1504*a*-1504*i*) are Read edges (collectively, Read edge 1504). In the illustrated example of FIG. 15, the transactions are numbered in the order they are processed. In some embodiments, the DAG is constructed one vertex at a time. For example, transaction 8 updates 7 and reads from 4 and 6 to create vertex 8, at which point the graph consists of vertices {1 . . . 8}. After transaction 10 completes, the write paths are {2, 10}, {1,3,4,9}, {7,8} and {5,6}. The latest value of any vertex can be determined by looking at the data within the last vertex in each path. In this instance, the set of last vertexes in each write path after transaction 10 completes are {10, 9, 8, 6}. Any new transaction can only read and write from vertices in this set. In fact, one can examine the value of a vertex at any point in time. For example, after transaction 5 inserts vertex 5, the ledger state can be found in {5, 4, 2}. In other words, after transaction 5 inserts vertex 5, the write paths are {2}, {1,3,4}, and {5} and the last vertex in each of the write paths hold the current state of the system, in this instance, {5, 4, 2}. In the illustrated example, the graph maintains the full history of all state changes in the system. It is a persistent data structure that captures every state change at every point in time.

Figure 16:
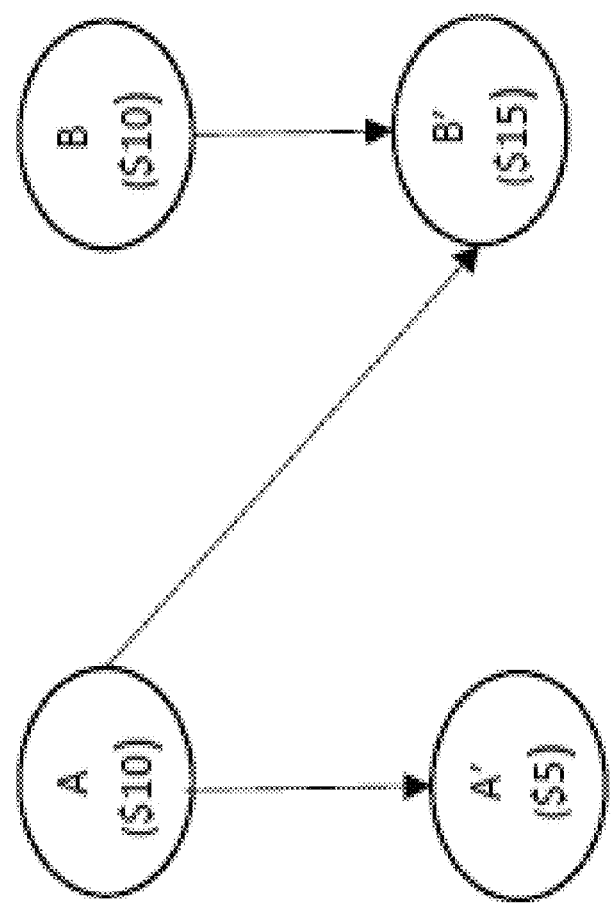
FIG. 16 is a schematic diagram illustrating an example exchange between two nodes using an example directed acyclic graph.

FIG. 16 illustrates an example exchange between two nodes, in particular an exchange of money between two nodes A and B, using an example directed acyclic graph. For purposes of illustration, assume that a graph is initialized with two vertices A and B, each with $10 as the state. In some embodiments, moving $5 from A to B can require two transactions. In particular, transaction #1 can read from A to verify it has enough money, then update B to create B' with $15. In other words, transaction #1 can insert vertex B' in the graph. The execution of transaction #1 inserts a Read edge from A to B' and a Write edge from B to B'. Transaction #2 can update A to A' with $5 (i.e., a new vertex A' is inserted with a Write edge from A to A'). In some embodiments, these transactions must be run together atomically to ensure no node ever sees a state where A has $10 and B' has $15. In some embodiments, all transactions after this will only see the vertices A' and B' containing the updated account balances as their state.

Additional Example Embodiments of Private Data Sharing on a DLT Platform

In some embodiments, a network can include a subset of independent nodes that wish to hide data from all other nodes (not within the subset) within the network. The subset of independent nodes can be configured to share the data with only member nodes within the subset. For example, four nodes can collaborate on a deal and be configured to hide the details from all other nodes in the network. Transactions can be selectively shared among the four nodes in various ways: sent directly to only the group members, pulled on demand from group members, and/or encrypted and broadcast on a decentralized ledger.

In some embodiments, the first technique for sharing transactions is to only share it with members of a group. The transactions can be annotated with metadata that lists which nodes are allowed to receive it. The second technique can be to only send a hash of the transaction plus some metadata to all nodes. Each node can decide whether to request the data from the node which initiated the transaction. This node can decide whether to send the data or not. Finally, in some embodiments, the data can be encrypted and sent to all members, which is described in more detail below.

Example Embodiments of Selective Sharing with Encryption on a DLT Platform

In some embodiments, every write path is encrypted by a different symmetric key or is unencrypted (a null key). A write path encrypted with a null key can be accessed, processed, and decrypted by every node within the network. In some embodiments, the symmetric key and/or unencrypted key can be generated when a node issues a special type of transaction to create a new vertex with no edges. In some embodiments, every transaction can be encrypted by the same symmetric key used for the write state within the transaction. In some embodiments, to nodes without the correct keys, all the transactions broadcast in the network are encrypted and unreadable. Therefore, in some embodiments, each node sees a subgraph containing only those vertices and edges for which they have the appropriate symmetric encryption keys. In some embodiments, the union of all these subgraphs can be the complete graph representing the global state of the network.

Figure 17:
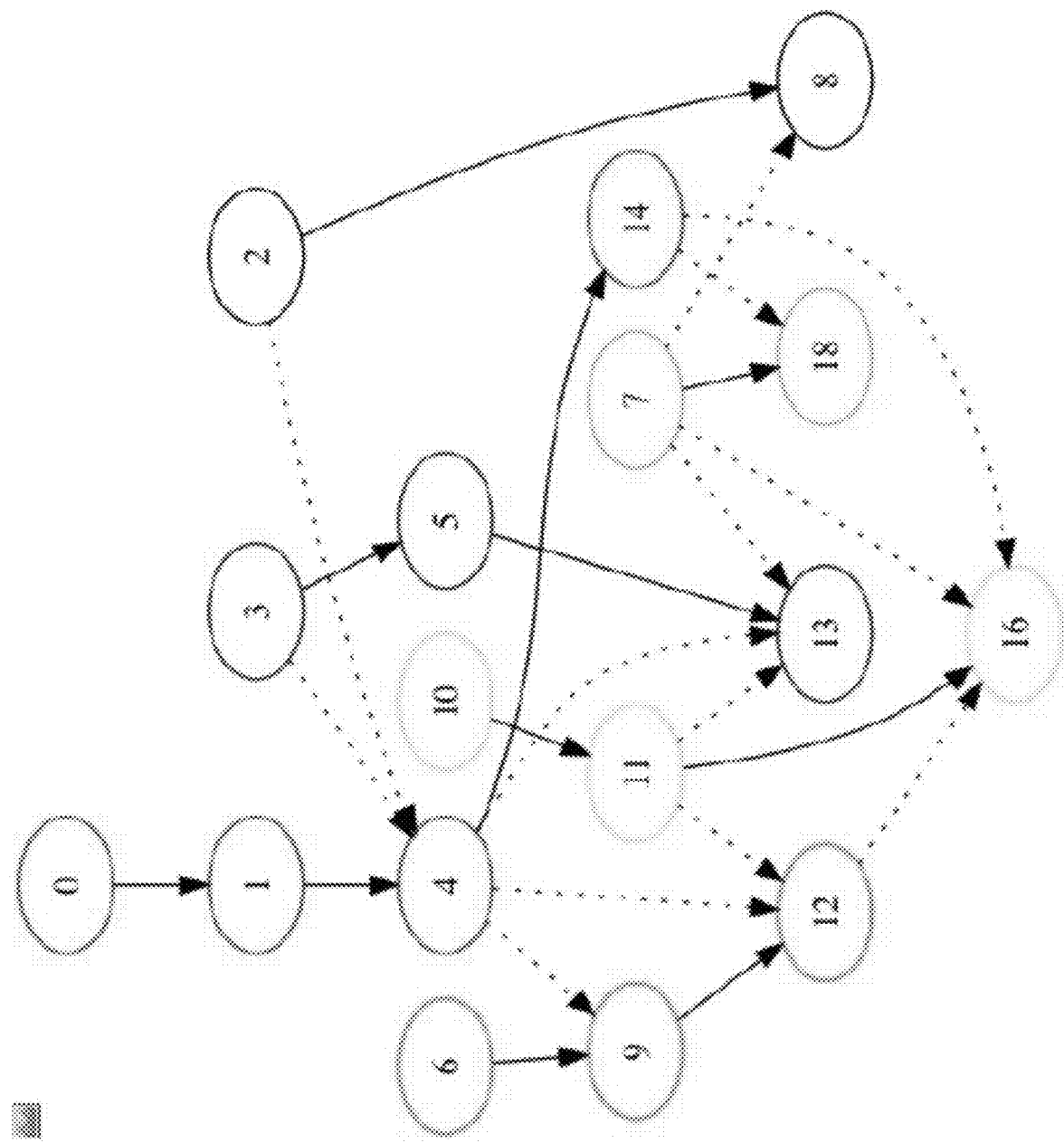
FIG. 17 is a schematic diagram illustrating an example graph implementing selective sharing with encryption and channel dependency.

FIG. 17 illustrates an example graph implementing selective sharing with encryption and channel dependency. In the illustrated example, the numbers in the vertices correspond to the transaction executed to create the vertex. In some embodiments, every write path is encrypted by a different key. The write paths in the example graph are {0, 1, 4, 14}, {2, 8}, {3, 5, 13}, {6, 9, 12}, {7, 18}, and {10, 11, 16} and are denoted by different colors.

For example, transaction 13 creates a new vertex 13 in the example illustrated in FIG. 17. The transaction itself can be encrypted by the symmetric key assigned to the blue write path {3, 5}, denoted as key(p). In some embodiments, nodes without the key would never see the blue write path {3, 5, 13} in the graph. In some embodiments, only those nodes with the correct key can decrypt and process transaction 13, which implies these nodes already see the blue write path {3, 5, 13}. However, in the illustrated example, to read the vertices {11, 4, 7} also requires having the keys for the red {0, 1, 4, 14}, yellow {10, 11, 16} and orange {7, 18} paths. In the illustrated example, the keys for all Read edges are included in the transaction; therefore, a node is only required to have the blue key to decrypt transaction 13. For instance, the key for the red {0, 1, 4}, yellow {10, 11}, and orange {7} paths are included in transaction 13.

In some embodiments, transactions do not include vertices to read from. Instead, in some embodiments, transactions can include keys to the write path. In some embodiments, when a transaction is submitted by a client, it does not get a transaction number until the network includes it in the distributed ledger or blockchain. As an illustrative example, assume two clients submit transactions that depend on transaction 1. In some embodiments, the network will put them in an arbitrary sequential order and assign them transaction numbers. Assume one of these transactions is 4. In some embodiments, this will modify the state of vertex 1 into vertex 4. Assume the next transaction is 14. In some embodiments, it can no longer modify vertex 1 because it has been overwritten by vertex 4. In some embodiments, by referring to write paths indirectly with keys, a transaction is not strictly dependent on a specific transaction, which could change at any time. Instead, in some embodiments, a transaction will append a vertex on top of the current tip of a write path. That is, by including the key to the write paths in the transactions, the transactions can read from the current state of the data object that is represented by the write path.

In contrast, providing a vertex in the transaction to read from can necessitate additional computational steps. In particular, in some embodiments, since the nodes execute transactions independently and at different times, the state of the data object may change over time. In some embodiments, by including just the vertices, nodes may have to execute the transaction (which may result in an error due to state change), update the state of the data object, and execute the transaction a second time with the updated state.

In some embodiments, a transaction encrypted by the key for the Write edge can be now defined as follows:

$$T = (\text{key}(p^w), \{\text{key}(p_i^r)\}, F(\text{curr}(p^w), \text{curr}(\{p_i^r\})))$$

In some embodiments, if this is the first time a node has ever seen a particular path, it must decrypt and process all transactions encrypted by that key to reconstruct the path in the graph. For example, in some embodiments, if a node has never seen the red path {0, 1, 4, 14}, it must decrypt and process transactions 0, 1, and 4 to have the current state of the red path (e.g., when the node is processing transaction 13). In some embodiments, only then can it process transaction 13, which depends on 4. This can be important because, in some embodiments, there could be no other safe way to get the data from 4. In some instances, a node cannot ask another node for the data, because it may "lie" and provide incorrect data. In some embodiments, a node must execute all the transactions itself to generate the correct states, thereby verifying that the node's final view is correct, and unable to be manipulated.

In some embodiments, there can be two ways for a node to get the symmetric keys for a path. The first, explained above, can be when keys are provided as part of the Read set for a transaction. In some embodiments, to share a subgraph with a node, the symmetric key for the Write path must be delivered directly to a node to add it to the group. In some embodiments, nodes can use a key exchange protocol to securely share the symmetric keys. In some embodiments, when a node receives a symmetric key for a write path, it retrieves all previous transactions forming this write path, plus all dependent Read paths, and executes these transactions in the order they were published to reconstruct the subgraph representing this private state. For instance, in some embodiments, when a node receives a symmetric key for the green write path {6, 9, 12}, the node can retrieve all the transactions in this write path, plus the dependent read paths {0, 1, 4} and {10, 11}. In some embodiments, it executes these transactions in the order they were published. In some embodiments, the node does not require transactions 14 and 16, even though they are on the red and yellow write paths. In some embodiments, since these transactions occurred after transaction 12, they do not affect the green write path.

In some embodiments, to remove a node from a group, a group must generate a new key to encrypt future transactions in the write path so that the removed node has no access to any subsequent transactions.

In some embodiments, without privacy every node processes every transaction to construct identical DAGs representing the history of all state calculations. With privacy, in some embodiments, every node constructs an induced subgraph of the DAG, limited to only the write paths for which they have the right keys. In some embodiments, a node can share a subgraph with another node by sending the symmetric key. In some embodiments, the recipient node can decrypt transactions with that key and reconstruct the subgraph. In some embodiments, all nodes with the same keys will see the same subgraph.

In some embodiments, sharing the symmetric keys for read and write edges allows a group of nodes to process transactions, while hiding the states from other nodes not in the group. However, in some embodiments, this works if the membership of the group remains constant starting from the first vertex in the write path. In such embodiments, if a group's membership changes, special care must be taken to ensure the privacy of the data.

Removing a node from a group can illustrate some of the machinery required to handle membership changes. For example, in some embodiments, if a node is removed from a group sharing a common symmetric key for a write path, a new key can be generated for the remaining members of the group. Hence, the write path may no longer encrypted by a single key. Instead, in some embodiments, the write path is partitioned into segments, each encrypted by a different key. For example, it can now be a path $p = \{s_1, s_2, \ldots, s_n\}$, where each segment $s_i$ is a write path encrypted by a different symmetric key. In some embodiments, when a new segment is created, the new symmetric key is sent to members of the group using a key exchange protocol or other methods described herein.

In some embodiments, in order to implement this on a distributed ledger or blockchain, a pair of additional special messages may be needed to handle the symmetric keys. First, in some embodiments, a FREEZE message is sent to all members of the group. In some embodiments, this message can indicate the end of a path segment and can be encrypted by the current symmetric key. In some embodiments, any transaction encrypted by the same key that arrives after the FREEZE message can be ignored. The second special message, in some embodiments, is a ROTATE message, which indicates the beginning of a path segment. In some embodiments, this message contains the symmetric key for the previous path segment and it can be encrypted by a new symmetric key for the next path segment. In some embodiments, given only the symmetric key for the latest path segment, a node can decrypt the previous path segment by using the symmetric key concealed in the ROTATE message. In some embodiments, the combination of these two transactions demarcate the beginning and end of path segments, and allows a node to decrypt all path segments.

In some embodiments, to remove a node, additional messages can be sent out to the network. For example, in some embodiments, a FREEZE message can be sent using the current key to declare the end of a segment. In some embodiments, a new symmetric key can be generated. In some embodiments, a ROTATE message containing the current key can encrypted with the new key. Further, in some embodiments, a node can be removed from the group, and the new key can be sent to the remaining nodes in the group.

In some embodiments, at this point the key rotation is complete and the removed node can no longer decrypt transactions sent to the group. In some embodiments, once a FREEZE message is processed, the node(s) no longer decrypts transactions with the current key. In some embodiments, any transactions using that key already sent on the network will be ignored.

In some embodiments, when a node is added to a group for a write path, the latest symmetric key is sent to the new node by a key exchange protocol or other methods described herein. However, in some instances, hundreds or thousands of transactions may have already been processed before this node was added to the group. In some embodiments, all these encrypted transactions exist on every node's local copy of the log. In some embodiments, for the new node to have a consistent view of these transactions, the new node decrypts and executes all these transactions, including dependent transactions connected by read and write edges. In some embodiments, the entire decrypted subgraph is a tree rooted at the next transaction encrypted by this same symmetric key.

In some embodiments, the decryption scheme takes into consideration the possibility that the write path may be divided into many segments. In some embodiments, the new node may need to decrypt all the segments. In some embodiments, since the new node has the latest key, it decrypts the last segment in the write path. In some embodiments, the first message in that last segment will be a ROTATE message. In some embodiments, this can contain the symmetric key for the previous segment. In some embodiments, the node will recursively decrypt each previous segment until it decrypts the entire write path. In some embodiments, by executing all the transactions in the write path, the new node will reconstruct the subgraph representing the state. At this point, in some embodiments, the new node will have the same subgraph as all other members in the group and can now safely participate in the group.

Figure 18:
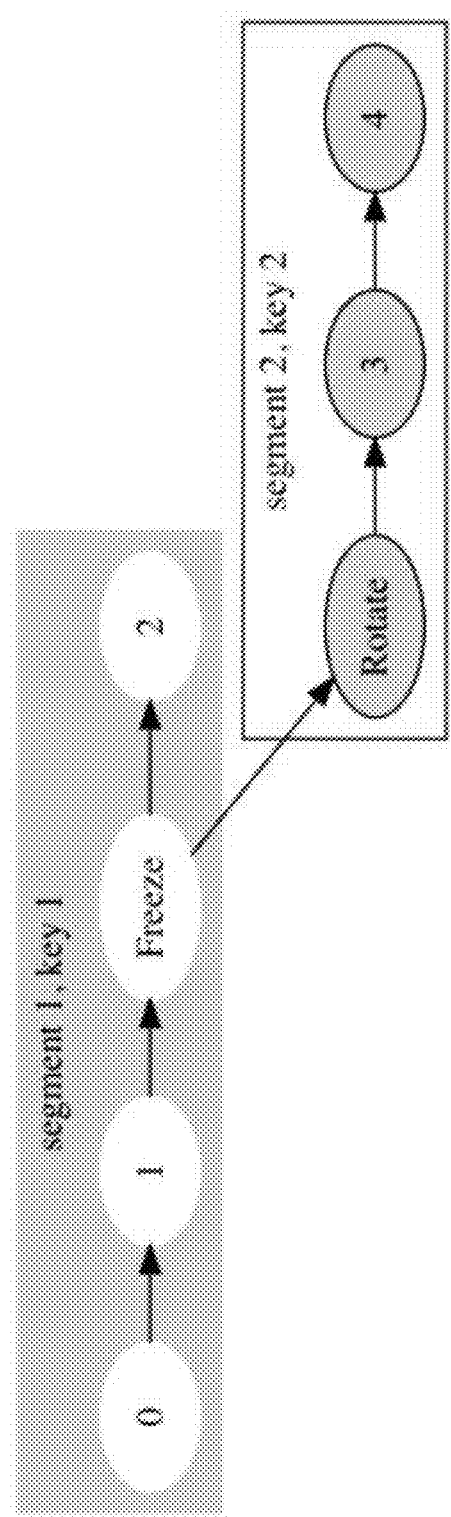
FIG. 18 is a schematic diagram illustrating an example single write path with two segments having two different keys.

FIG. 18 illustrates an example single write path with two segments having two different keys. In the illustrated example, in segment 1, all transactions are encrypted by key 1. In some embodiments, when a node processes the FREEZE message, it ignores any remaining transactions encrypted by the same key. Therefore, in the illustrated example, transaction 2 may not get executed. In some embodiment, after the FREEZE message, key 2 is generated and sent to all members of the group. Then, in some embodiments, the ROTATE key message is published, which contains key 1. In some embodiments, since all nodes will get key 2, they can decrypt and process transactions 3 and 4.

In some embodiments, when a node is added to a group, it is sent the latest key for the write path. In the example illustrated in FIG. 18, a new node can be sent key 2. This node can look at all past transactions to decrypt segment 2. When it decrypts the Rotate message, it can discover key 1. It can use this to decrypt segment 1. Once all the segments in the write path are decrypted, they can be executed in order. In some embodiments, the completion of this process ensures the node has constructed the same subgraph as all other nodes in the group.

In some embodiments, as discussed above, transactions can include a special input called "proof" to independently verify if input states are valid. In some embodiments, special input of a transaction can be the symmetric key. In such instances, the "proof" can include decrypting the subgraph encrypted by the symmetric key.

Example Implementation of Private Data Sharing on a DLT Platform

In some embodiments, the systems, methods, and devices described herein can be stored as a program component that is executed by a CPU at every node within the distributed ledger. In some embodiments, some features discussed herein enable displaying data selectively across the nodes within the distributed ledger. In some embodiments, some features discussed herein also ensure consistency of data across the nodes within the distributed ledger. Consequently, in some embodiments, verifiably accurate data can be provided across the nodes while also maintaining privacy as required.

In some embodiments, the generating of DAGs of transactions can be developed by employing development tools and languages such as, but not limited to: Apache components, Assembly, ActiveX, binary executables, (ANSI) (Objective-) C (++), C# and/or .NET, database adapters, CGI scripts, Golang, Java, JavaScript, mapping tools, procedural and object oriented development tools, Pascal, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); Representational State Transfer (REST); SWFObject; Yahoo! User Interface; and/or the like), WebObjects, and/or the like. In some embodiments, some features and technologies disclosed herein implement key exchange protocols such as Diffie-Hellman key exchange or RSA key transport to securely exchange keys to segments of write path between nodes in the distributed ledger.

An example pseudocode implemented by a processor (and/or processors) within a node on a distributed ledger or blockchain to generate DAGs, decrypt transactions, and/or exchange keys, according to some embodiments, is provided below:

```
from functools import singledispatch
from collections import namedtuple, defaultdict
from networkx import DiGraph
from pyrsistent import m
State = namedtuple('State', ['name', 'key'])
Transaction = namedtuple('Transaction', ['write_state', 'read_states', 'func'])
NewChannel = namedtuple('NewChannel', ['write_state'])
FreezeChannel = namedtuple('FreezeChannel', ['write_state'])
RotateState = namedtuple('RotateState', ['write_state', 'prev_key'])
SendKey = namedtuple('Sendkey', ['write_state'])
Encrypt = namedtuple('Encrypt', ['key', 'data'])
class Node:
    def __init__(self, pub_key="MYKEY"):
        self.PublicKey = pub_key
        self.KEYS = ['null']
        self.PendingTX = { }
        self.StateGraph = DiGraph( )
        self.StateGraph.add_node(-1, state=m( )) # public state
        self.WritePaths = defaultdict(list, public=[-1]) #type: Dict [str,
        List[Tuple[int,pMap]]]
```

```
def catchup(n, curr_txi, name, key):
if not key in n.KEYS:
n.KEYS.append(key)
if key in n.PendingTX:
for packet, ptxi in n.PendingTX[key]:
execute(packet.data, n, ptxi)
del n.PendingTX[key]
else:
pass # no tx yet
if n.WritePaths[name]:
txi = next(i for i in n.WritePaths[name] if i < curr_txi)
return txi
# Messages
@singledispatch
def execute(command, node, tx_index):
assert False, "Invalid command type: " + str(type(command))
@execute.register(Transaction)
def _(c, n, txi):
name, key = c.write_state
write_txi = catchup(n, txi, *c.write_state)
read_txis = [catchup(n, txi, *state) for state in c.read_states]
write_map = n.StateGraph.nodes[write_txi]["state"]
read_maps = [n.StateGraph.nodes[r]["state"] for r in read_txis]
new_map = c.func(write_map, *read_maps)
n.StateGraph.add_node(txi, action= "transaction", state=new_map)
n.StateGraph.add_edge(txi, write_txi, label="write")
n.StateGraph.add_edges_from(((txi, r) for r in read_txis), label="read")
n.WritePaths[name].insert(0, txi)
@execute.register(NewChannel)
def _(c, n, txi):
name, key = c.write_state
n.StateGraph.add_node(txi, state=m( ))
n.WritePaths[name].insert(0, txi)
@execute.register(FreezeChannel)
def _(c, n, txi):
name, key = c.write_state
prev = catchup(n, txi, name, key)
n.StateGraph.add_node(txi, action="freeze",
state=n.StateGraph.nodes[prev]['state'])
n.StateGraph.add_edge(txi, prev, label="write")
n.WritePaths[name].insert(0, txi)
@execute.register(RotateState)
def _(c, n, txi):
name, key = c.write_state
prev = catchup(n, txi, name, c.prev_key)
n.StateGraph.add_node(txi, action= "rotate",
state=n.StateGraph.nodes[prev]['state'])
n.StateGraph.add_edge(txi, prev, label="write")
n.WritePaths[name].insert(0, txi)
@execute.register(SendKey)
def _(c, n, txi):
name, key = c.write_state
catchup(n, txi, name, key)
def dispatch(node, packet, txi):
k = packet.key
if k in node.KEYS:
execute(packet.data, node, txi)
elif k == node.PublicKey:
execute(packet.data, node, txi)
else:
node.PendingTX[k] = node.PendingTX.get(k, [ ]) + [(packet, txi)]
```

As such, in some embodiments, the systems, devices, and methods described herein allow trustless sharing of private data on a blockchain. In some embodiments, transactions can be selectively shared with some nodes in the blockchain and hidden from other nodes in the blockchain to protect privacy of the data. In some embodiments, transactions in the blockchain are arranged in a dependency graph with labeled edges. In some embodiments, a graph with read paths and write paths is generated as the transactions are executed. In some embodiments, each write path can be encrypted with a key thereby selectively hiding data from nodes that do not possess the key. In some embodiments, each node sees a subgraph containing only those vertices and edges for which they have the appropriate encryption keys. In some embodiments, subgraphs can be decrypted by using the appropriate encryption keys. In some embodiments, the union of all these subgraphs is the complete graph representing the global state of the blockchain.

In some embodiments, a computer-implemented method to selectively share data across a plurality of nodes in a blockchain by maintaining consistency of the data comprises: at a first node in the plurality of nodes: obtaining a first key via a key exchange protocol from a second node in the plurality of nodes; decrypting at least one transaction encrypted by the first key, the at least one transaction being executed in order starting from latest transaction to earliest transaction; executing the at least one transaction, the execution including generating a directed acyclic graph (DAG) of the at least one transaction; processing the at least one transaction based on the generated DAG; processing at least one dependent transaction of the at least one transaction by connecting read edges and write edges of the at least one transaction based on the generated DAG; and storing a local copy of the decrypted and processed DAG.

In some embodiments, a computer-implemented method to selectively eliminate sharing data with a first node in plurality of nodes in a blockchain to protect the privacy of the data comprises: at a second node in the plurality of nodes: transmitting to each node in the plurality of nodes a FREEZE transaction using a first key; generating a second key; generating a rotate transaction, the rotate transaction including the first key and encrypted with the second key; and transmitting the second key to each node in the plurality of nodes except the first node.

Example Computer System

Figure 8:
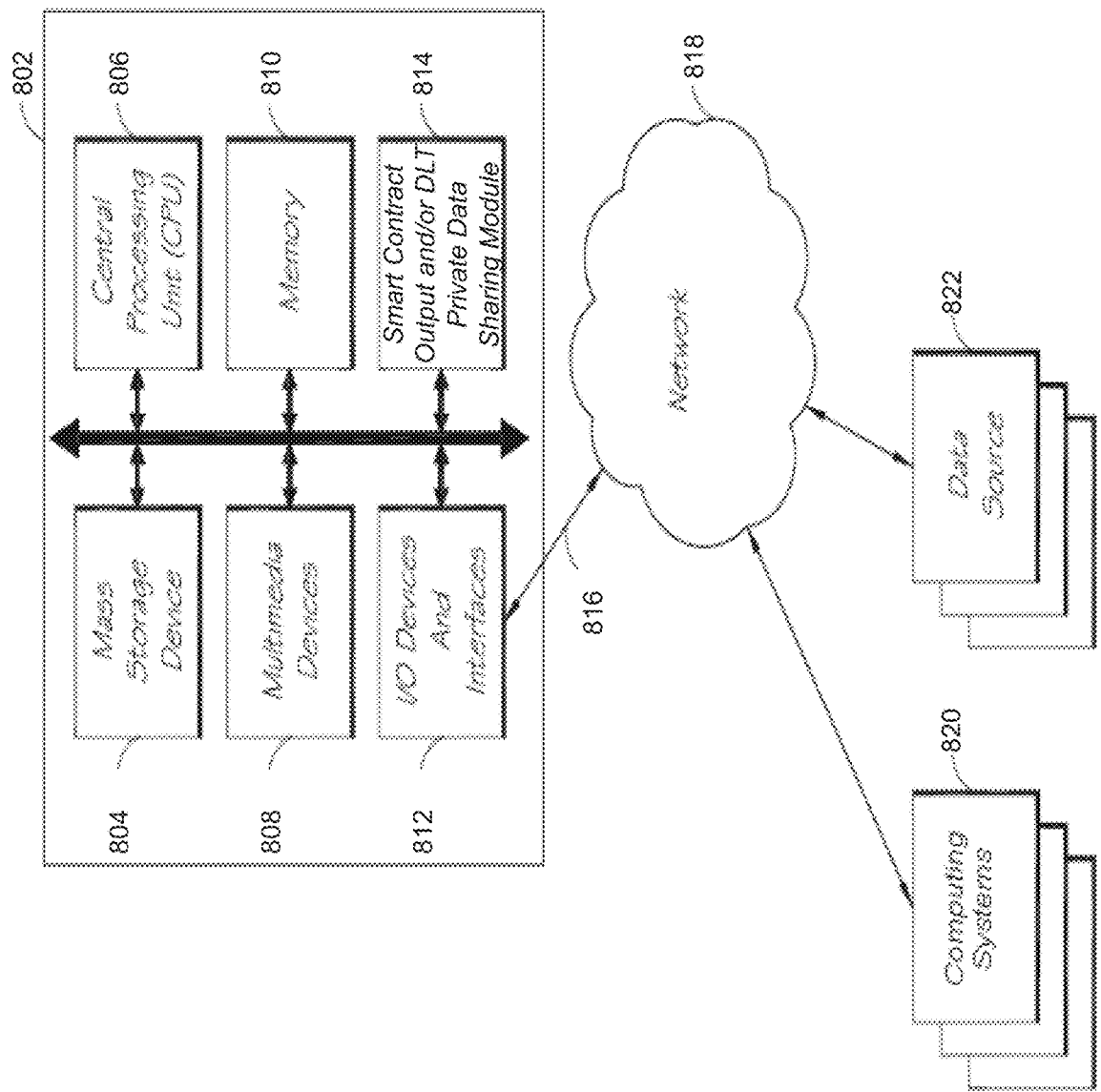
FIG. 8 is a schematic diagram depicting an embodiment(s) of a computer hardware system configured to run software for implementing one or more embodiments of systems, methods, and devices for implementing a smart contract on a distributed ledger technology platform.

In some embodiments, the systems, processes, and methods described herein are implemented using one or more computing systems, such as the one illustrated in FIG. 8. The example computer system 802 is in communication with one or more computing systems 1020 and/or one or more data sources 822 via one or more networks 818. While FIG. 8 illustrates an embodiment of a computing system 802, it is recognized that the functionality provided for in the components and modules of computer system 802 may be combined into fewer components and modules, or further separated into additional components and modules.

The computer system 802 can comprise a Smart Contract Output and/or DLT Private Data Sharing module 814 that carries out the functions, methods, acts, and/or processes described herein. The DLT Private Data Sharing module 814 is executed on the computer system 802 by a central processing unit 806 discussed further below.

In general the word "module," as used herein, refers to logic embodied in hardware or firmware or to a collection of software instructions, having entry and exit points. Modules are written in a program language, such as JAVA, C or C++, PYPHON or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 802 includes one or more processing units (CPU) 806, which may comprise a microprocessor. The computer system 802 further includes a physical memory 810, such as random access memory (RAM) for temporary storage of information, a read only memory (ROM) for permanent storage of information, and a mass storage device 804, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 802 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 802 includes one or more input/output (I/O) devices and interfaces 812, such as a keyboard, mouse, touch pad, and printer. The I/O devices and interfaces 812 can include one or more display devices, such as a monitor, that allows the visual presentation of data to a participant. More particularly, a display device provides for the presentation of GUIs as application software data, and multi-media presentations, for example. The I/O devices and interfaces 812 can also provide a communications interface to various external devices. The computer system 802 may comprise one or more multi-media devices 808, such as speakers, video cards, graphics accelerators, and microphones, for example.

The computer system 802 may run on a variety of computing devices, such as a server, a Windows server, a Structure Query Language server, a Unix Server, a personal computer, a laptop computer, and so forth. In other embodiments, the computer system 802 may run on a cluster computer system, a mainframe computer system and/or other computing system suitable for controlling and/or communicating with large databases, performing high volume transaction processing, and generating reports from large databases. The computing system 802 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 802 illustrated in FIG. 8 is coupled to a network 818, such as a LAN, WAN, or the Internet via a communication link 816 (wired, wireless, or a combination thereof). Network 818 communicates with various computing devices and/or other electronic devices. Network 818 is communicating with one or more computing systems 820 and one or more data sources 822. The Smart Contract Output and/or DLT Private Data Sharing module 814 may access or may be accessed by computing systems 820 and/or data sources 822 through a web-enabled user access point. Connections may be a direct physical connection, a virtual connection, and other connection type. The web-enabled user access point may comprise a browser module that uses text, graphics, audio, video, and other media to present data and to allow interaction with data via the network 818.

Access to the Smart Contract Output and/or DLT Private Data Sharing module 814 of the computer system 802 by computing systems 820 and/or by data sources 822 may be through a web-enabled user access point such as the computing systems' 820 or data source's 822 personal computer, cellular phone, smartphone, laptop, tablet computer, e-reader device, audio player, or other device capable of connecting to the network 818. Such a device may have a browser module that is implemented as a module that uses text, graphics, audio, video, and other media to present data and to allow interaction with data via the network 818.

The output module may be implemented as a combination of an all-points addressable display such as a cathode ray tube (CRT), a liquid crystal display (LCD), a plasma display, or other types and/or combinations of displays. The output module may be implemented to communicate with input devices 812 and they also include software with the appropriate interfaces which allow a user to access data through the use of stylized screen elements, such as menus, windows, dialogue boxes, toolbars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 802 may comprise a physical or logical connection established between a remote microprocessor and a mainframe host computer for the express purpose of uploading, downloading, or viewing interactive data and databases online in real time. The remote microprocessor may be operated by an entity operating the computer system 802, including the client server systems or the main server system, and/or may be operated by one or more of the data sources 822 and/or one or more of the computing systems 820. In some embodiments, terminal emulation software may be used on the microprocessor for participating in the micro-mainframe link.

In some embodiments, computing systems 820 who are internal to an entity operating the computer system 802 may access the Smart Contract Output and/or DLT Private Data Sharing module 814 internally as an application or process run by the CPU 806.

The computing system 802 may include one or more internal and/or external data sources (for example, data sources 822). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 802 may also access one or more databases 822. The databases 822 may be stored in a database or data repository. The computer system 802 may access the one or more databases 822 through a network 818 or may directly access the database or data repository through I/O devices and interfaces 812. The data repository storing the one or more databases 822 may reside within the computer system 802.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

OTHER EMBODIMENTS

Although this invention has been disclosed in the context of some embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that some embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

What is claimed is:

1. A computer-implemented method for managing corporate governance, the method comprising:
  receiving, by a first trustless decentralized networked node of a trustless decentralized networked system, a proposed corporate action from a first user, wherein the trustless decentralized networked system comprises:
    a plurality of trustless decentralized networked nodes including the first trustless decentralized networked node, wherein each of the plurality of trustless decentralized networked nodes comprises a local state database accessible to the respective trustless decentralized networked node;
    a distributed ledger technology platform operated by the plurality of trustless decentralized networked nodes, wherein the distributed ledger technology platform comprises:
      a distributed ledger for recording corporate actions, wherein the distributed ledger is accessible by each of the plurality of trustless decentralized networked nodes; and
      a smart contract accessible to each of the plurality of trustless decentralized networked nodes, wherein the smart contract comprises:
        one or more triggering events; and
        a plurality of predetermined electronic actions for generating a smart contract output when the one or more triggering events are met,
    wherein the first trustless decentralized networked node comprises a computer processor and an electronic storage medium;
  recording the proposed corporate action to the distributed ledger;
  determining, by the first trustless decentralized networked node, that the proposed corporate action meets the one or more triggering events in the smart contract;
  upon determining that the proposed corporate action meets the one or more triggering events:
    generating, by the first trustless decentralized networked node, a first smart contract output by automatically executing the plurality of predetermined electronic actions in the smart contract based at least in part on the proposed corporate action; and
    recording, by the first trustless decentralized networked node, the first smart contract output to the local state database of the first trustless decentralized networked node.

2. The computer-implemented method of claim 1, wherein the first smart contract output is generated by each of the plurality of trustless decentralized networked nodes by automatically executing the plurality of predetermined electronic actions in the smart contract based at least in part on the recorded proposed corporate action, and wherein the first smart contract output is recorded by each of the plurality of trustless decentralized networked nodes to the local state database of the respective trustless decentralized networked node.

3. The computer-implemented method of claim 1, further comprising broadcasting, by the first trustless decentralized networked node, the proposed corporate action to the plurality of trustless decentralized networked nodes.

4. The computer-implemented method of claim 1, wherein the proposed corporate action is publicly published on the distributed ledger technology platform.

5. The computer-implemented method of claim 1, wherein the proposed corporate action is publicly published on the distributed ledger technology platform by recording the proposed corporate action to the distributed ledger without encryption.

6. The computer-implemented method of claim 1, wherein the proposed corporate action is published on a private channel of the distributed ledger technology platform, and wherein a subset of the plurality of trustless decentralized networked nodes are members of the private channel.

7. The computer-implemented method of claim 1, wherein the proposed corporate action is published on a private channel of the distributed ledger technology platform by recording the proposed corporate action to the distributed ledger with encryption, and wherein a subset of the plurality of trustless decentralized networked nodes are members of the private channel.

8. The computer-implemented method of claim 1, wherein the one or more triggering events comprises reaching a consensus on the content of the proposed corporate action among each of the plurality of trustless decentralized networked nodes.

9. The computer-implemented method of claim 1, wherein the one or more triggering events comprises receiving a notification from a central authority.

10. The computer-implemented method of claim 1, wherein the one or more triggering events comprises a vote over the proposed corporate action, through the distributed ledger technology platform, exceeding a voting threshold.

11. The computer-implemented method of claim 1, further comprising transmitting, by the first trustless decentralized networked node, an electronic alert notification to the first user upon determining that the proposed corporate action meets the one or more triggering events.

12. The computer-implemented method of claim 1, wherein the proposed corporate action is one of: a share issuance, a board resolution, or an incorporation.

13. The computer-implemented method of claim 1, wherein the smart contract is generated by a central authority.

14. The computer-implemented method of claim 1, wherein the first user is a director, board member, secretary, officer, or shareholder of a company.

15. Non-transitory computer-readable media including computer-executable instructions that, when executed by a first trustless decentralized networked node of a trustless decentralized networked system, cause the first trustless decentralized networked node to perform operations comprising:
receiving a proposed corporate action from a first user, wherein the trustless decentralized networked system comprises:
a plurality of trustless decentralized networked nodes including the first trustless decentralized networked node, wherein each of the plurality of trustless decentralized networked nodes comprises a local state database accessible to the respective trustless decentralized networked node;
a distributed ledger technology platform operated by the plurality of trustless decentralized networked nodes, wherein the distributed ledger technology platform comprises:
a distributed ledger for recording corporate actions, wherein the distributed ledger is accessible by each of the plurality of trustless decentralized networked nodes; and
a smart contract accessible to each of the plurality of trustless decentralized networked nodes, wherein the smart contract comprises:
one or more triggering events; and
a plurality of predetermined electronic actions for generating a smart contract output when the one or more triggering events are met,
wherein the first trustless decentralized networked node comprises a computer processor and an electronic storage medium;
recording the proposed corporate action to the distributed ledger;
determining that the proposed corporate action meets the one or more triggering events in the smart contract;
upon determining that the proposed corporate action meets the one or more triggering events:
generating a first smart contract output by automatically executing the plurality of predetermined electronic actions in the smart contract based at least in part on the proposed corporate action; and
recording the first smart contract output to the local state database of the first trustless decentralized networked node.

16. The non-transitory computer-readable media of claim 15, wherein the first smart contract output is generated by each of the plurality of trustless decentralized networked nodes by automatically executing the plurality of predetermined electronic actions in the smart contract based at least in part on the recorded proposed corporate action, and wherein the first smart contract output is recorded by each of the plurality of trustless decentralized networked nodes to the local state database of the respective trustless decentralized networked node.

17. The non-transitory computer-readable media of claim 15, wherein the one or more triggering events comprises reaching a consensus on the content of the proposed corporate action among each of the plurality of trustless decentralized networked nodes.

18. A computing system comprising:
a non-transitory computer readable storage medium having program instructions embodied therewith; and
one or more processors configured to execute the program instructions to cause the computing system to:
receive, by a first trustless decentralized networked node of a trustless decentralized networked system, a proposed corporate action from a first user, wherein the trustless decentralized networked system comprises:
a plurality of trustless decentralized networked nodes including the first trustless decentralized networked node, wherein each of the plurality of trustless decentralized networked nodes comprises a local state database accessible to the respective trustless decentralized networked node;
a distributed ledger technology platform operated by the plurality of trustless decentralized networked nodes, wherein the distributed ledger technology platform comprises:
a distributed ledger for recording corporate actions, wherein the distributed ledger is accessible by each of the plurality of trustless decentralized networked nodes; and
a smart contract accessible to each of the plurality of trustless decentralized networked nodes, wherein the smart contract comprises:
one or more triggering events; and
a plurality of predetermined electronic actions for generating a smart contract output when the one or more triggering events are met,
wherein the first trustless decentralized networked node comprises a computer processor and an electronic storage medium;
record the proposed corporate action to the distributed ledger;
determine, by the first trustless decentralized networked node, that the proposed corporate action meets the one or more triggering events in the smart contract;
upon determining that the proposed corporate action meets the one or more triggering events:

generate, by the first trustless decentralized networked node, a first smart contract output by automatically executing the plurality of predetermined electronic actions in the smart contract based at least in part on the proposed corporate action; and record, by the first trustless decentralized networked node, the first smart contract output to the local state database of the first trustless decentralized networked node.

19. The computing system of claim 18, wherein the first smart contract output is generated by each of the plurality of trustless decentralized networked nodes by automatically executing the plurality of predetermined electronic actions in the smart contract based at least in part on the recorded proposed corporate action, and wherein the first smart contract output is recorded by each of the plurality of trustless decentralized networked nodes to the local state database of the respective trustless decentralized networked node.

20. The computing system of claim 18, wherein the one or more triggering events comprises reaching a consensus on the content of the proposed corporate action among each of the plurality of trustless decentralized networked nodes.

\* \* \* \* \*